(12) United States Patent
Delgado

(10) Patent No.: US 12,401,780 B2
(45) Date of Patent: Aug. 26, 2025

(54) SYSTEM AND METHOD FOR EXPLORING IMMERSIVE CONTENT AND IMMERSIVE ADVERTISEMENTS ON TELEVISION

(71) Applicant: VUER LLC, Miami, FL (US)

(72) Inventor: Omar J. Delgado, Chantilly, VA (US)

(73) Assignee: Vuer LLC, Doral, FL (US)

( * ) Notice: Subject to any disclaimer, the term of this patent is extended or adjusted under 35 U.S.C. 154(b) by 89 days.

(21) Appl. No.: 18/200,416

(22) Filed: May 22, 2023

(65) Prior Publication Data

US 2023/0308630 A1 Sep. 28, 2023

Related U.S. Application Data

(63) Continuation-in-part of application No. 17/724,231, filed on Apr. 19, 2022, now Pat. No. 11,659,250.
(Continued)

(51) Int. Cl.
*H04N 13/351* (2018.01)
*G06F 3/04883* (2022.01)
(Continued)

(52) U.S. Cl.
CPC ....... *H04N 13/351* (2018.05); *G06F 3/04883* (2013.01); *G06T 3/18* (2024.01);
(Continued)

(58) Field of Classification Search
CPC . H04N 21/478; H04N 21/4126; H04N 21/812
See application file for complete search history.

(56) References Cited

U.S. PATENT DOCUMENTS 8,599,317 B2 * 12/2013 Shamur ................ G11B 27/036
386/280
9,078,048 B1 * 7/2015 Gargi ................. H04N 21/2668
(Continued)

OTHER PUBLICATIONS

"Augmented Reality Competitions at Baseball Games," youtube.com. https://www.youtube.com/watch?v=MTjhs8_PyBY&t=1s [Date accessed: Dec. 31, 2020].

*Primary Examiner* — Timothy R Newlin
(74) *Attorney, Agent, or Firm* — Bold IP, PLLC; Houda El-Jarrah

(57) ABSTRACT

A system for navigating, exploring, and controlling immersive content and immersive advertisements provided on one or more OTT television applications using connected digital media players and/or user computing devices is presented. Immersive content and immersive advertisements are content and advertisements that can be viewed in 360 degrees so as to change the point of view and view the same content or advertisement from different angles. The user is enabled to control the playback, navigation, and exploration of the 360-degree immersive content and immersive advertisements using a digital trackpad in a downloadable 360-degree media player that can be applied as a separate application integration on a user's smartphone or other device or that can be integrated into the OTT mobile application. Other connected streaming devices can also integrate the 360-degree media player to allow for 360 degree exploration and viewing of the immersive content and immersive advertisements.

14 Claims, 34 Drawing Sheets

Related U.S. Application Data

(60) Provisional application No. 63/176,472, filed on Apr. 19, 2021.

(51) Int. Cl.

| | | |
|---|---|---|
| *G06T 3/18* | (2024.01) | |
| *G06V 10/10* | (2022.01) | |
| *G06V 20/70* | (2022.01) | |
| *H04N 5/265* | (2006.01) | |
| *H04N 21/431* | (2011.01) | |
| *H04N 23/698* | (2023.01) | |

(52) U.S. Cl.
CPC ............ *G06V 10/16* (2022.01); *G06V 20/70* (2022.01); *H04N 5/265* (2013.01); *H04N 21/4316* (2013.01); *H04N 23/698* (2023.01)

(56) References Cited

U.S. PATENT DOCUMENTS

| | | | | |
|---|---|---|---|---|
| 10,412,438 | B2* | 9/2019 | Depies | G10L 15/26 |
| 10,469,750 | B1* | 11/2019 | Canfield | H04N 9/8205 |
| 11,190,680 | B1* | 11/2021 | Tran | H04N 23/611 |
| 2004/0008209 | A1* | 1/2004 | Adams | H04N 1/00384 |
| | | | | 345/619 |
| 2004/0212630 | A1* | 10/2004 | Hobgood | G06T 19/006 |
| | | | | 345/633 |
| 2005/0022139 | A1* | 1/2005 | Gettman | G06F 16/954 |
| | | | | 715/811 |
| 2006/0247851 | A1* | 11/2006 | Morris | H04M 1/72403 |
| | | | | 701/533 |
| 2008/0092054 | A1* | 4/2008 | Bhumkar | G06F 3/0482 |
| | | | | 707/E17.119 |
| 2008/0306817 | A1* | 12/2008 | Amidon | H04N 21/812 |
| | | | | 705/14.67 |
| 2009/0161027 | A1* | 6/2009 | Hardacker | H04N 21/472 |
| | | | | 725/38 |
| 2010/0095326 | A1* | 4/2010 | Robertson, III | H04N 21/4788 |
| | | | | 725/40 |
| 2013/0031275 | A1* | 1/2013 | Hanes | G06F 3/038 |
| | | | | 710/5 |
| 2013/0080646 | A1* | 3/2013 | Berkoff | H04L 12/2814 |
| | | | | 709/228 |
| 2013/0325611 | A1* | 12/2013 | Delug | G06Q 30/0257 |
| | | | | 705/14.55 |
| 2014/0053225 | A1* | 2/2014 | Shoykher | H04L 51/52 |
| | | | | 725/132 |
| 2014/0118222 | A1* | 5/2014 | Barrett | G01C 21/3688 |
| | | | | 345/2.2 |
| 2014/0267931 | A1* | 9/2014 | Gilson | H04N 21/4436 |
| | | | | 348/734 |
| 2015/0022664 | A1* | 1/2015 | Pflug | G06F 3/04883 |
| | | | | 348/148 |
| 2015/0062621 | A1* | 3/2015 | Xiao | G06F 3/1203 |
| | | | | 358/1.15 |
| 2015/0116448 | A1* | 4/2015 | Gottlieb | H04N 21/47205 |
| | | | | 348/14.03 |
| 2015/0237401 | A1* | 8/2015 | Morimoto | H04H 60/40 |
| | | | | 725/14 |
| 2015/0281744 | A1* | 10/2015 | Chapman | H04N 21/42224 |
| | | | | 725/37 |
| 2016/0050465 | A1* | 2/2016 | Zaheer | H04N 21/6125 |
| | | | | 725/34 |
| 2016/0133230 | A1 | 5/2016 | Daniels et al. | |
| 2016/0266669 | A1* | 9/2016 | Khuong | H04N 21/42224 |
| 2017/0061686 | A1* | 3/2017 | Yu | G06T 3/4038 |
| 2017/0078447 | A1* | 3/2017 | Hancock | H04N 21/4424 |
| 2017/0155837 | A1* | 6/2017 | Borish | H04N 21/816 |
| 2017/0316806 | A1* | 11/2017 | Warren | H04N 21/816 |
| 2017/0344830 | A1* | 11/2017 | Birkbeck | G06F 16/7837 |
| 2018/0027181 | A1* | 1/2018 | Roulet | G06F 5/70 |
| | | | | 348/38 |
| 2018/0324404 | A1* | 11/2018 | Sevigny | G06T 11/60 |
| 2018/0342106 | A1 | 11/2018 | Rosado | |
| 2019/0108558 | A1* | 4/2019 | Spivack | G06F 3/167 |
| 2019/0230283 | A1* | 7/2019 | Ollier | H04N 23/667 |
| 2019/0250804 | A1* | 8/2019 | Voss | H04N 23/633 |
| 2019/0262705 | A1 | 8/2019 | Trombetta et al. | |
| 2019/0306451 | A1* | 10/2019 | Wang | H04N 21/8106 |
| 2019/0333109 | A1* | 10/2019 | Teller | G06Q 30/0267 |
| 2019/0356847 | A1* | 11/2019 | Rabbat | G11B 27/031 |
| 2020/0021791 | A1* | 1/2020 | Hur | H04N 21/6587 |
| 2020/0029128 | A1* | 1/2020 | Erskine | H04N 21/25866 |
| 2020/0092488 | A1* | 3/2020 | Bhuruth | G06T 7/70 |
| 2020/0236346 | A1* | 7/2020 | Kato | H04N 13/349 |
| 2021/0092489 | A1* | 3/2021 | Dutta | H04N 21/4728 |
| 2021/0112295 | A1* | 4/2021 | Birkbeck | H04N 21/812 |
| 2022/0337745 | A1* | 10/2022 | Gu | H04N 21/21805 |

* cited by examiner

SYSTEM AND METHOD FOR EXPLORING IMMERSIVE CONTENT AND IMMERSIVE ADVERTISEMENTS ON TELEVISION

CROSS-REFERENCE TO RELATED APPLICATIONS

This application is a continuation-in-part application of non-provisional application Ser. No. 17/724,231 filed on Apr. 19, 2022 which claims priority to U.S. Provisional Patent Application No. 63/176,472 filed on Apr. 19, 2021, which is incorporated by reference in its entirety.

FIELD OF THE DISCLOSURE

The present invention relates to the concept of Immersive TV (ITV), defined as a new method and system for displaying and exploring immersive content and immersive advertisements (i.e., Virtual reality, 360-degree video, images, or computer-generated visuals) on a connected television (i.e., television with an Internet connection, hereinafter "CTV"). ITV can be viewed on a CTV by downloading a video streaming application in the CTV with an embedded 360-degree media player. Further, ITV can be explored primarily using the arrows in the CTV's remote control. An optional method of exploration consists of embedding a digital trackpad in a smartphone software application-related to the CTV video streaming application—that allows for navigation of menu functions and omnidirectional exploration of ITV. Further, the immersive advertisements may be configured in a programmatic ad server to support variable user-selectable endings, whereby the immersive advertisements require participation and interaction of the user in viewing the immersive advertisements. Further, the immersive advertisements may be presented during live streaming events and include 2D and 3D visual overlays on the immersive image or video to capture the focus and attention of the viewer.

BACKGROUND

Virtual reality (VR) has resurged as one of the fastest growing markets worldwide, and despite more content and more adopters entering the scene, the VR industry will likely leave out most people who do not or do not plan to own a VR headset. There are approximately 200 million VR users worldwide, yet 3.76 billion people (48% of the world population) will be consuming content via CTV by 2025. While cost may be a barrier for VR adoption ($300 for the average headset), many people do not feel comfortable wearing these devices. A study by researchers at Leeds University found that just 20 minutes of exposure to VR headsets could affect the ability of some children to discern the distance to objects. There are also concerns that regular use of these devices could accelerate the global epidemic of myopia, a condition already affecting 30% of the global population. It is not uncommon for VR users to complain about eye strain, headaches, and in some cases, nausea. Experts say this is due to the way VR affects the eye-brain connection. Meanwhile, VR headset manufacturers warn users that "while wearing the product's headset, you are blind to the world around you" and "do not rely on the product's chaperone system for protection." This is in reference to the fact that the VR headset users must completely isolate themselves from their surroundings, and while the experiences are virtual, the injuries are very real. More and more often, reports surface of users running into objects, small children, and pets. As a matter of fact. VR headsets were reportedly one of the leading causes behind a 31% spike in insurance claims in 2021.

Disconnecting from the world around them also means disconnecting from their phones or other computing devices altogether, which is a problem for many people. On average, Americans check their phones 344 times per day (i.e., every four minutes), which is also another reason why VR users only spend an average of 12 minutes a day on their headsets.

The story is very different for TV users, who spend approximately three hours a day glued to their TVs, where the risk of injury, nausea, and vision damage is virtually non-existent. Further, when people are watching TV, they can also use their phones throughout the entire experience, as is the case with 77% of Americans, who switch back and forth between both screens.

Accordingly. ITV would provide billions of users an option to gain access to immersive content that would normally have to be viewed in a small screen (smartphone or computer) or using a VR headset, all while removing the risk of injury to the wearers and those around them, and allowing users the ability to use their phones or other devices as needed.

Further, the inclusion of programmatic advertising (automated buying and selling of online advertisement spaces) in ITV can offset, and often remove, the cost that the user would otherwise have to pay to access ITV. This is also beneficial to advertisers, who are always looking for ways to truly connect with the viewers in a meaningful way. A study by Vibrant Media revealed that 360-degree advertising campaigns attain 600% higher interaction rates than standard 2D video ad experiences, 700% higher content recall, 2,700% higher brand recall, and 200% more product intent. Immersive advertisements can yield additional data points to measure ad engagement, like providing certainty that the advertisement was seen all the way through; this based on the fact that immersive advertisements would require users to move their point of view throughout the ad. By increasing the size of the addressable market and the size of the device significantly, advertisers could seize the entire potential that the VR format has to offer.

Accordingly, there is a need for an improved way for viewers to enjoy immersive content and immersive advertisements that are viewable on the television, and to also allow users to utilize their phones or other connected devices.

SUMMARY

The present description includes one or more non-limiting embodiments for a computer implemented method, comprising, installing, integrating, or embedding a first software development kit (SDK) or native source code directly in an over the-top (OTT) streaming application or indirectly through a cloud broadcasting system (CBS) or content delivery network (CDN) powering the OTT streaming application, wherein the OTT streaming application is downloadable and accessible by a user through a connected television (connected TV), wherein the connected TV device comprises a television or a hardware enabled digital media player that is capable of processing internet wirelessly to download and launch the OTT streaming application and to download equirectangular immersive content for display on the connected TV, wherein the OTT streaming application comprises a 360 degree digital multimedia player. The method further includes installing, integrating, or embedding a second software development kit (SDK) on a separate user computing device that is separate from the connected TV, wherein the second SDK is part of a user computing device version of the OTT streaming application, wherein the user computing device version of the OTT streaming application comprises a digital trackpad configured to explore and navigate the equirectangular immersive content viewable on the connected TV using the digital trackpad installed on the user computing device version of the OTT streaming application on the separate user computing device, wherein the first SDK and/or the second SDK having the 360 degree digital media player includes capabilities to bypass a 360 degree image/video rotation function in the 360 degree digital media player when detecting standard, non-rotational images or video and (iv) activate 360 degree image/video rotation function when detecting immersive, rotational image/video.

In another aspect, the computer implemented method further includes that the first SDK and/or the second SDK further comprise capabilities to (ii) adjust a warp inherent with the equirectangular immersive content to portray a realistic aspect ratio of a subject or environment and to (iii) stitch edges of the equirectangular immersive content to provide seamless continuity in any x, y, or z axis to provide omnidirectional rotation within a viewable area of the 360 degree digital media player.

In another aspect, the computer implemented method further includes requesting access to the CBS or CDN that feeds image and video content to the OTT streaming application and detecting an aspect ratio of the image and video content, wherein any image and video content having the aspect ratio equal or above 2:1 is recognized as being immersive content, and wherein any image and video content having the aspect ratio under 2:1 is recognized as standard, non-immersive content.

In another aspect, the computer implemented method further includes labeling particular images and video content as being the immersive content while stored in the CBS or CDN and labeling particular images and video content as being standard, non-immersive content while stored in the CBS or CDN.

In another aspect, the computer implemented method further includes rotating a view of an immersive video streaming on the connected TV on the 360 degree digital media player, wherein the rotation is based on sliding or movement of figures on the digital trackpad on the separate user computing device.

In another aspect, the computer implemented method further includes automatically assigning a text of iconic label to any summary description of equirectangular immersive content appearing in a user menu of the OTT streaming application in order to allow users to identify content provided by the CDN or CBS as being immersive content.

In another aspect, the computer implemented method further includes recognizing and detecting when an immersive video is available and automatically replacing an existing selection button with a button having a label indicating access to immersive content is available to a user from a user menu on the OTT streaming application on the separate user computing device.

In another aspect, the computer implemented method further includes recognizing and detecting content that is available as both standard and immersive content through the CDN or CBS and adding an additional label indicating access to immersive content is available or a user can select to view the content in standard, non-immersive format.

In another aspect, the computer implemented method further includes uploading a static or animated banner ad that appears on a screen of the OTT streaming application on the separate user computing device simultaneously with an advertisement displayed on the connected TV, wherein the static or animated banner ad contains imagery and/or textual information that corresponds to an advertisement displayed on the connected TV, and wherein the static or animated banner ad includes a link or other means for a user to click and obtain further information about advertised content shown in the advertisement displayed on the connected TV.

In another aspect, the computer implemented method further includes detecting videos or images to be superimposed in rectangular containers superimposed in fixed surfaces of an environment filmed by 360 degree cameras, and submitting the videos or images to a warp effect based on a warped shape of the fixed surfaces in an equirectangular video signal, placing the videos or the images based on programmatic advertising protocols, and placing the videos or images manually through a broadcasting software in order to accommodate multiple targeted advertisements from a video publisher to serve viewers.

In another aspect, the computer implemented method further includes gaining access to a content scheduling screen in the CDN or ad server, embedding a button related to adding an audio source, triggering an appearance of a browse button, wherein an administrator and/or advertiser is enabled to add one or more new audio sources, wherein the one or more new audio sources comprise ambient sound, color commentary, music soundtrack, and sound effects, recognizing an addition of spatial audio tracks, and enabling spatial audio on headphones connected to the separate user computing device comprising the OTT streaming application and the digital trackpad.

In another aspect, the computer implemented method further includes recognizing and pairing the separate user computing device by scanning a QR code, a human readable passcode, or pairing via BLUETOOTH or another pairing protocol as a sole device authorized to command rotation of the equirectangular immersive content on the connected TV as controlled by a user from the separate user computing device and the OTT streaming application and the digital trackpad. The method may further include unlinking the separate user computing device upon request to unlink.

In another aspect, the computer implemented method further includes recognizing a one-finger sliding gesture on the digital trackpad as a click and drag action, wherein the one-finger sliding gesture commands rotation of an immersive video as the immersive video streams in the connected TV, wherein rotation is omnidirectional, recognizing a two-finger sliding vertical gesture on the digital trackpad as a zoom command, wherein the upward motion of the two-finger sliding gesture enlarges video content and shrinks a field of view contained in the 360 degree digital media player on the OTT streaming application on the connected TV, wherein a downward motion of the two-finger sliding gesture enlarges the field of view contained in the 360 degree digital media player on the OTT streaming application on the connected TV.

In another aspect, the method further includes recognizing two finger sliding horizontal gestures on the digital trackpad in order to switch a point of view to the user, and recognizing two-finger tapping on the digital trackpad to split a screen display on the connected TV.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
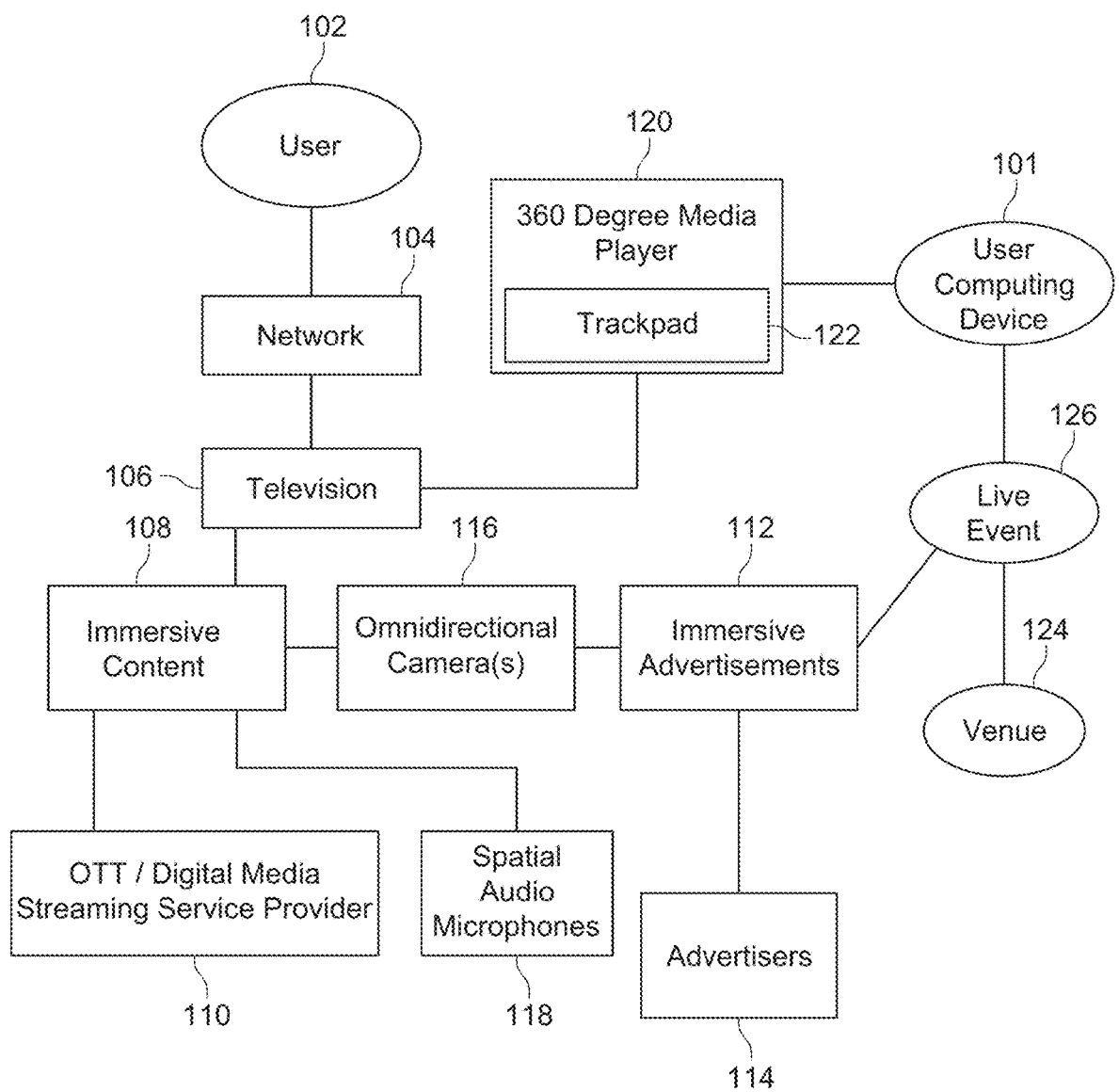
FIG. 1 depicts a block diagram that includes components of a system for viewing immersive content and immersive advertisements on a television that is connected to one or more connected TV devices.

The present description is drawn to an innovative computer implemented system for enabling 360-degree exploration of any immersive content or immersive advertisements offered by an over the top (OTT) media television streaming application from a variety of connected television (TV) devices. The term "connected TV device" may interchangeably be used herein with the term "digital media player." and may include gaming consoles and hardware enabled digital media players. In some embodiments, the user is enabled to watch and explore immersive content that ranges over a range that is less than 360-degrees, including from 100, 120, or 180 degrees range up to 360-degrees. In one embodiment, the user can watch and control a multitude of features related to the immersive content or immersive advertisements shown on the television using a 360-degree media player and a digital trackpad that is installed on either a separate application or integrated into a mobile version of the OTT television application on a user's smartphone or other type of user computing device. In other embodiments, the user can control the immersive content or the immersive advertisements using other types of connected TV devices, such as gaming consoles and hardware enabled digital media players (e.g., ROKU, FIRESTICK) that are enabled to include a 360-degree media player, in order to watch and control the features related to the immersive content or the immersive advertisement shown on the screen. The user has the ability to view any content or advertisement that was created with one or more virtual cameras or omnidirectional cameras that allow exploration in 360 degrees from multiple points of view and multiple angles using the method as described in one or more embodiments herein. Advantageously, the user does not have to own a VR headset or other type of virtual reality specialized device to view the immersive content and the immersive advertisements as displayed on the connected television device, which overcomes the deficiencies and problems presented above with respect to VR headsets. In other words, users will not risk injuring themselves or others or develop myopia and vision distortion using the method as described herein, which are very significant problems associated with VR headsets.

Further, the user is enabled to use their preferred user computing device while watching TV, which is usually the user's smartphone. The present system is enabled to allow the user to watch, navigate, and explore ITV using the 360-degree media player embedded in the user's computing device or smartphone. The 360-degree media player on the user's smartphone may include a digital trackpad that may be used to experience and explore the immersive content and immersive advertisements on the television screen. Advantageously, the 360-degree media player can be minimized or reduced so that the user can still view and utilize the digital trackpad to browse in the mobile version of the OTT or to browse and utilize any of the icons, functions, or features of the user's smartphone without interrupting or preventing their use of the digital trackpad to control and watch immersive content or immersive advertisements on the television screen. This is a tremendous advantage to the user who can browse their phone while also controlling the immersive content on the OTT television streaming application from the smartphone. Further, the user can control and interact with any immersive advertisements from their smartphone without impeding or prevention any browsing or utilization of other icons or applications or functions on the user's smartphone.

As further described below, immersive content and immersive advertisements may be created when the original content (whether it is a show, movie, musical, song, advertisement, etc.) of either the immersive content or immersive advertisements are shot and recorded using VR cameras (also known as omnidirectional cameras). Accordingly, users can explore images and scenes from multiple viewpoints and directions.

With respect to advertisements, there is a great need for immersive advertisements. Many in depth studies have shown that immersive advertisements (such as immersive advertisements 112) outperform their standard counterpart with a 300% increase in click-through rates and a 46% increase in video completion rate. Immersive (360-degree) advertisements attained a much higher interaction rate that standard 2D video ad experience, higher content recall, higher brand recall, and more product intent. Studies further show that when users interact with 360-degree advertisements displayed on a mobile device, that these advertisements achieve an 85% interaction rate as compared to the industry average of only 2.5% for digital advertising as a whole. Displaying this format in full-screen in a much larger screen, as it is the case of a connected (CTV) should yield even superior engagement from users.

In another embodiment, the present description further includes information about how it may be beneficial for advertisers and more receptive to a user to watch immersive advertisements that relate to and are presented during a live event watched by a large mass of people. Well known examples of such live events may include events such as the SUPERBOWL, the WORLD CUP, the OLYMPICS, the OSCARS, or any other type of event that is well-publicized and may be watched by a large group of people. Further, the computer implemented system allows the automatic insertion of a sponsor's pre-produced VR content in three dimensions with spatial audio for viewers to interact with via voice recognition or hand gestures on a second device. In a non-limiting embodiment, a viewer's voice input—captured by their mobile device microphone—is meant to activate one of multiple endings of the augmented reality content, in order to make the message more relevant to their preference. These multiple endings will be previously stored in the cloud server, along with the first portion of the advertisement. Once the content delivery is complete, the system may activate one of multiple instant messages to appear in the user's inbox section, which will route to any the sponsor's digital address. Said instant message from the sponsor can accommodate text, images, audio, and video.

The computer implemented system includes an array of cinematic virtual reality camera rigs positioned at a venue where a live event is to take place prior to the live event occurring. The cinematic virtual reality camera rigs capture multiple angles of the venue and after being mapped using 3D software, advertisers can create advertising content (e.g., ads or commercials) that incorporate various types of extended reality technology, including virtual reality technology content. As the viewer watches or listens to a live event being streamed on an event streaming application, downloaded or otherwise accessible to the viewer on his or her computing device, the viewer is provided with targeted, relevant ads in immersive video format, which will have the effect of capturing the viewer's attention because of the more dynamic, interactive experience with the extended reality advertisement and making the viewer more likely to be a customer in the future of an advertiser or to click/tap on the ad to learn more about a particular offer for a product or service offered by the advertiser. Further details are provided below with respect to the Figures.

Figure 3A:
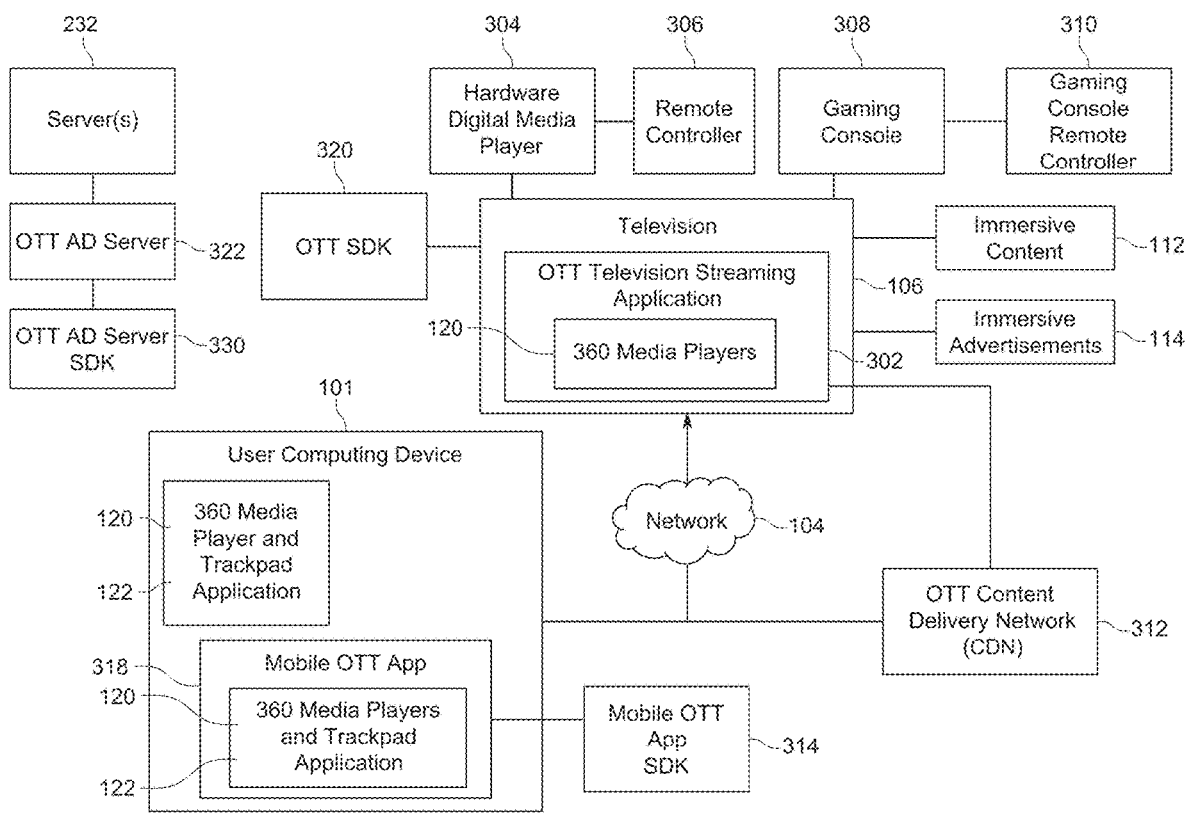
FIG. 3A depicts a block diagram with one or more components of a system for viewing immersive content and immersive advertisements on a television screen that incorporates a 360-degree media player and digital trackpad configured to control watching and exploring the immersive content and immersive advertisements.
Figure 3B:
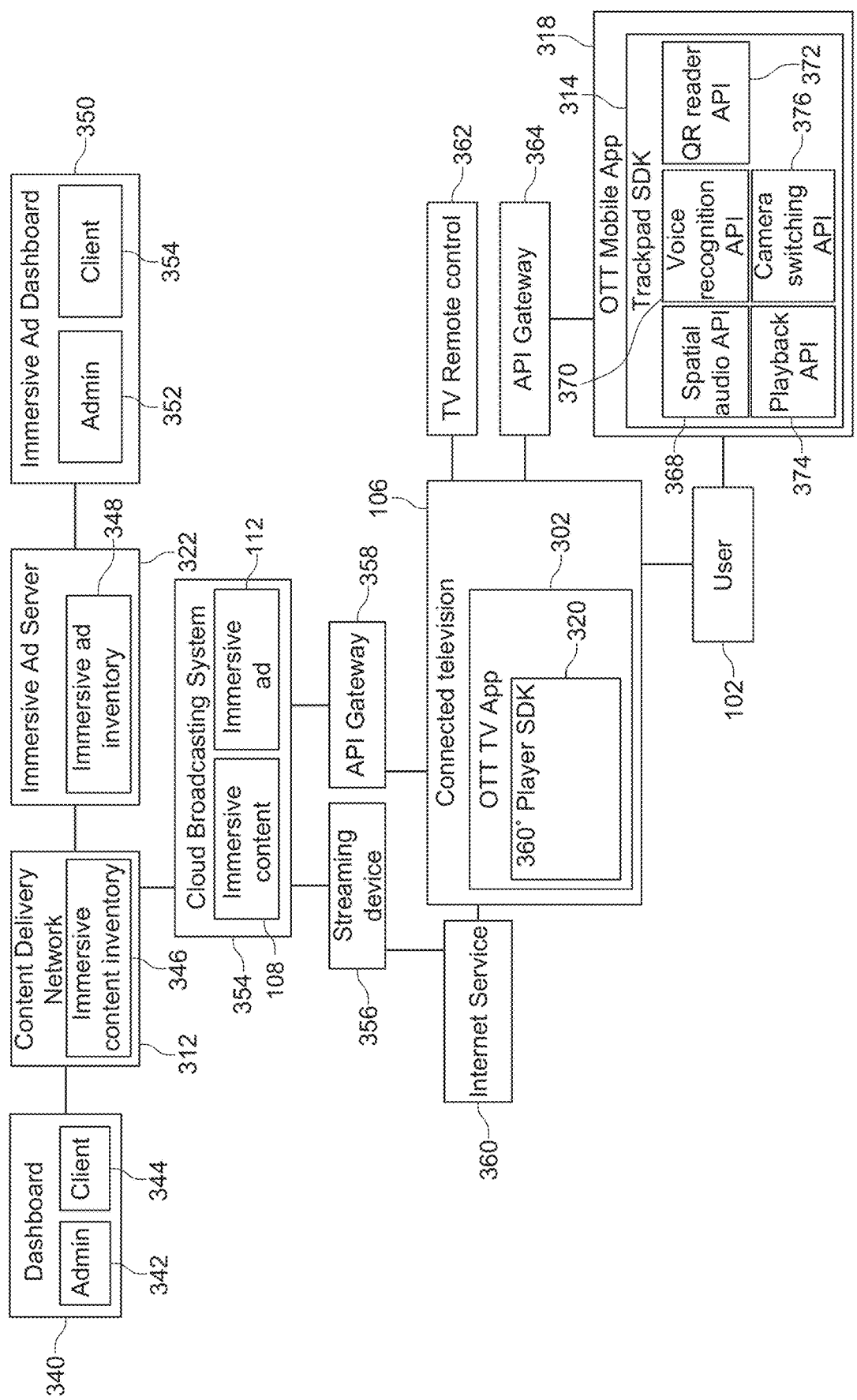
FIG. 3B depicts another block diagram with an overview of additional components related to the system shown in FIG. 3A.
Figure 3C:
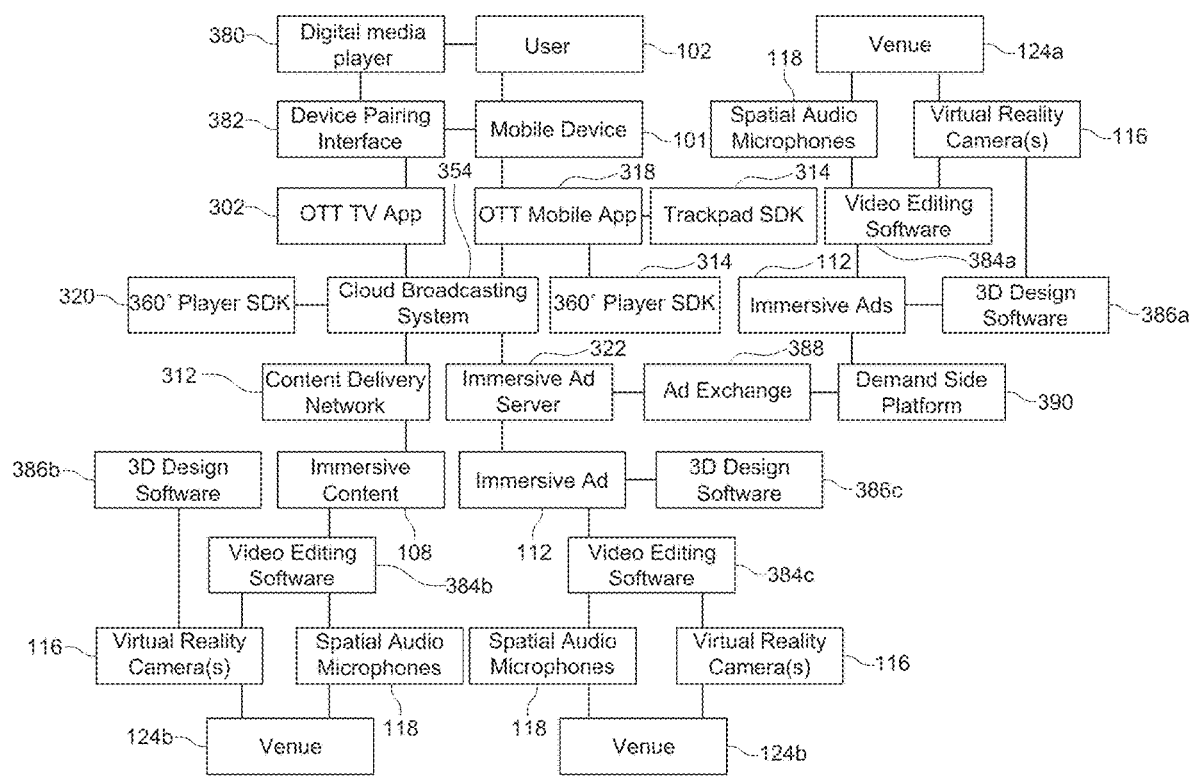
FIG. 3C depicts another block diagram with an overview of additional components related to the system shown in FIG. 3A.

FIG. 1 depicts a block diagram of a system for exploring immersive content 108 and immersive advertisements 112 on a television screen 106 using digital media players 380 (e.g., as shown in FIG. 3C) such as, but not limited to, a hardware enabled digital media players 304 or a gaming console 308 as shown in FIG. 3A. In a non-limiting embodiment, the television 106 can be interchangeably referred to as a "smart TV" or a "connected TV" that is capable of accessing the Internet (e.g., Internet service 360 as shown in FIG. 3C) over one or more networks 104. The connected TV may have the OTT television streaming applications 302 embedded or installed in the television 106 directly. Alternatively, the user 102 may indirectly view OTT streaming applications 302 installed on digital media players 380, such as the hardware enabled digital media player 304 (e.g., ROKU and FIRESTICK), whereby the user 102 typically inserts the hardware enabled digital media player 304 into a port of the smart television 106. Additionally, the user 102 may use a gaming console 308 which may also include OTT television streaming applications 302. As noted above, users greatly enjoy and want the ability to go beyond standard displays and presentations commonly seen on television, such as, but not limited to, television shows, movies, award shows, musicals, songs, sporting events, or interviews. Notably, the ability to view in 360 degrees any type of content and change the point of view shown to the user and to view the same content from a different angle is very appealing to the user and watcher and provides a more engaging and informative watching experience. The use of virtual reality headsets, unfortunately, has not been a successful attempt to integrate viewing content in 360 degrees for a wide mass of people for all of the reasons noted above, including many serious safety concerns about risk of injury to the user or others, and also the increase of myopia among VR headset wearers as well as the elevated costs associated with VR headsets.

It is noted that the term "immersive" as used herein, in one aspect, relates to the presentation and displaying of 360-degree videos or images (whether the images are based on real world views and recordings or include digital enhancements or are digitally produced) whereby the videos or images are stitched panoramic recordings in which a view in every direction over a full 360-degree range of a same scene or image is recorded simultaneously. These shots require at least one omnidirectional camera 116 or collection of omnidirectional cameras 116 set up to achieve the 360-degree view. Omnidirectional cameras 116 may also be referred to in the industry as "VR cameras" or "virtual reality cameras." Accordingly, the audiovisual content is not presented solely from one viewpoint to the user whereby the user has no choice but to watch that single viewpoint. Rather, the user can explore and navigate within the audiovisual content (whether the audiovisual content is an immersive based content as shown on a television screen relating to entertainment, news, music, sports, or any other genre or an immersive advertisement) and pan in multiple directions, including in a 360-degree direction to view a wider area of the same image or recording, or to view the same image or recording from a different angle. During playback on a normal flat display television 106 the viewer has control of the viewing direction like a panorama. To produce the 360-degree immersive content, the omnidirectional cameras 116 record the multiple shots from different viewpoints which are then digitally stitched together into a seamless set that the user explores and navigates to give the user the illusion of panning 360 degrees. Accordingly, the term "immersive content" refers to any type of content viewable on a television screen that includes the ability to pan in 360 degrees and navigate and explore that content. Further, the term "immersive advertisements" refers to any type of advertisement viewable on a television screen that includes the ability to pan in 360 degrees and navigate and explore that content. The term "immersive TV" refers to the combination of immersive content and immersive advertisements with standard or spatial audio on an OTT media streaming application.

In a non-limiting embodiment, one of the key advantages offered by the present description is the enabling of OTT/digital media streaming service providers 110 to provide immersive content 108 and/or immersive advertisements 112 to the user 102 and providing a 360 degree media player 120 having an embedded, usable digital trackpad 122 that can be used to watch, navigate, and explore the immersive content 108 from a 360 degree perspective using a variety of connected TV devices, including but not limited to, a user computing device 101 as shown in FIG. 1 as well as gaming consoles 308, and hardware enabled digital media players 304 as shown in FIG. 3A-FIG. 3B. Advantageously, the OTT television applications 318, as shown in FIG. 3A, provided by the OTT digital providers 110 may include and support immersive video playback and exploration as native features. As known in the industry. OTT refers to "over the top" content providers that provide content for viewing on multiple platforms and deliver the content using Internet services 360 through a network 104. That network 104 may be a Wi-Fi based network or a cellular based network, in one or more non-limiting embodiments.

Several well-known OTT/digital media streaming service providers 110 include NETFLIX, DISNEY+, HULU, AMAZON PRIME VIDEO, CURIOSITY STREAM, PLUTO, and many more. Further, there are many channels that are offered via cable or linear television that include their own OTT based application that can be installed on a television 106 that is connected to the internet over a network 104. For example, NBC which typically offers its content through cable on a television screen 106 also provides an OTT based application known as PEACOCK that can be watched on television 106 and provides the same content delivered by NBC but as an OTT television or mobile based application.

In a non-limiting embodiment. OTT digital media streaming service providers 110 may include OTT service companies. Video on demand (VOD) service companies, and even more specifically, streaming video on demand (SVOD), advertising-based video on demand (AVOD), free ad-supported TV (FAST), and transactional video on demand (TVOD) apps and services. As noted above, OTT stands for over-the-top streaming service, the term used for the delivery of video content through TVs with internet connectivity or TVs with added devices to provide connectivity, such as Apple TV. Amazon Fire Stick, and Roku. OTT does not necessarily require users to subscribe to a traditional cable or satellite pay TV service like COMCAST or TIME WARNER CABLE and can often require users to subscribe to the OTT directly. An OTT application disrupts the traditional delivery billing model and is delivered directly through an internet connection. Examples of OTT include services that are replacements for traditional TV providers include, but are not limited to HULU and NETFLIX, and can also include SKYPE.

A typical Video on Demand (VOD) service allows users to play back any one of a large collection of videos at any time. Companies such as ROKU, YOUTUBE, and NETFLIX are examples of VOD service companies. These VOD platforms enable audiences to pick and choose what they want to watch from their collections and access that content whenever they would like.

VOD is broadly divided into two major categories including VOD that requires a cable subscription and VOD that is delivered directly through an internet connection and may require direct subscription to the VOD service. VOD is video content that is controlled, enabled, and consumed whenever a viewer wants after its official release date or original air date and time. VOD content can be found on set-top boxes, OTT applications, desktop web, mobile web, mobile apps, and video streaming services.

The main business models associated with VOD deal with how the content is commercialized, and acronyms like SVOD. AVOD. TVOD, and FAST reflect a growing range of options available to content owners. VOD is sometimes referred to as OTT, in the case that the VOD service is accessible through an application made for TVs with Internet connectivity.

OTT is a subset of the overall VOD category, and it is transmitted to the viewer via the internet without necessarily requiring users to subscribe to a traditional cable or satellite pay-TV service like Comcast. There are multiple subcategories of VOD types within the OTT/VOD category.

One of the biggest ways OTT differs from other streaming video is what it offers to customers. On-demand streaming is a defining feature of OTT—the ability to give consumers constant, easy access to video content through their TV. In contrast, traditional television requires users to either watch at specified times or record episodes.

OTT video streaming also has considerable advantages over downloading, another main form of online video consumption. Consumers get much more content from OTT than they would normally get for the same price when downloading; OTTs can often offer supplemental access through other devices; and OTT does not take up valuable computer or device memory given it relies on downloading the content that the user chooses to watch, as opposed to the entire library of content. Subscription Video on Demand (SVOD) is a type of service that allows users to access an entire library of videos for a fixed recurring fee. This fee may be charged daily, weekly, monthly, or annually. The viewer can watch as many videos as they want on any connected device, as long as their subscription is active. NETFLIX and DISNEY+ are two examples of SVOD OTT services. Transactional Video on Demand (TVOD) is the opposite of SVOD. Users buy individual content on a pay-per-view basis. TVOD services will normally not charge anything to sign up for the service or create a user profile. Instead, users pay an amount based on the specific content they watch. TVOD viewers have added assurance that their purchased digital content will always be available on that cloud-based provider in a "digital locker," even if they stop actively using that particular service, meaning the user can access the purchased digital content any time after purchase. SKY BOX OFFICE is an example of a TVOD OTT service.

Ad-based Video on Demand (AVOD) is an ad-based digital video service that lowers the price to its users by accommodating sponsored content. In this model, ad revenue is used to offset production and hosting costs and monetize the content. SLINGTV, DIRECTV Stream, and FUBOTV are examples of AVOD OTT services. Viewers continue to migrate to streaming services year over year, giving advertisers a huge opportunity to leverage AVOD content for their campaigns. The solution proposed in this patent would qualify under this category.

Free ad-supported TV (FAST) is an ad-based digital video service that completely removes the cost to its users by accommodating sponsored content. PLUTO TV and SAMSUNG TV PLUS are examples of FAST OTT services. The one or more non-limiting embodiments described herein may be implemented with FAST OTT services as well as any other type of OTT services without limitation thereto.

In a non-limiting embodiment, various advertisers 114 represent branded content (i.e., sponsored content). Branded content may include companies or individuals or other entities that own and provide products and services needing to be advertised. Such examples may include, but are not limited to, COCA COLA, DUNKIN DONUTS. PROCTER AND GAMBLE. NIKE. Branded content are the companies or individuals or other entities who are responsible for hiring creative teams and production teams that create engaging and meaningful immersive advertisements with the purpose of selling goods and services or inspiring users to take action (e.g., downloading a mobile application, calling a number, visiting a website, spreading a message) 112, and they may hire teams that includes copywriters, graphic designers, musicians, editors, animators, etc.

In another aspect, if the content that is provided by the content provider, i.e, the OTT/digital medial streaming service provider 110 is recorded using an array of omni binaural microphones 118, as shown in FIG. 1, then the user 102 is enabled to listen to the immersive content 108 and immersive advertisements 112 that has spatial audio using headphones or earbuds that can connect to the one or more connected TV devices (e.g., user computing device 101, gaming console 308, hardware enabled digital media player 304), the television 106 or a mobile OTT application that is paired with the TV OTT application. It is noted that the headphones or earbuds may be wired or wireless. "Spatial audio" refers to audio that has been engineered to have a 3D quality to it, like that of a surround system but built for headphones. When the user 102 utilizes their headphones or earbuds to listen, there is more depth and accuracy in delivering quality audio as compared with traditional stereo sound. One major difference is the presence of a head-related transfer function, which accurately maintains the source of the sound, regardless of where the point of view is focused. The inclusion of spatial audio brings theater-like sound from the movie or video or other type of content the user 102 is watching, so that it seems as if the sound is coming in a 360-degree direction or from all around the user 102. Accordingly, it would be an ideal combination for the immersive content 108 or immersive advertisements 112 to be recorded and produced by the producers and creators of the immersive content 108 or immersive advertisements 112 using one or more omnidirectional cameras 116 and one or more spatial audio microphones 118. Once the content is created then the content can be distributed and made available to present to the viewing public, including any subscribers or viewers of OTT/digital media streaming service providers 110.

Further, in a non-limiting embodiment, spatial audio (a.k.a. binaural audio or 360-degree audio) may use an array of multiple microphones 118 pointed in different directions to capture the directionality and proximity of the sound during a recorded live event 126 at a venue 124. The spatialization of audio at the venue 124 may merge all of the nuances of the sound in a unique stereo signal to be connected to a head-related transfer function. This may enable users 102 to perceive how the sound shifts in intensity from one ear to the other as the user 102 turns his or her computing device 101 or trackpad functionality 122. Advertising content may also take advantage of this feature and include specialization of audio when the advertising content (that includes extended reality content) is displayed and aired to the viewer 102. Any type of advertisement may be configured to provide spatial audio (versus stereo audio) as provided by advertisers 114 and displayed on the smart television 106.

As noted above, the present description provides the ability for a 360-degree media player 120 to be included and integrated in the existing software of the OTT/digital media streaming service provider 110 that is configured to be displayed and viewed on a television 106. Typically, such smart televisions 106 may include their own touchscreens for manipulating the icons or other selectors on the screen or may also be operable using one or more TV remote controllers 362 (e.g., as shown in FIG. 3B). The 360-degree media player 120, as described herein, is a software that enables connected TV devices, such as a smartphone or tablet (which are examples of user computing devices 101), a gaming console 308, or a hardware enabled digital media player 304, to view, control, and explore immersive content 108 and immersive advertisements 112 using the remote controls of the connected TV devices. Notably, in as advantageously presented herein, the user 102 is enabled to use a digital trackpad or touchpad 122 that can simulate and provide all the control needed to select, watch, navigate, and explore the 360-degree immersive content 108 and 360-degree immersive advertisements 112 using the smartphone, for example, or another user computing device 101.

FIGS. 4A-4H provide multiple exemplary views of a digital trackpad 122 configured to control immersive content 108 and immersive advertisements 112 as displayed on a television screen 106. Effectively, the digital trackpad 122 can replace and take the place of a TV remote control or another type of remote control (e.g., such as the remote controls that come with gaming consoles 308 and hardware enabled digital media players 304) when operating and controlling and navigating the immersive content 108 and immersive advertisements 112. It is noted, that the 360-degree media player 120 and digital trackpad 122 can also be used to watch standard, non-360-degree content provided on a television screen 106. Advantageously, the digital trackpad 122 replaces other remote controllers and enables the user 102 to choose to watch a 360-degree audiovisual content or the standard two dimensional, non-360-degree audiovisual content.

Additional another advantage offered by the presently described system is that users 102 opting into the experience from the Internet-connected television application (e.g. OTT television application 302 shown in FIG. 3A-FIG. 3B on an Internet-connected television 106) can use the mobile application or user computing device OTT application 318, as shown in FIG. 3A, simultaneously, in which case, the digital trackpad 122 allows the user 102 to move their point of view of the 360-degree environment streamed onto the television 106 in real time. Further information about this feature is provided with respect to FIGS. 3A-3C.

Figure 5A:
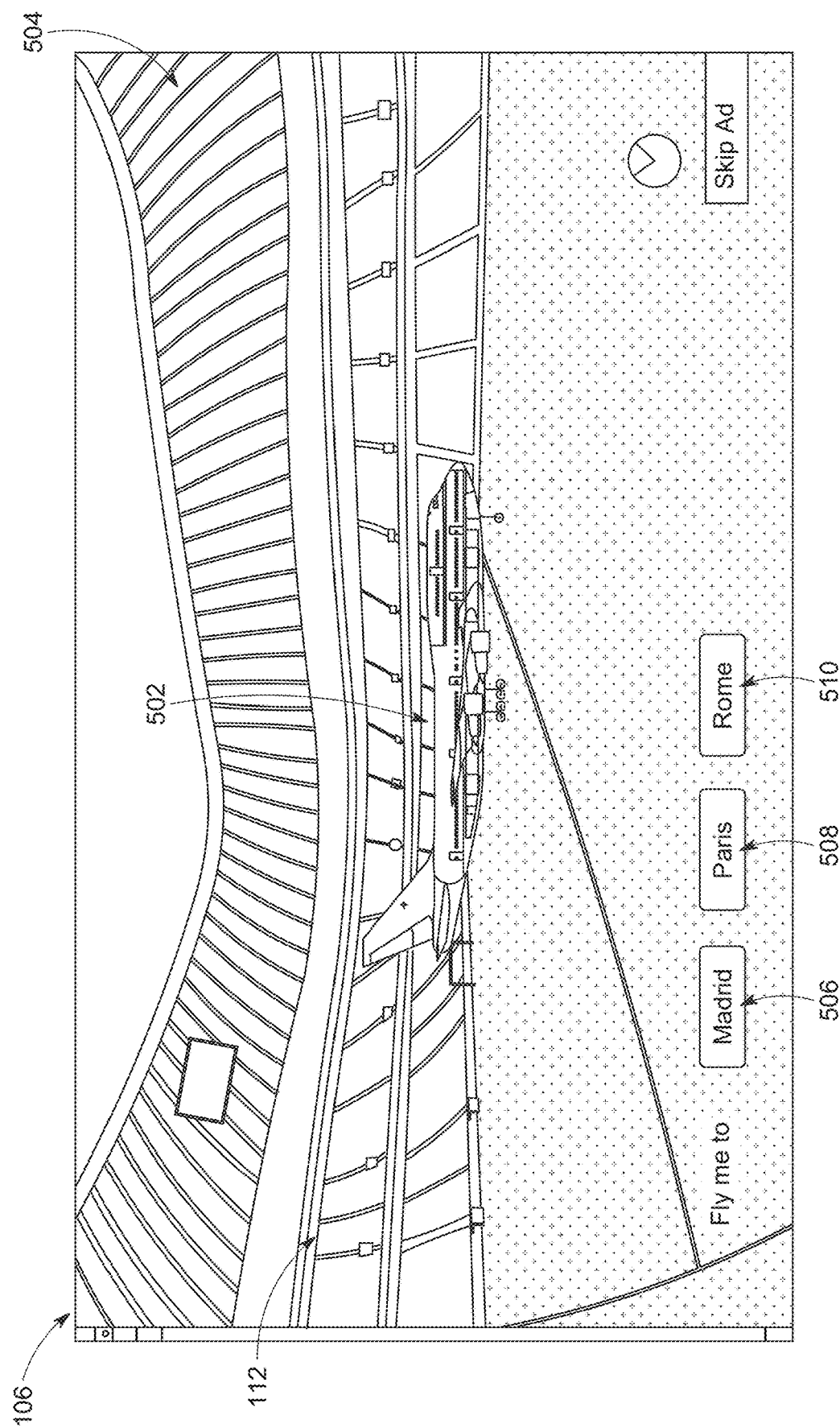
FIG. 5A depicts an exemplary immersive advertisement having variable endings.
Figure 5B:
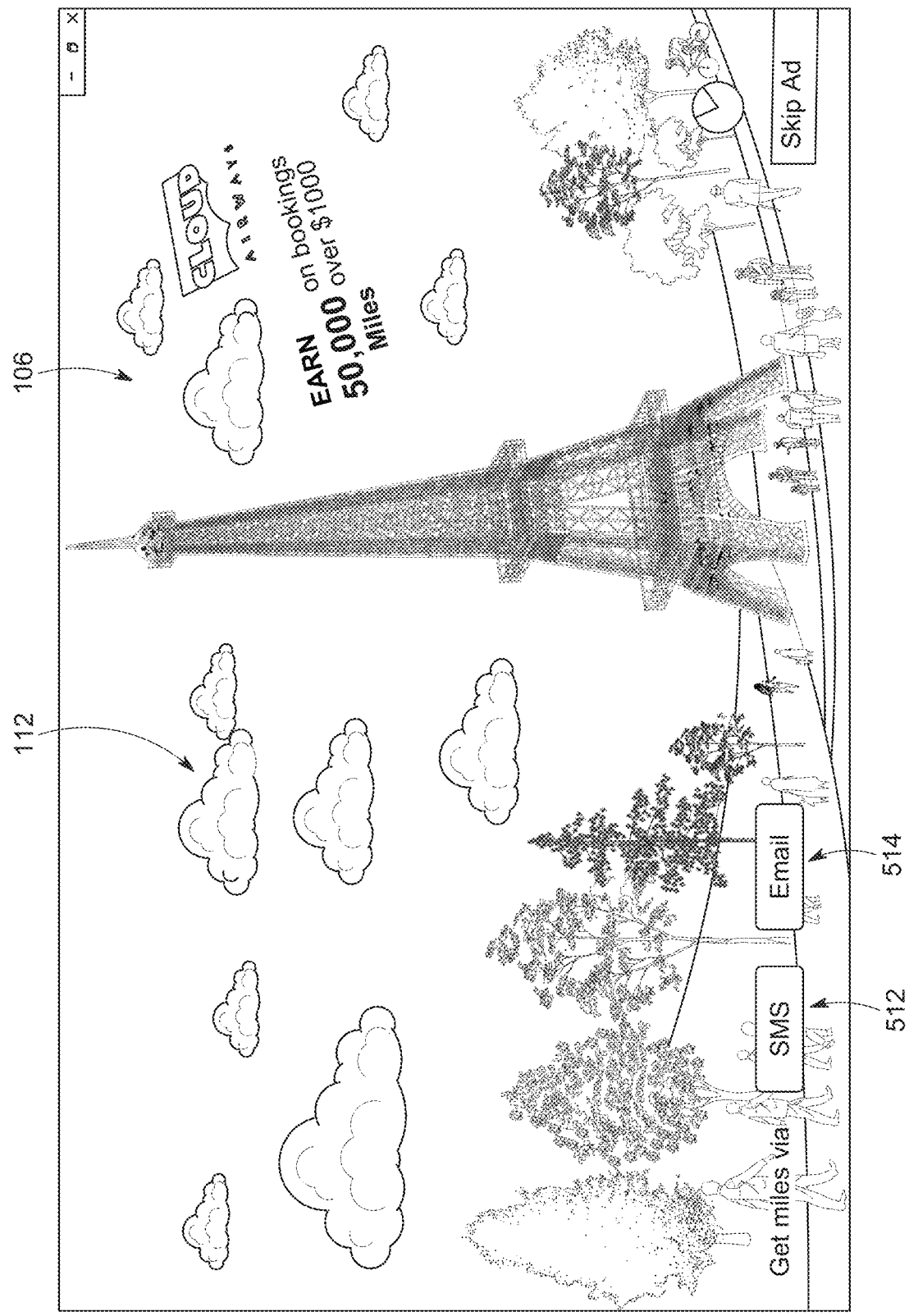
FIG. 5B depicts an exemplary secondary image that appears after a user selected a particular variable ending shown in FIG. 5A.

In another aspect, the present description includes details for immersive advertisements 112 to be more interactive and more engaging with the users 102. As shown in FIGS. 5A-5B, immersive advertisements 112 may be configured to include variable endings that require user selection and user participation and that also present the advertisement content in 360 degrees. The 360 media player 120 may be used along with the digital trackpad 122, in one or more instances, to control and navigate such immersive advertisements 112 that may or may not include variable endings (e.g., as shown in FIG. 5A-5B).

Further, in one or more non-limiting embodiments, for live events 126 that are watched by a large mass of people, it may be particularly advantageous for advertisers 114 and brand producers to provide immersive advertisements 112 that are more creative and tailored to the themes and locations of the live event 126 and also may take into account the spatial layout of the venue 124 where the live event 126 takes place to make the immersive advertisement 112 that much more appealing and engaging for the user 102 to watch and engage with from start to finish. The goal of the advertisers 114 producing and offering an immersive advertisement 112 is to generate a greater percentage of viewers that watch the full immersive advertisement 112 from start to finish and who may even click on and select options that enable the advertiser 114 to receive user feedback and personal information about the user 102. Further details are described below with respect to FIGS. 5A-6 regarding these aspects of the present description.

Figure 2:
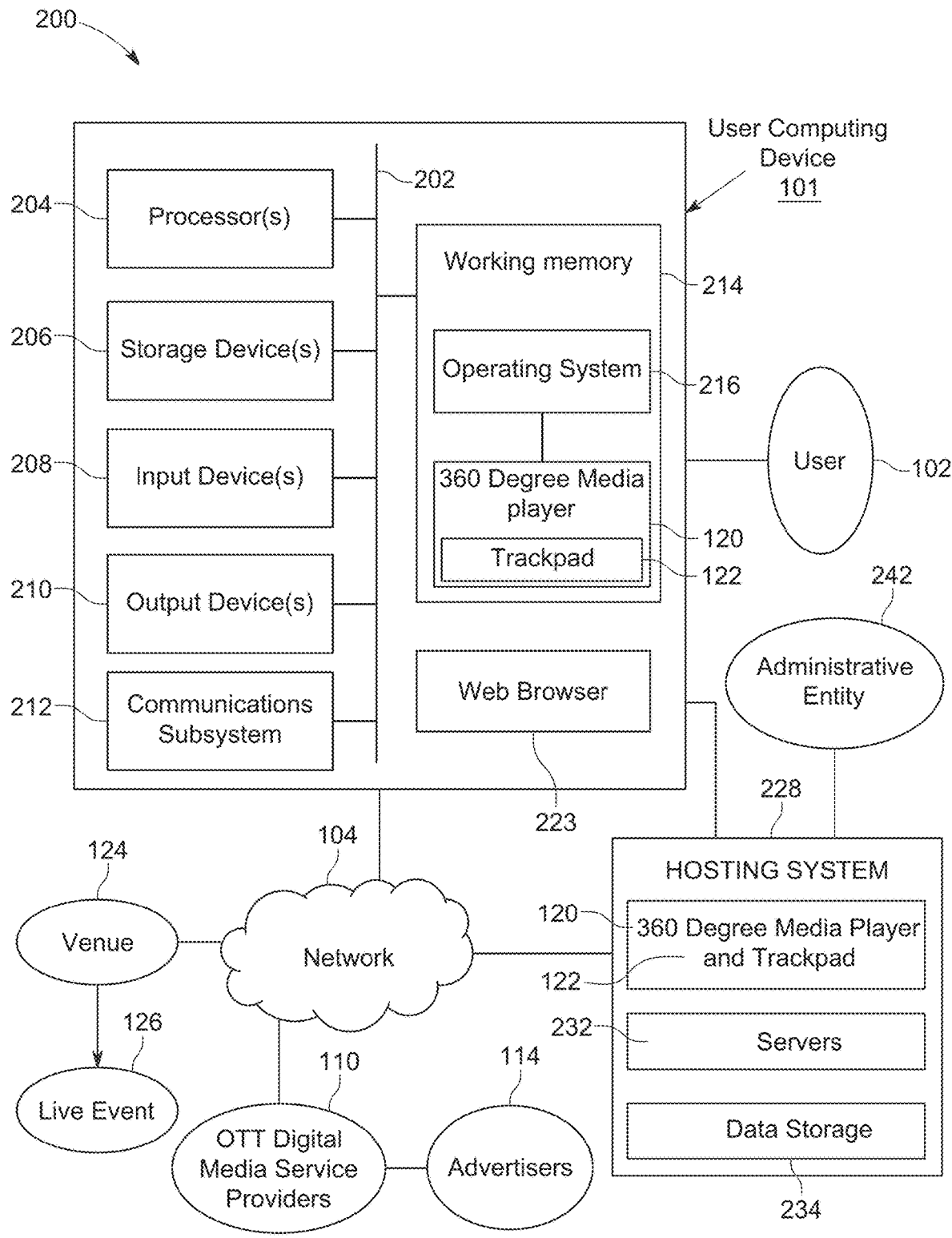
FIG. 2 depicts a block diagram for one or more components that make up a user computing device and a system for presenting immersive TV which comprises immersive content and immersive advertisements.

Turning to FIG. 2, FIG. 2 illustrates an exemplary system for one or more computing devices and the various exemplary components that may be employed in practicing one or more non-limiting embodiments of the invention as described herein. User computing device 101 may be any type of computing device known or to be created in the future. This may include, without limitation, fixed in place computers, such as desktop computers, or mobile computing devices. Mobile computing devices may include, but are not limited to, laptop computers, smartphones, mobile phones, tablets, wearable electronic computing devices such as watches or glasses, or any other type of mobile electronic, computing device.

FIG. 2 provides a schematic illustration of one embodiment of a computing device 101 that can perform the methods provided by the various other listed embodiments, as described herein, and/or can function as the host computer system, a remote kiosk/terminal, a point-of-sale device, a mobile device, a set-top box and/or a computer system. FIG. 2 is meant only to provide a generalized illustration of various components, any or all of which may be utilized as appropriate. FIG. 2, therefore, broadly illustrates how individual system elements may be implemented in a relatively separated or relatively more integrated manner.

Computing device 101 may be any type of information handling system, including, but not limited to, any type of computing device as noted above. To reiterate, this may include small handheld devices, such as handheld computer/mobile telephones or may include large mainframe systems, such as a mainframe computer. Further examples of computing devices 101 may include, but are not limited to, laptops, notebooks, workstation computers, personal computer systems, televisions with Internet connectivity, as well as servers (e.g., servers 232).

In one or more embodiments, computing device 101 is in communication with one or more networks, such as network 104. Network 104 may include a local area network (LAN), such as a company Intranet, a metropolitan area network (MAN), or a wide area network (WAN), such as the Internet or World Wide Web. Network 104 may be a private network, a public network, or a combination thereof. Network 104 may be any type of network known in the art, including a telecommunications network, a wireless network (including Wi-Fi), and a wireline network. Network 104 may include mobile telephone networks utilizing any protocol or protocols used to communicate among mobile digital computing devices (e.g., computing device 101), such as GSM, GPRS, UMTS, AMPS, TDMA, or CDMA. In one or more non-limiting embodiments, different types of data may be transmitted via network 104 via different protocols. In further non-limiting other embodiments, computing device 101 may act as a standalone device or may operate as a peer machine in a peer-to-peer (or distributed) network environment.

Network 104 may further include a system of terminals, gateways, and routers. Network 104 may employ one or more cellular access technologies including but not limited to: 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices if, for instance, they are in a remote location not accessible by other networks.

The computing device 101 is shown comprising hardware elements that can be electrically coupled via a bus 202 (or may otherwise be in communication, as appropriate). The hardware elements of computing device 101 may include one or more processors 204, including without limitation one or more general-purpose processors and/or one or more special-purpose processors (such as digital signal processing chips, graphics acceleration processors, and/or the like). Computing device 101 may further include one or more input devices 208, which can include without limitation one or more cameras, sensors (including inertial sensors), a mouse, a keyboard and/or the like. A camera incorporated on computing device 101 may be used to view one or more live events, such as live event 126.

In addition to the above, computing device 101 may include one or more output devices 210 such as the device display. Furthermore, in some embodiments, an input device 208 and an output device 210 of computing device 101 may be integrated, for example, in a touch screen or capacitive display as commonly found on mobile computing devices as well as desktop computers and laptops.

The computing device 101 may further include (and/or be in communication with) one or more non-transitory storage devices 206, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. Device storage may be used in a number of embodiments discussed herein. Further, the storage devices 206 may be non-volatile data storage devices in one or more non-limiting embodiments. Further, computing device 101 may be able to access removable nonvolatile storage devices 206 that can be shared among two or more information handling systems (e.g., computing devices) using various techniques, such as connecting the removable nonvolatile storage device 206 to a USB port or other connector of the information handling systems.

The computing device 101 might also include a communications subsystem 212, which can include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or the like. The communications subsystem 212 may permit data to be exchanged with a network (e.g., such as network 104), other computer systems, and/or any other devices. In many embodiments, the computer system 200 will further comprise a non-transitory memory 214, which can include a RAM or ROM device, as described above.

The computing device 101 or system 200 also can comprise software elements, shown as being currently located within the memory 214, which in some instances may including an operating system 216, device drivers, executable libraries, and/or other code, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer). In an aspect, then, such code and/or instructions can be used to configure and/or adapt computing device 101 to perform one or more operations in accordance with the described methods.

A set of these instructions and/or code might be stored on a computer-readable storage medium, such as the storage device(s) 206 described above. In some cases, the storage medium might be incorporated within a computer system, such as computing device 101. In other embodiments, the storage medium might be separate from computing device 101 (e.g., a removable medium, such as a compact disc or USB stick), and/or provided in an installation package, such that the storage medium can be used to program, configure, and/or adapt a general purpose computer with the instructions/code stored thereon. These instructions might take the form of executable code, which is executable by the computing device 101 and/or might take the form of source and/or installable code, which, upon compilation and/or installation on the computing device 101 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computing device 101) to perform methods in accordance with the disclosure. For example, some or all of the procedures of the described methods may be performed by the computing device 101 in response to one or more processors 204 executing one or more sequences of one or more instructions (which might be incorporated into the operating system 216 and/or other code contained in the memory 214). Such instructions may be read into the memory 214 from another computer-readable medium, such as one or more of the storage device(s) 206. Merely by way of example, execution of the sequences of instructions contained in the memory 214 might cause the one or more processors 104 to perform one or more procedures of the methods described herein.

The terms "machine-readable medium" and "computer-readable medium." as used herein, refer to any medium that participates in providing data that causes a machine to operate in a specific fashion. In an embodiment implemented using the computing device 101, various computer-readable media might be involved in providing instructions/code to the one or more processors 204 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media may include, for example, optical and/or magnetic disks, such as the storage device(s) 206. Volatile media include, without limitation, dynamic memory, such as the memory 214. Transmission media may include, without limitation, coaxial cables, copper wire and fiber optics, including the wires that comprise the bus 202, as well as the various components of the communications subsystem 212 (and/or the media by which the communications subsystem 212 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 204 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 200. These signals, which might be in the form of electromagnetic signals, acoustic signals, optical signals and/or the like, are all examples of carrier waves on which instructions can be encoded, in accordance with various embodiments of the invention.

The communications subsystem 212 (and/or components thereof) generally will receive the signals, and the bus 202 then might carry the signals (and/or the data, instructions, etc. carried by the signals) to the memory 214, from which the one or more processors 204 retrieves and executes the instructions. The instructions received by the memory 214 may optionally be stored on a non-transitory storage device 206 either before or after execution by the processor(s) 204.

In one or more non-limiting embodiments, a computing device, such as computing device 101 may include a web browser such as web browser 223. Web browser 223 may be any type of web browser known in the art that may be used to access one or more web applications (e.g., 360 media player 120 application) on user computing devices 101 or the like. Web applications are applications that are accessible by network 104 and may be located on the Internet or World Wide Web. Web browser 223 may include a variety of hardware, software, and/or firmware generally operative to present a web application to a user via a display device 210 (e.g., touchscreen or other type of monitor or display device) on a computing device. Examples of suitable web browsers include, but are not limited to, GOOGLE CHROME, MICROSOFT EXPLORER, MOZILLA FIREFOX, and APPLE SAFARI. Web browser 223 may be previously installed by the manufacturer or company associated with the computing device 101, or alternatively, may be downloaded onto computing device 101 or any other computing device. Web browser 223 may be stored in storage device 206 or memory 214.

In one or more non-limiting embodiment, 360 degree media player 120 may be a software program or module that can be configured to allow a user to control immersive content 108 and immersive advertisements 112 on an OTT/ digital media streaming service provider 110 on a television 106 using a connected TV device, including, but not limited to a smartphone or other type of user computing device 101 that has a mobile version of the 360 degree media player 120 and that further includes a digital track pad 122. Other connected TV devices may include, but are not limited to, hardware enabled digital media players 304 (e.g., ROKU and FIRESTICK) as well as gaming consoles 308 (e.g., PLAYSTATION and XBOX).

Further, in a non-limiting embodiment the immersive advertisements 112, as shown in FIG. 1, may be displayed and presented as if positioned in a venue 124 associated with a well-known live event 126. The live event 126 may be streamed or presented on an OTT/digital media streaming application 302, as shown in FIGS. 3A-3B, on a television 106 and the 360 degree media player 120 may enable viewing the immersive aspects of the live event 126 and for any immersive advertisements 112 that correlate to or are aired during the live event 126. In a non-limiting embodiment, the live event 126 may be any type of live event made available to the public. In one or more non-limiting embodiments, live event 126 may be publicized on a mass scale and reach a large watching audience. Non-limiting examples of such live events 126 may include the Super Bowl, World Cup, or World Series. Live event 126 may relate to any type of industry or field, whether the industry or field relates to sports, entertainment, music, news, the arts, or any other type of industry or field. The live event 126 may be held at a venue, such as venue 124. Venue 124 may be any type of venue known in the art, including stadiums, concert halls, theaters, stages, or any other type of venue or location as desired.

In one or more non-limiting embodiments. 360-degree media player 120 may be implemented as a downloadable program or application storable on user computing device 101 for easy accessibility and viewability in one or more non-limiting embodiment. Further, 360-degree media player 120 may be integrated into other applications as a software update, as shown in FIG. 3A and explained with respect to FIG. 3A, and with respect to the OTT television streaming application 302 and the user computing device version of the OTT television streaming application 318.

In one or more non-limiting embodiments, hosting system 228 may be a cloud-based type hosting system. "Cloud-based" is a term that refers to applications, services, or resources (e.g., 360-degree media player 120 and trackpad 122) made available to users on demand via a network, such as network 104, from a cloud computing provider's server, such as cloud-based server 232. Administrative entity 242 may be the cloud computing provider and may use servers 232 to provide access to data storage 234 and other systems that work in conjunction with the operation and maintenance of 360-degree media player 120 and trackpad 122.

Hosting system 228 may include data storage systems 234 that can provide access to stored data by applications running on computing devices, such as computing device 101, that may be geographically separate from each other, provide offsite data backup and restore functionality, provide data storage to a computing device with limited storage capabilities, and/or provide storage functionality not implemented on computing device 101.

The hosting system 228 can be implemented such that client applications (for example, executing on computing device 101) can store, retrieve, or otherwise manipulate data objects in the hosting system 228. The hosting system 228 can be implemented by one or more server devices 232, which may be cloud-based server devices, which can be implemented using any type of computing device.

In one or more non-limiting embodiments, administrative entity 242 is the provider and creator of 360-degree media player 120 and trackpad 122. Administrative entity 142 may make 360-degree media player 120 and trackpad 122 available to any client or user, such as user 102, who wants to use the features of 360-degree media player 120 and trackpad 122. Administrative entity 242 may be able to manipulate and alter 360-degree media player 120 and trackpad 122 remotely so as to affect the operation and maintenance of 360-degree media player 120 and trackpad 122 on server(s) 232 and as stored on one or more data storage devices 234 that are part of the hosting system 228. While administrative entity 242 is depicted as a single element communicating over network 104 and through the hosting system 228, it is noted that administrative entity 242, in one or more non-limiting embodiments, may be distributed over network 104 in any number of physical locations.

In one or more non-limiting embodiments, administrative entity 242 may store and/or host one or more immersive advertisements 114 and other standard video advertisements on servers 232. In particular, the immersive and standard video advertisements 114 may be pulled from an OTT Ad server 322 as shown in FIG. 3A and hosted on the cloud-based servers 232 associated with administrative entity 242, then undergo an automatic auction process (also known as real-time bidding or programmatic bidding) in the ad server to determine which ad will be served to the user (based on price bid and targeting criteria), and then routed to the 360-degree media player embedded in the OTT television streaming application 302 on a user's television 106 while being controlled via one or more connected TV devices (e.g., such as a smartphone or tablet (which are examples of user computing devices 101), a gaming console 308, or a hardware enabled digital media player 304, to view, control, and explore immersive content 108 and immersive advertisements 112.) Further, in another aspect, the administrative entity 242 may store and/or host live capture content from venue 124 as well as any immersive advertisements 112.

In one or more non-limiting embodiments, 360-degree media player 120 and trackpad 122 may be included a software update along with the OTT television application 302 and along with the user computing device version of the OTT television application 318 as shown in FIG. 3A-FIG. 3B. As noted below, one or more software development kits (e.g. SDK 314 and SDK 320) may be provided to integrate the 360 degree media player 120 and trackpad 122 into the user computing device version of the OTT television application 318 and to integrate the 360 degree media player 120 into the OTT television application 302.

Further, in one or more non-limiting embodiments, 360 degree media player 120 and trackpad 122 may be a downloadable software module that is capable of being downloaded and stored directly on a computing device, such as computing device 101, and/or accessible from the cloud or other system via network 104. Accordingly, any user may be able to download 360-degree media player 120 and trackpad 122 on computing device 101 as a computer-based application and software module that runs using the working engines and modules on the computing device 101. In some embodiments, 360-degree media player 120 and trackpad 122 may be preinstalled on computing device 101 or any other computing device by the manufacturer, designer, or other entity, 360-degree media player 120 and trackpad 122 may be innate, built into, or otherwise integrated into existing platforms such as, without limitation thereto, a website, third-party program, iOS™, Android™, Snapchat™, Getty Images™, Instagram™, Facebook™, or any other platform capable of transmitting, receiving, and presenting data.

360-degree media player 120 and trackpad 122 may be stored on computing device 101 and may also be stored or otherwise accessible by one or more servers 232 over network 104 by any party. The storage devices 206 may include a non-transitory computer readable medium including instructions, which when executed by a computer or processor (such as processors 204) may cause the computer or processor to perform operations to implement 360-degree media player 120 and trackpad 122. Further information about other components of 360-degree media player 120 and trackpad 122 are included below with respect to FIGS. 3-7.

Specific details are given in the description to provide a thorough understanding of the embodiments. However, embodiments may be practiced without these specific details. For example, well-known circuits, processes, algorithms, structures, and techniques have been shown without unnecessary detail, in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Further, processors 104 of computing device 101 may perform the associated tasks.

FIG. 3A shows a pictorial illustration of one or more components that may be part of a system, as shown in FIG. 1 and in FIG. 2, that allows immersive content 108 and immersive advertisements 112 to be viewed on television 106 using a variety of connected TV devices. FIG. 3B and FIG. 3C further add to the detail of the components of the system shown in FIG. 3A.

As described above and as shown in FIG. 3A, the user 102 can view immersive content 106 and immersive advertisements 112 on television 106 by using a user computing device 101 having an integrated 360-degree media player 120 and digital trackpad 122 to control the watching, exploration, and navigation of the immersive content 108 and immersive advertisements 112 in 360 degrees. In a non-limiting embodiment, the user computing device 101 is preferably a smartphone. In other embodiments, the user computing device 101 may be a tablet or any other type of user computing device 101. As shown in FIG. 3B, in one or more non-limiting embodiments, the user 102 can also use the television remote control 362 of the connected television 106 also to explore and navigate the immersive content 108 and immersive advertisements 112, once the 360-degree media player 120 is integrated into the software of the OTT television streaming application 302.

Further, the user 102 is enabled to view, navigate, and explore the immersive content 108 and the immersive advertisements 112 using the remote controller 306 of a hardware enabled media player 304, whereby the hardware enabled media player 304 includes an installation of the 360-degree media player 120 and the 360-degree media player 120 is included in the software of the hardware enabled media player 304.

Further, the user 102 is enabled to view, navigate, and explore the immersive content 108 and the immersive advertisements 112 using the remote controller 310 of a gaming console 308, whereby the gaming console 308 includes an installation of the 360-degree media player 120 and the 360-degree media player 120 is included in the gaming console 308. Any of the control buttons, joysticks, or other included output devices of the remote controller 310 of the gaming console 308 or the remote controller 306 of the hardware digital media player 304 can be used to control the 360 degree media player 120 integrated into the OTT television application 302.

With respect to the hardware enabled media player 304, examples of such hardware enabled media players 304 include, but are not limited to, ROKU and FIRESTICK. A hardware enabled media player 304 is a self-contained device that can plug into a port of the television 106. The hardware enabled media player 304 includes a multitude of streaming channels and applications, including OTT television streaming applications 302 that present content of interest to the user 102. Hardware enabled media players 304 typically include their own remote controller 306 that the user 102 can use to select features of the hardware enabled media player 304. The remote controller 306 of the hardware enabled media player 304 include playback controller buttons or selectors as well as the ability to scroll through and select particular channels or applications accessible via the hardware enabled media player 304.

As used herein, a gaming console 308 may be any type of gaming console. Examples of gaming console 308 include, but are not limited to, PLAYSTATION and XBOX. Gaming consoles 308 are capable of connecting to the television 106. Notably, the gaming consoles 308 can provide access to OTT television applications 302. The gaming consoles 308 are usually provided with their own gaming console remote controllers 310.

In a non-limiting embodiment, the user 102 may want to be able to view immersive content 108 and immersive advertisements 112 using a hardware enabled digital media player 304 or a gaming console 308.

Notably, the 360-degree media player 120 is integrated into the software of the OTT television streaming application 302 designed for the television 106. In a non-limiting embodiment, an OTT television streaming application software development kit (SDK) 320 is included or otherwise integrated into the OTT television streaming application 302 in order for immersive content 108 and immersive advertisements 112 to be viewed in 360-degree on the television 106. A software development kit (SDK), as known by one of ordinary skill, is a set of software tools and programs made available to help easily integrate features in the SDK with other applications, such as the OTT television streaming application 302. Accordingly, the OTT television SDK 320 may include any documentation, application programming interfaces (APIs), code samples, libraries, and processes, as well as guides that the OTT providers 110 can use and integrate into their OTT television streaming applications 302. In a non-limiting embodiment, the administrative entity 242 may provide the OTT television SDK 320 to any OTT providers 110 or other parties to utilize the OTT television SDK 320 to enable the OTT television streaming applications 302 to include within its software the 360-degree media player 120.

The OTT television SDK 320 allows the OTT providers 110 or another party to build and maintain the OTT television application 302 integrating the 360-degree media player 120 without having to write everything from scratch as everything is prebuilt into the OTT television SDK 320. Notably, the OTT television SDK 320 (and any other SDKs described herein and shown in FIG. 3 including user computing device OTT application SDK 314 and OTT AD Server SDK 330) may include libraries or application programing interfaces (APIs), which are pre-defined pieces of code that let developers perform programming tasks on the platform. Further, these SDKs may include integrated development environment (IDE), which is a visual editor that helps developers design and layout graphical elements, such as text boxes and buttons, as well as tools to help developers do such tasks as debugging, building, running, and testing of the OTT television application 302 or of the user computing device OTT application 308.

When the OTT television application 302 is enabled to include the 360-degree media player 120 via utilization or installation of the OTT television SDK 320, the user 102 can view any immersive content 108 or immersive advertisements 112 using a number of connected TV devices, including but not limited to, the hardware enabled digital media player 304 and the gaming console 308 as well as any user computing devices 101 (e.g., smartphones, tablets. PCs). Accordingly, the OTT television applications 318 may include and support immersive video playback and exploration as native features. In such embodiments, a user 102 may utilize the remote controller 306 of the hardware enabled digital media player 304 to navigate and explore the immersive content 108 and immersive advertisement 112 (i.e., 360-degree audiovisual content) offered by or displayed on the OTT television application 302. Further, the user 102 may utilize the gaming remote controller 310 of the gaming console 308 to navigate and explore the immersive content 108 and immersive advertisements 112 (i.e., 360-degree audiovisual content) offered or displayed on the OTT television application 302. Accordingly, the user can utilize the remote control 306 of the hardware enabled media player 304 and/or the remote control 310 of the gaming console 308 to play back, select, forward, power on or off, or perform any other function offered by the remote controllers 306 and 310 while watching immersive content 108 and/or immersive advertisements 112 on the television 106.

Notably, in a particularly useful non-limiting embodiment, the present description makes it possible for the user 102 to watch, playback, and explore the immersive content 108 and immersive advertisement 112 using a digital trackpad 122 that is visible in the 360-degree media player 120 installed on the user computing device 101. In a non-limiting embodiment, the user computing device 101 may be a smartphone. FIGS. 4E-FIG. 4H depict exemplary images of a smartphone 101 having an exemplary 360-degree media player 120 and digital trackpad or touchpad 122 that is useable for watching, exploring, and navigating immersive (360) degree content 108 and advertisements 112 using the digital trackpad 122 and the additional features and functions of the 360-degree media player 120 on the user computing device 101 (e.g., smartphone or tablet). As noted above, many users 102 spend prolonged amounts of time on their smartphones in particular and it may be preferable for such users 102 to be able to watch their television 106 and control the viewing experience of watching any content displayed on the television 106 using the digital trackpad 122 on the user 102's smartphone or other type of computing device 101. It is noted that the digital trackpad 122 can be used to watch any type of content displayed on the television 106, whether the content is immersive (i.e., recorded and produced using omnidirectional cameras 116 that allow 360-degree exploration of the final assembled video or other type of content) or standard. The term "standard" as used herein means that the content or advertisement displayed on the television 106 is in in 2D format and therefore not able to be explored in 360 degrees.

In order for the user computing device version or mobile OTT application 318 to include the 360-degree media player 120 and digital trackpad 122, a mobile OTT application SDK 314, as shown in FIG. 3A-FIG. 3C has to be installed also and integrated with the mobile OTT application 318. It is noted that the terms "user computing device version" and "mobile" as used herein are interchangeable and refer to the mobile OTT application 318.

Once the mobile OTT application SDK 314 is installed and integrated with the mobile OTT application 318, a 360-degree media player 120 having a digital trackpad 122 is included as a part of the functions and features of the mobile OTT application 318. FIG. 4E shows an example of such a 360-degree media player 120 and digital trackpad 122 available in an exemplary mobile OTT application 318 and useable by a user to control the same immersive content 108 or immersive advertisement 112 on the television 106. The exemplary mobile OTT application 318 is shown to be the ESPN+ application, which is an example of a well-known mobile OTT application 318 offering sports related content, including the ability to view sports related events.

There may be a mobile OTT application SDK 314 for each mobile OTT application 318 available and useable on the user computing device 101. As there are often multiple OTT television streaming applications 302 on the Internet connected 360 (e.g., as shown in FIG. 3B) television 106, that a user 102 can use to watch the specific content provided by a specific OTT television streaming application 302, the user 102 can download onto their user computing device 101 (e.g., smartphone or tablet) the mobile version of the OTT television streaming application 318 corresponding to each OTT television streaming application 302.

FIG. 3B and FIG. 3C, as well as FIG. 3A, help to clarify the process of distribution and creation of the immersive content 108 and immersive advertisements 112. Normally, any content offered on an OTT television streaming application 302 is obtained from a content delivery network (CDN) 312, as shown in FIG. 3A. A content delivery network (CDN) refers to a geographically distributed group of servers that work together to provide fast delivery of Internet content. Typically, CDNs are used to provided standard (non-immersive content) to the OTT television streaming applications 302, and utilize a geographically distributed network of proxy servers and their data centers. As shown in FIG. 3A and in FIG. 3B, the CDN 312 can be also utilized to include immersive content inventory 346 hosting immersive content 108 that is appealing and could be shown or aired on the OTT television streaming applications 302 and the mobile OTT application 318. In a non-limiting embodiment, the dashboard 340 may be utilized to gain access to the immersive content inventory 346. For example, administrative entity 242 as shown in FIG. 2 may gain access to the dashboard 340 to control or administratively interact with any immersive content 108 in the immersive content inventory 346 using the admin access 342 shown in FIG. 3B. Further. OTT digital media providers 110 or other entities and their representatives may utilize the client access 344 to add immersive content 108 to the immersive content inventory 346 in the content delivery network 312.

Accordingly, in one or more non-limiting embodiments, if the content provided by the OTT digital provider 110 and shown on the OTT television application 302 is in standard content or standard format (not immersive), then the OTT content delivery network (CDN) 312 routes that content to the default standard media player of the OTT application. If the content to be viewed is the immersive content or an immersive advertisement, and viewable over a range of degrees (e.g., 100-360-degree range), then the immersive content or immersive advertisement is routed by the CDN 312 to the 360 degree media player 120 on the OTT television application 302 and may be controlled using a remote controller (e.g. 362, 306, or 310) or by the 360 degree media player 120 and digital trackpad 122 on the user computing device 101. Accordingly, the request is provided by user input selecting a selector such as the "immerse" selector tool 408 shown in FIG. 4B, for example, and then the OTT CDN 312 fulfills that request by routing that requested immersive content 108 and/or advertisement 112 to the OTT television application 302 and to the 360 degree media player 120 integrated in the OTT television application 302 in particular.

With respect to immersive advertisements 112, there may be an OTT AD server 322, as shown in FIG. 3A that can host immersive advertisements (as well as standard video advertisements) 112 offered and/or created by a variety of advertisers 114 (e.g., as shown in FIG. 1). The OTT immersive AD server 322 incorporates an OTT AD server SDK 330, as also shown in FIG. 3A, in order for the immersive ads or advertisements 114 to be viewable using the 360-degree media player 120 and/or digital track pad 122. This OTT AD server SDK 330 may further be implemented on the OTT AD Server 322 which enables the management, serving, and tracking of standard and immersive advertisements 112 and/or internal promotion on the OTT television application 302. The OTT AD Server 322 may decide, in real-time, the best advertisement 112 to serve based on relevance, targeting, budgets, and revenue goals of the advertisers 114, which can often be in immersive format.

As shown in FIG. 3B, the cloud broadcasting system 354 refers to the cloud broadcasting system used to deliver immersive content 108 and standard or immersive ads 112 to any type of television content provider, whether the television content provider is cable type of television providers, linear television providers, or OTT digital media providers 110. Accordingly, the cloud broadcasting system 354 processes the immersive content 108 and the immersive advertisements 112 and then makes available this immersive content 108 and the immersive advertisements 112 to the OTT television streaming applications 302 and their consumers/viewers. It is noted that the cloud broadcasting system 354 processing of the immersive content 108 and the immersive advertisements 112 may include quality control, formatting, scheduling/traffic, and playout organization of the immersive content 108 and the immersive advertisements 112.

At that point, the immersive content 108 and immersive advertisement 112 may be routed to a particular streaming device 356, which can include the smart television 106 and the user computing device 101, which may be a smartphone in many cases. In other embodiments, the streaming device 356 may be a hardware enabled digital media player 304 or gaming console 308.

The system may include an API gateway 358, which is a software-based API management tool that sits between a client and a collection of backend services. An API gateway acts as a reverse proxy to accept all application programming interface (API) calls, aggregate the various services required to fulfill them, and return the appropriate result. Accordingly, the administrative entity 242 provides and manages the API gateway 358 that is used by the user computing device 101, television 106, and the OTT television streaming application 302 and the mobile OTT application 318 to manage all of the APIs utilized by the system, including but not limited to, the spatial audio API 368, voice recognition API 370, QR reader API 372, playback API 374, and camera switching API 376, which are shown in FIG. 3B and are further discussed below. Further, the API gateway 358 facilitates routing of the immersive content 108 and the immersive advertisements 112 to the OTT television streaming application 302 and to the mobile OTT application 318.

As shown in FIG. 3A, and discussed above, and as also shown in FIG. 3B, the mobile OTT application 318 on the user computing device 101 incorporates a mobile OTT application SDK 314 that further includes the digital trackpad 122. The mobile OTT application SDK 314 may include the spatial audio API 368, voice recognition API 370, QR reader API 372, playback API 374, and camera switching API 376. As noted above, an API is an interface that allows and offers a service to other software. Further, the API acts as a software intermediary allowing multiple applications to talk to each other. In terms of the 360-degree media player 120 and digital trackpad 122, the spatial audio API 368 enables the user 102 to listen to the immersive content 108 being displayed on the connected or smart television 106 using regular headphones or earbuds. FIG. 4E shows an exemplary selection tool 426 in the 360-degree media player 120 on the user's smartphone 101 that can be selected for listening to the immersive content 108 or immersive advertisement 112 using the spatial audio features of the 360-degree media player 120 along with attached headsets or ear sets. By plugging in or pairing the user's headsets or ear sets, the use is able to enjoy the spatial audio features offered by the immersive content 108 and/or immersive advertisement 112.

Further, the 360-degree media player 120 and digital trackpad 122 as integrated on the user computing device 101 may apply the voice recognition API 370 to enable voice commands to control the 360-degree media player 120 and digital trackpad 122. FIG. 4E shows an exemplary selection tool 428 in the 360-degree media player 120 to enable voice recognition commands to control the watching, exploration, or navigation of the immersive content 108 or immersive advertisements 112. Further, the 360-degree media player 120 and digital trackpad 122 as integrated on the user computing device 101 may utilize the playback API 374 to control playback of the immersive content 108 on the OTT television application 302 as displayed on the television 106. FIG. 4E shows an exemplary set of selection tools 420, 422, and 424 to rewind, pause, and forward the immersive content 108 or immersive advertisements 112 displayed on the OTT television streaming application 302 as shown on the television 106.

Further, the 360-degree media player 120 and digital trackpad 122 as integrated on the user computing device 101 may apply the camera switching API 376 to enable switching to a different omnidirectional camera 116 from a possible set of cameras 116 used to present the same immersive content 108 or immersive advertisement 112, in order to see another point of view or angle of the immersive content 108 or immersive advertisement 112. FIG. 4E shows an exemplary selection tool 460 allowing the user 102 to change the point of view or camera 116 at displaying any given moment a particular scene or image of the immersive content 108 or the immersive advertisement 112 using the selection tool 460 integrated into the 360-degree media player 120.

The QR reader API 372 is an API that can be used to read QR codes, which as known in the art, are a type of barcodes having a scannable pattern that allows pairing between devices. FIG. 3C shows that there may be a device pairing interface 382 utilized to pair or sync the OTT television streaming application 302 with the user computing device 101 (or mobile device) and with the mobile OTT application 318. FIG. 4C and FIG. 4D provide examples of QR codes 412 that may be utilized to pair the OTT television application 302 shown on the television 106 shown in FIG. 4C with the mobile OTT application 318 on the smartphone 101 shown in FIG. 4D in order to allow the 360 degree media player 120 and digital trackpad 122 to be used to watch, explore, and navigate the immersive content 108 and/or immersive advertisements 112 as viewed on the television 106. It is noted that in other embodiments, the device pairing interface 382 does not have to relate to QR codes and other methods of syncing or pairing the OTT television streaming application 302 and the mobile OTT application 318 may alternatively be used. For example, the user 102 may be asked to enter an alphanumeric code shared with the user computing device on the OTT mobile app or on the OTT's website 101.

t is noted that FIG. 3A shows that in a non-limiting embodiment, the administrative servers 232 coupled to one or more OTT AD servers 322. This may be because, in one or more non-limiting embodiments, the administrative servers 232 may temporarily host the immersive ads 112 played at particular time slots and made available to the user 102 on the OTT television streaming application 302 as viewed on the television 106.

In a non-limiting embodiment, the immersive advertisements 112 may be hosted on the OTT AD servers 322 and made available for viewing on the OTT television streaming application 302 through the cloud broadcasting system 354. In some cases, an ad exchange 388, which is a digital marketplace that enables advertisers, advertising space resellers (also known as Demand Side Platforms), and publishers to buy and sell advertising space, often through real-time auctions. Ad exchanges 388 are used to sell and display video and mobile ad inventory. In some cases, the advertisers may also coordinate the creation of advertisements having a certain criteria and format or message using a demand side platform 390, which is a type of technology used to automatically publish and search for resources and creative teams to create the advertisements desired. In a non-limiting embodiment, regardless how an advertisement is created, any immersive advertisements 112 may be stored in the immersive ad inventory 348 in an immersive ad server 322 shown in FIG. 3B and then made available to the cloud broadcasting system 354 for streaming to one or more connected TV devices or streaming device 356, including but not limited to smartphones 101, hardware enabled digital medial players 304, and gaming consoles 308.

The immersive advertisements 112 may be targeted to specific demographics and/or geographical locations. Further, the placement of immersive advertisements 112 on the featured OTT television application 302 may be compatible with programmatic advertising. Programmatic advertising is known in the industry as the use of software to buy digital advertising. While the traditional method includes requests for proposals, tenders, quotes, and negotiation, programmatic ad buying uses algorithmic software to buy and sell online display space. Programmatic advertising or ad buying is a more sophisticated way to place advertising, and is able to use traffic data and online display targeting to drive impressions at scale which results in a better ROI for marketers and global brands. Accordingly, the method as described herein is compatible with the user of programmatic ad buying and can feature immersive advertisements 109 in the OTT television application 302 that are placed at particular times for particular users suiting a particular demographic as pre-determined by the programmatic advertising.

As shown in FIG. 3C, a number of programs may be used to create immersive content 108 and immersive advertisements 112. For example, video editing software 384 and/or 3D design software 386 may be utilized to create the immersive content 108 and the immersive advertisements 112. It is noted that the immersive content 108 and the immersive advertisements 112 may be produced from disparate and a variety of venues 124a, 124b, and 124c using their own video editing software 384a. 384b, 384c and their own 3D design software 386a, 386b, 386c. Further, these venues 124a, 124b and 124c may employ or utilize their own omnidirectional cameras (also referred to colloquially as virtual reality (VR) cameras 116) and/or spatial audio microphones 118 as shown in FIG. 3C. Accordingly. FIGS. 1-3C generally describe a system and exemplary components according to non-limiting embodiments for providing immersive content 108 and immersive advertisements 112 that are particularly structured and made feasible for streaming to a connected or smart television 106 that integrates the technology of the 360 degree media player 120 and/or digital trackpad 122 in one or more non-limiting embodiments. As shown above in FIGS. 1-3, the system provides an embedded 360-degree multimedia player inside an OTT operating system. Further. FIGS. 3B-3C shows that 360-degree immersive content 108 and immersive advertisements 112 are routed from a content delivery network (CDN) 312 to the 360-degree multimedia player.

FIGS. 4A-4H depict an exemplary process and exemplary components for utilizing a mobile smartphone 101 to watch, playback, navigate, and explore immersive content 108 and/or immersive advertisements 112 displayed on an OTT television streaming application 302 and on a smart television 106.

Figure 4A:
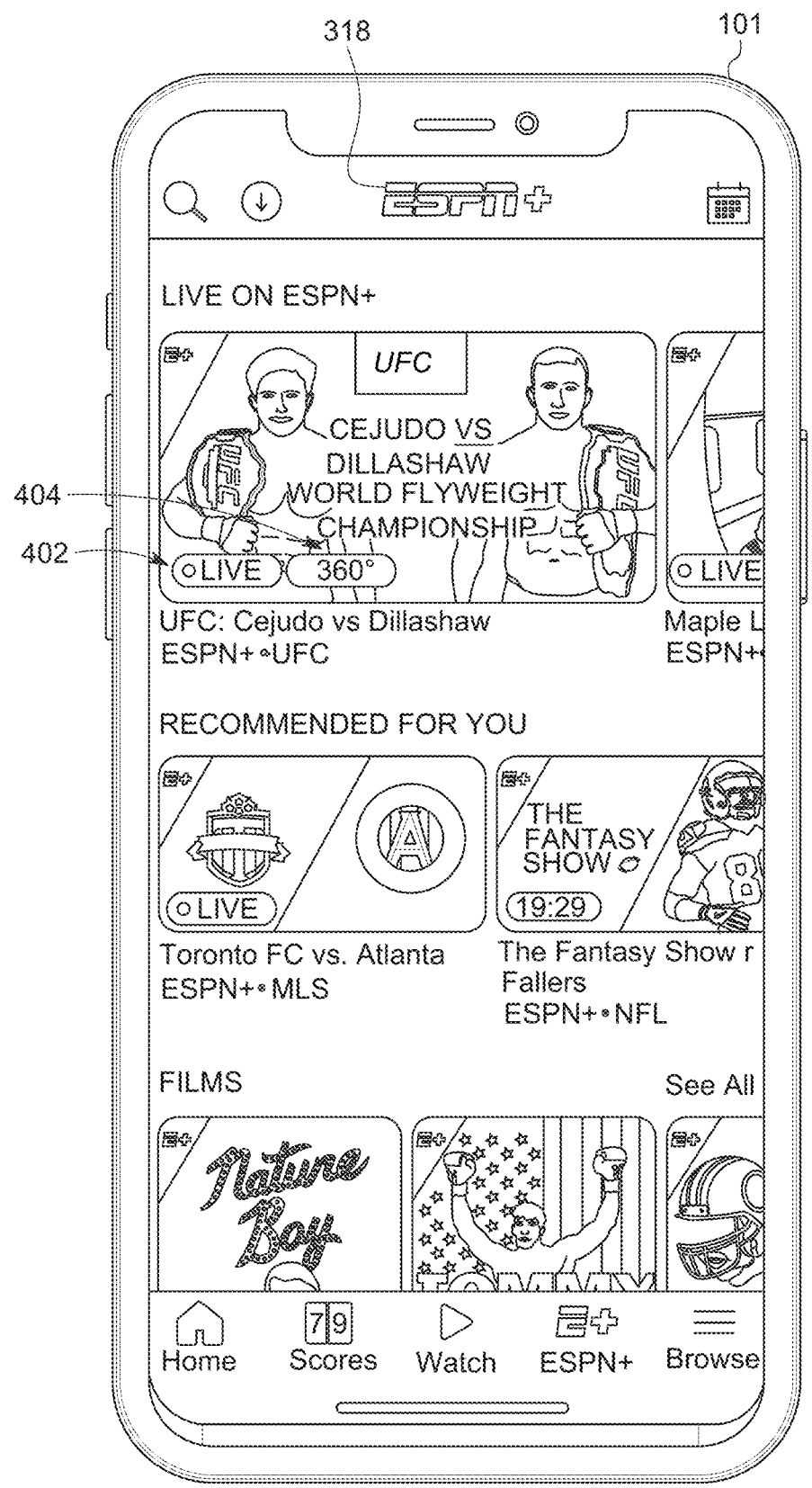
FIG. 4A depicts an exemplary smartphone having a mobile version of an OTT television application with selections for immersive content that can be viewed using the 360-degree media player.

FIG. 4A shows that the user can launch a mobile OTT application 318 on the user 102's smartphone 101 or another type of user computing device 101, including laptops and tablets and desktops in some non-limiting embodiments. The mobile OTT application 318 is presented and displayed on the touchscreen or other type of output device 210 of the smartphone 101. As is common with OTT applications 302 and 318, there is a grid displaying all the available audio-visual content or programming that is available for a user 102 to watch on the OTT applications 302 and 318. The grid may include several "thumbnails" which are still images on the grid that act as a preview for the content to be viewed.

Figure 4B:
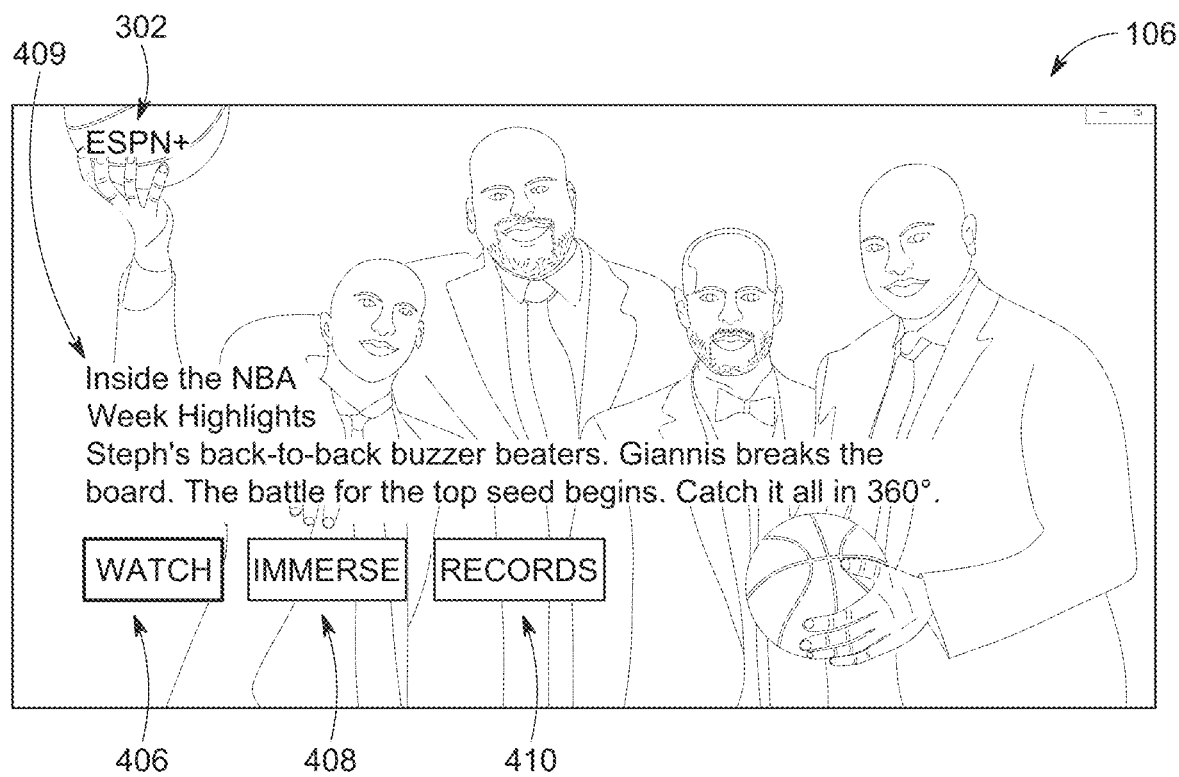
FIG. 4B depicts an exemplary television screen that displays the same immersive content on the OTT television application on the television screen and includes icons for viewing the immersive content in standard mode or in 360 immersive mode.
Figure 4C:
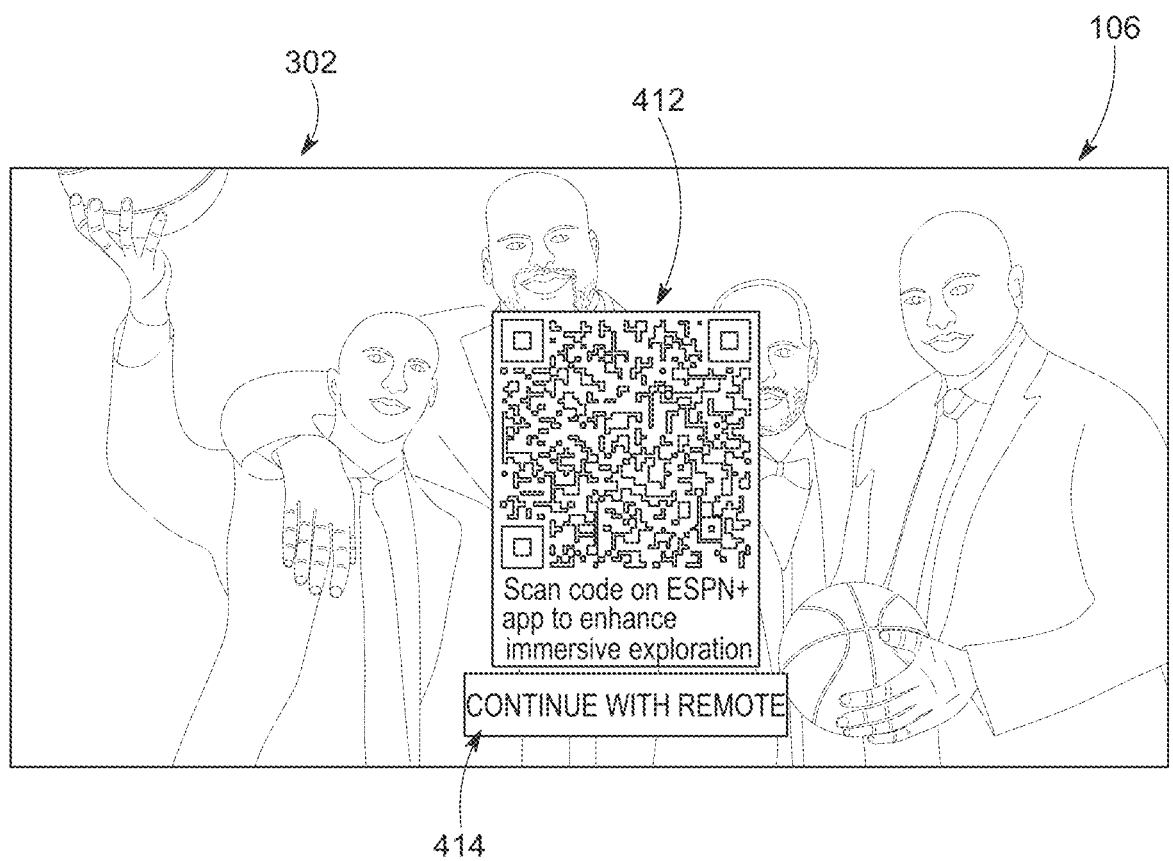
FIG. 4C depicts an exemplary QR code that may be scanned or used to pair or sync the OTT television application with the mobile version of the OTT television application.
Figure 4D:
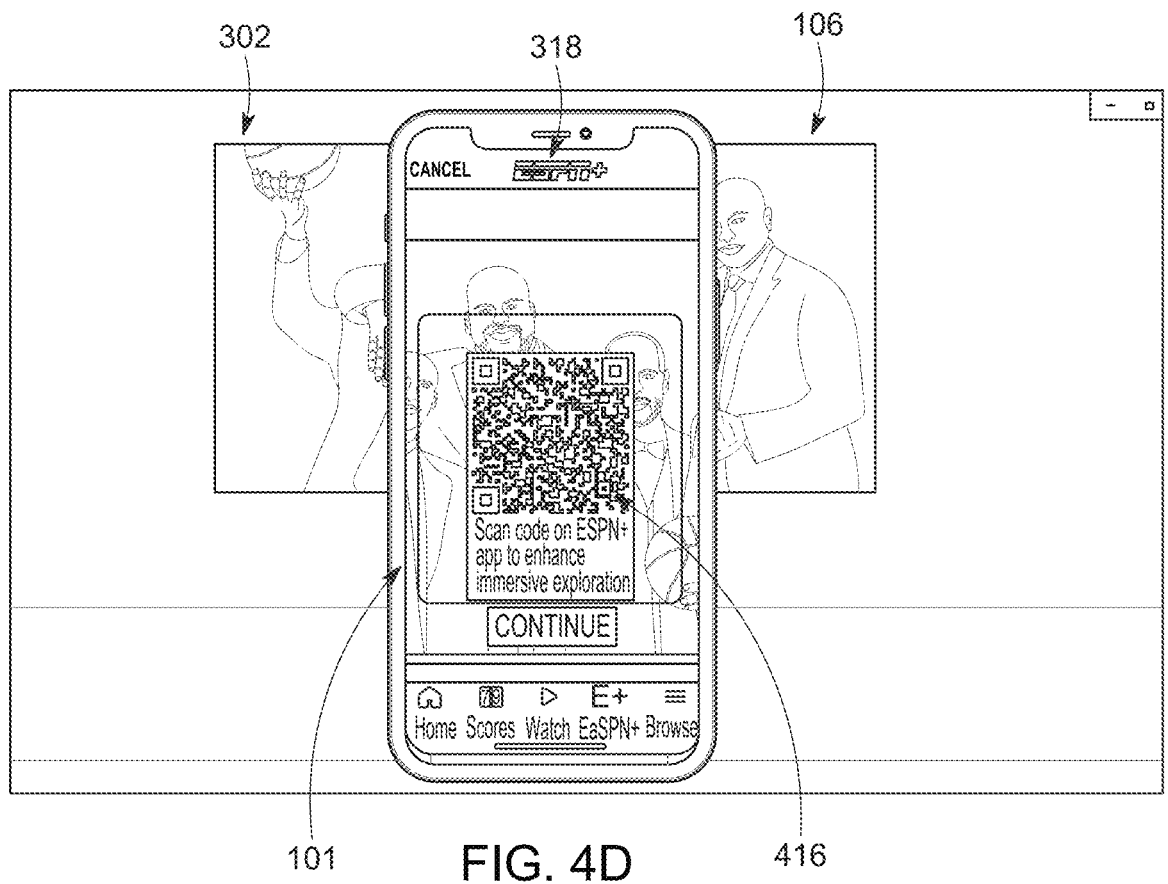
FIG. 4D depicts an exemplary QR code useable on a smartphone of a user to pair or sync the OTT television application with the mobile version of the OTT television application in order for the 360-degree media player on the smartphone to control the navigation and exploration of the immersive content on the television screen.
Figure 4E:
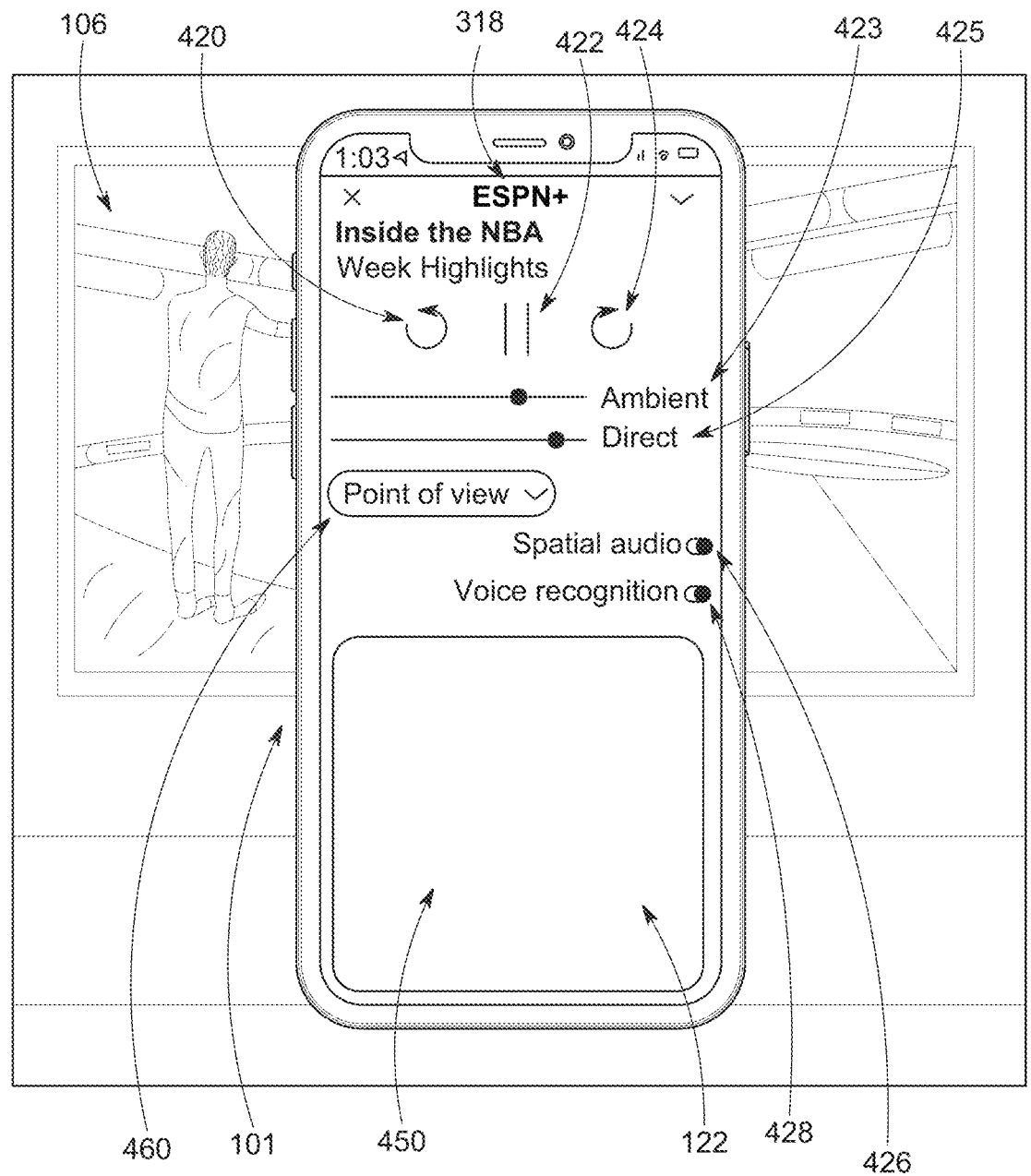
FIG. 4E depicts an exemplary 360-degree media player viewable in the mobile version of the OTT television application and an exemplary digital trackpad.

As shown in the example in FIG. 3A, the example OTT digital media provider 110 shown is ESPN+ well-known OTT digital media provider 110 that has both an OTT television streaming application 302 (e.g., as shown in FIG. 4B) and a mobile OTT application 318 as shown in FIG. 3A. ESPN+ is an OTT service that is well-known for its sports related content and programming. Any type of OTT application 318 may alternatively be used and function in accordance with the process shown in FIGS. 4A-4H.

In the example view shown in FIG. 4A, there are some examples shown of programming that include at least two selection tools including selection tools 402 and 404. The term "selection tool" as used herein may interchangeably be used with the terms buttons, selectors, or icons that may be used to turn on and off a function or feature or enable a function or feature on any type of device, including on a smartphone 101 or other type of computing device 101.

As shown in FIG. 4A, the selection tool 402 is associated with the term "Live" and the selection tool 404 is associated or proximate to the term "360 degrees" or "360°." The term "live" is an example and may also have the term "watch" or "play" in one or more non-limiting examples. The terms "360 degrees" or "360°" may be example terms that visually convey and indicate to the user 102 that a particular programming or content has also been recorded so as to enable 360-degree exploration and navigation. Accordingly, if the user 102 so desires, the user 102 can select the 360-degree selector tool 404, in order to access the immersive content 108 (and/or advertisement) the user desires to see. In this non-limiting example, the immersive content 108 shown in FIG. 4A (among others) relates to a boxing event that is made available for viewing using the mobile OTT application 318. It is noted that the immersive content 108 is created using one or more omnidirectional cameras 116 to provide the 360-degree format as opposed to a standard one point of view or single layout for non-immersive content. FIG. 4A shows on the mobile OTT application 218 that not all of the programming is made to have the immersive content 108 feature or having a 360-degree selection tool 404. Accordingly, the OTT digital providers 110 may provide only select programming or content that is viewable with a 360-degree immersive experience. In other embodiments, every program may be made to include a 360-degree immersive experience.

FIG. 4B shows an example television 106. The television 106 displays a navigation page or landing page 409 displaying programming content offered by the OTT television streaming application 302 shown in FIG. 4B. The example OTT digital media provider 110 shown in FIG. 4B is "ESPN+" which is the same as the digital media provider 110 shown in FIG. 4A, but the OTT television streaming application 302 is particularly configured for display on a television 106 as opposed to the mobile OTT application 318 useable with a smartphone 101 or other non-television user computing device 101.

The example selection tools 406, 408, 410 shown in FIG. 4B can each be selected, in order for a user 102 to engage with the particular show or other type of programming made available on the landing page 409 of the OTT television application 302. For example, the selection tool 406 allows a user 102 to "watch" the show in standard video format, while the selection tool 410 allows a user 102 to "record" the show. It may also be the case that the selection tool 408 may be used to allow a user to watch and explore the same show in 360 degrees. Accordingly, the shown may be an example of immersive content 108. The selection tool 408 may be positioned proximate to the term "immerse" which indicates to the user 102 that the user 102 can watch, navigate, explore over a 360-degree (or at least a 180-degree) range. The range may include anywhere from 180-degree up to 360 degree exploration, as some content may not be recorded over a 360-degree range, but rather may be provided up to a 180-degree range. For example, some sports related content are purposefully recorded in a way to not show faces of fans in a stadium or other venue, and thus are recorded to focus on the players movements over a 180-degree range. Accordingly, the term "immersive" as used herein whether utilized for immersive content 108 or immersive advertisements 112 may be explored over a range of at least 180 degrees to 360 degrees.

As noted above, in one or more non-limiting embodiments, the user 102 can choose to use the television remote control 362 to watch, navigate, or use its arrow buttons to explore the immersive content 108. Further, if the OTT television application 302 on the television 106 is provided by a ROKU or FIRESTICK (which are examples of a hardware enabled digital media player 304 as shown in FIG. 3A) or by an XBOX or PLAYSTATION (which are examples of gaming consoles 314 as shown in FIG. 3A), then the user 102 can also use the requisite remote controllers 306 of the ROKU or FIRESTICK or the remote controllers 310 of the XBOX or PLAYSTATION. Notably, the 360-degree media player 120 is configured to be installed and integrated into the OTT television application 302 on the television screen 106, in order to allow navigating and exploring immersive content 108 without having to use a virtual reality headset or a similar virtual reality device to navigate and explore the immersive content 108 on the user 102's television screen 106. Advantageously, as shown in FIG. 4B, the system as described above can trigger the appearance of an "Immerse" button or selection tool 408 in the main menu thumbnails and in the content summary screen presented on the OTT television application whenever immersive content is uploaded and schedule on the OTT's cloud broadcasting system 302. Further, the system as further described below can configure the "Immerse" button 408 to begin caching and streaming the 360-degree video content.

Advantageously, the user 102 is also enabled by the one or more non-limiting embodiments described herein to utilize the user 102's smartphone 101 as a controller to control the playback, watching, navigating, exploration, and other features of the immersive content 108 viewing experience on the connected television 106. This may be preferable to many users 102 who heavily rely on their smartphones 101 and constantly use or access the smartphones 101.

In a non-limiting embodiment, there may be a device pairing interface 382 as shown in FIG. 3C and discussed above used to couple or connect the smartphone 101 of the user 102 to the television 106 and provide access to the 360-degree media player 120 and to the digital trackpad 122 shown in FIG. 4E. Accordingly, in a non-limiting example, the user 102 may pair or sync the user 102's smartphone 101 and the mobile OTT application 318 with the television 106 and the OTT television application 302 using QR codes. As noted above and as shown in FIG. 3B, there may be a QR code reader API 372 included in the SDK 314 of the mobile OTT application 318 to facilitate the use of QR codes for this pairing or syncing process between the mobile device and the connected TV device.

Accordingly, as shown in FIG. 4C, a first QR code 412 may be displayed on the OTT television application 302 shown on the television 106 for scanning. Alternatively, another selection tool 414 as shown in the example shown in FIG. 4C may appear with the option to "continue with remote" meaning the user 102 may use their device default remote, such as a television remote 362 or other remote controllers 306, 310 to watch and view the immersive content 108 as presented on the OTT television application 302 on the television 106.

As shown in FIG. 4D, the mobile OTT application 318 on the user 102's smartphone 101 includes access to or a built in QR code scanner or reader 416 to scan and/or read the QR code 412 shown in FIG. 4C. In a non-limiting embodiment, upon scanning of the QR code 412, the 360-degree media player 120 and embedded digital trackpad 122 may be made available and viewable in the mobile OTT application 318 on the user 102's smartphone 101. In a non-limiting embodiment, the user 102 may only have to pair or sync the mobile OTT application 318 with the OTT television application 302 only once per mobile device or one time to be able to have the 360-degree media player 120 and digital trackpad 122 on the user's 102 smartphone 101 control the immersive content 108 viewing experience. Alternatively, in one or more non-limiting embodiments, each show, event, interview, advertisement, or any other type of content offered by the OTT television application 302 may need to be synced or paired each time the user 102 wants to view a different type of content offered on the OTT television application 302 using, for example, scannable QR codes 412 provided on the television screen 106 for each show or ad or other type of content.

As noted above. FIG. 4E includes a number of useful and beneficial features included with the 360-degree media player 120 and embedded digital trackpad 122 as integrated with the mobile OTT application 318 As shown in the example on FIG. 4E, the name of the OTT digital provider 110, which is in this case ESPN+, is visible to the viewer as well as the name of the show or other type of immersive content that the user 102 is viewing on the smartphone 101. Further, the 360-degree media player 120 may include one or more playback control selection tools for playing and controlling the viewing of the immersive content 108 from the user 102s smartphone 101. The selection tool 420, for example, may be used to rewind the immersive content 108, while the selection tool 422 may be used to pause the immersive content 108, and the selection tool 424 may be used to forward or fast-forward through the immersive content 108. The selection tools 423 and 425, respectively, refer to the "ambient" and "direct" text displayed on the 360-degree media player 120 which allows a user 102 to control the direct (studio commentators, music, and sound effects) and ambient (captured by regular or spatial audio microphones at the venue, or sound designed in the case of 3D digital environments) audio levels in real time. Accordingly, the 360-degree media player allows the user 102 to equalize or use equalization which is the manipulation of levels over the audio frequency spectrum, and helps the user 102 to focus the sound or audio provided by the immersive content 108 and/or immersive advertisements 112 as desired. Further, the 360 degree media player 120 enables the user to adjust a volume between separate audio channels provided by the OTT television streaming application. In this manner, if there is commentary provided separate from other audio, the user can adjust using the "ambient" and "direct" selectors for example which audio channel will be prominent and which audio channel will be more muted or silenced. Further, the selection tool 460 may relate to the exemplary text "point of view" which allows the user 102 to change or select a different camera 116 used to record and capture the immersive content 108. The selection tool 426 allows a user 102 to toggle on or off the spatial audio feature so that the user 102 can utilize headphones or another type of headset or earpiece to enjoy spatial audio, which may be applicable if the immersive content 108 was recorded and captured using one or more spatial audio microphones 118.

Further, the 360-degree media player 120 may include a selection tool 428 for selecting on and off the "voice recognition" feature so that voice commands may be recognized to control watching and navigating and exploring the immersive content 108 as displayed on the OTT television application 302 on the television 106. Accordingly, the user 102 can provide voice commands or voice instructions to play, forward, rewind the immersive content 108 or any other feature listed above, and the 360-degree media player 120 on the user 102's smartphone 101 will respond to the voice commands and perform a corresponding controlling action to affect the immersive content 108 on the OTT television application 302 on the television 106. Further, in a non-limiting embodiment the 360-degree media player 120 will include the ability to respond to voice commands from a user 102 to trigger an action or response from the displayed immersive content 108 and/or immersive advertisement 112

Notably, the digital trackpad 122 shown in FIG. 4E may be shown in its enlarged, maximum size. The digital trackpad 122 may be a rectangular-like box presented at a lower third or half of the 360-degree media player 120, in one or more non-limiting embodiments. Other shapes are for the digital trackpad 122 may alternatively be used including circular, triangular, square, or any other shape design for the digital trackpad 122. The trackpad 122 has a smooth surface 450 that responds to the user's 102 touch and movements of the user's 102 fingers or another tool (e.g., stylus) in one or more non-limiting embodiments. In a non-limiting embodiment, in addition to the playback control icons 420, 422, and 424 shown in the 360-degree media player 120, the same playback control icons 420, 422, and 424 (or the like) may be shown on the digital trackpad 122 in a digital fashion so the user 102 can select the playback control icons 420, 422, and 424 from the surface 450 of the digital touchpad 122.

Many other features and functions may be provided using finger movements and commands on the digital trackpad 122. For example, the user 102 is able to zoom using the digital trackpad 122. In a non-limiting embodiment, the user may use a two finger scroll gesture on the touchpad 122 to zoom in and out of the image presented on the OTT television application 302 as shown on the television 106 which will cause the image presented on the OTT television application 302 to zoom in and out. Further, the user 102 can enable hands-free tracking, in which when the user 102 presses on the touchpad 102 once, a cross-hair will appear at the center of the OTT television application 302 on the television 106. By pressing the center of the touchpad 122 again, for example, the cross-hair may automatically follow the person, character, or object where the cross-hair was locked into. Other functions and features may be made available using the digital trackpad 122 that enhance the watching, exploring, and viewing experience of the user 102.

Further, the digital trackpad 120 can control the OTT television application 302 even if the OTT television application 302 is integrated in a hardware enabled digital media player 304 or a gaming console 308. The controls on the 360-degree media player 120 and the digital trackpad 120 can simulate the functions of the buttons and selectors included with the hardware enabled digital media player remote controller 306 or a gaming console remote controller 310.

Figure 4F:
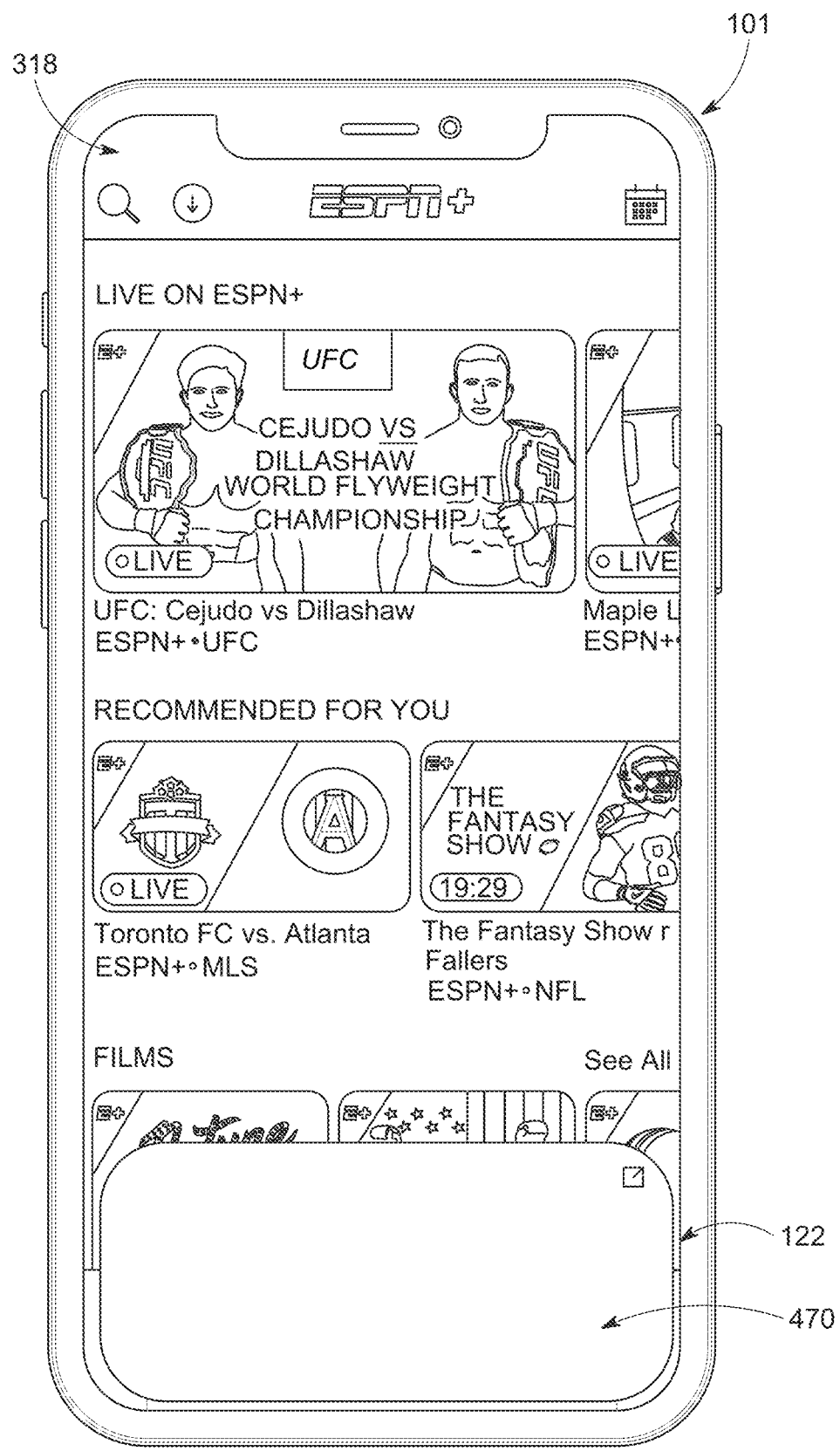
FIG. 4F depicts how the digital trackpad can be minimized within the mobile version of the OTT television application such that a user can browse within the mobile version of the OTT television application.
Figure 4G:
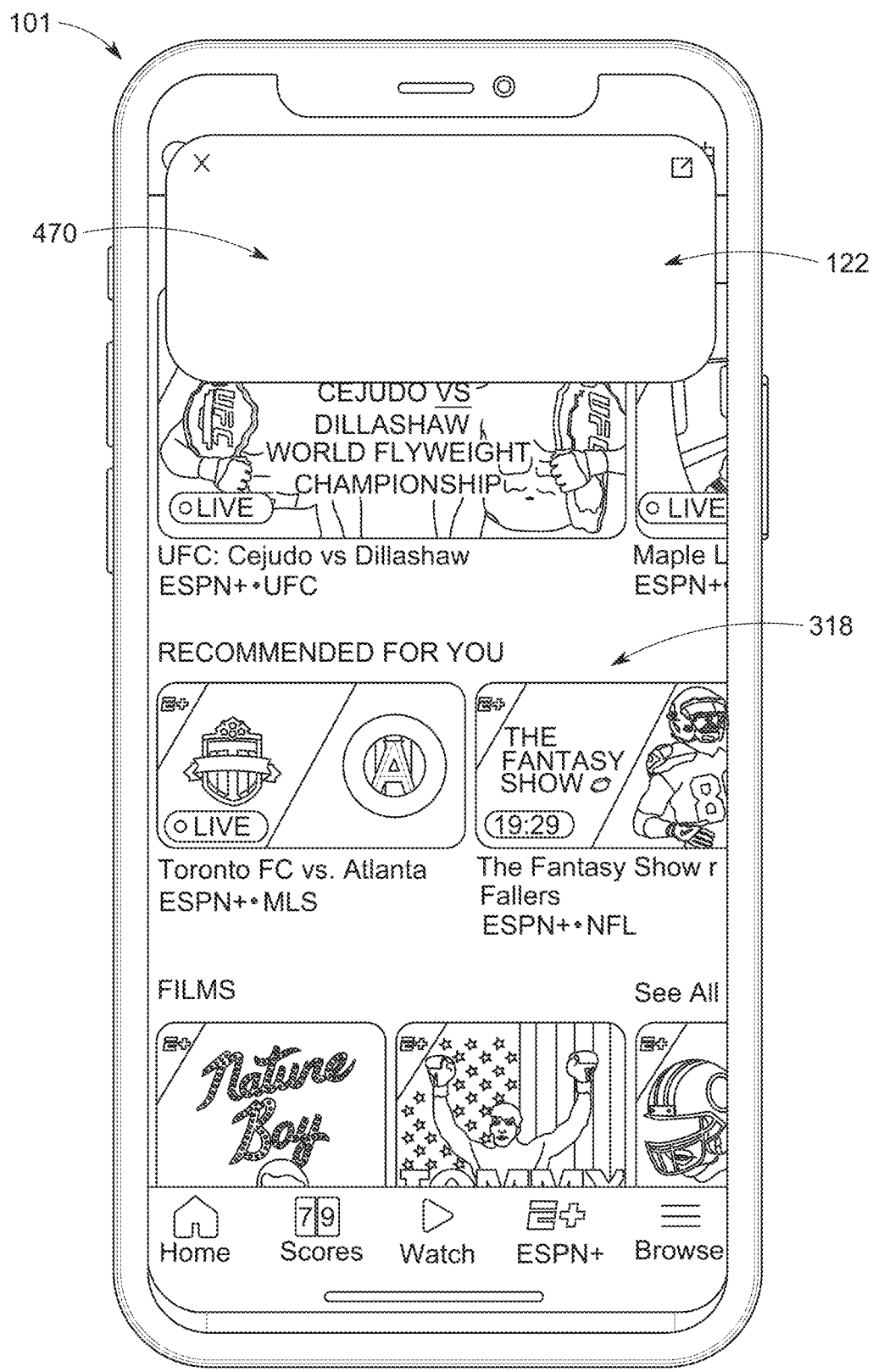
FIG. 4G depicts how the digital trackpad can be moved to an upper part of a screen of a smartphone while a user browses within the mobile version of the OTT television application.
Figure 4H:
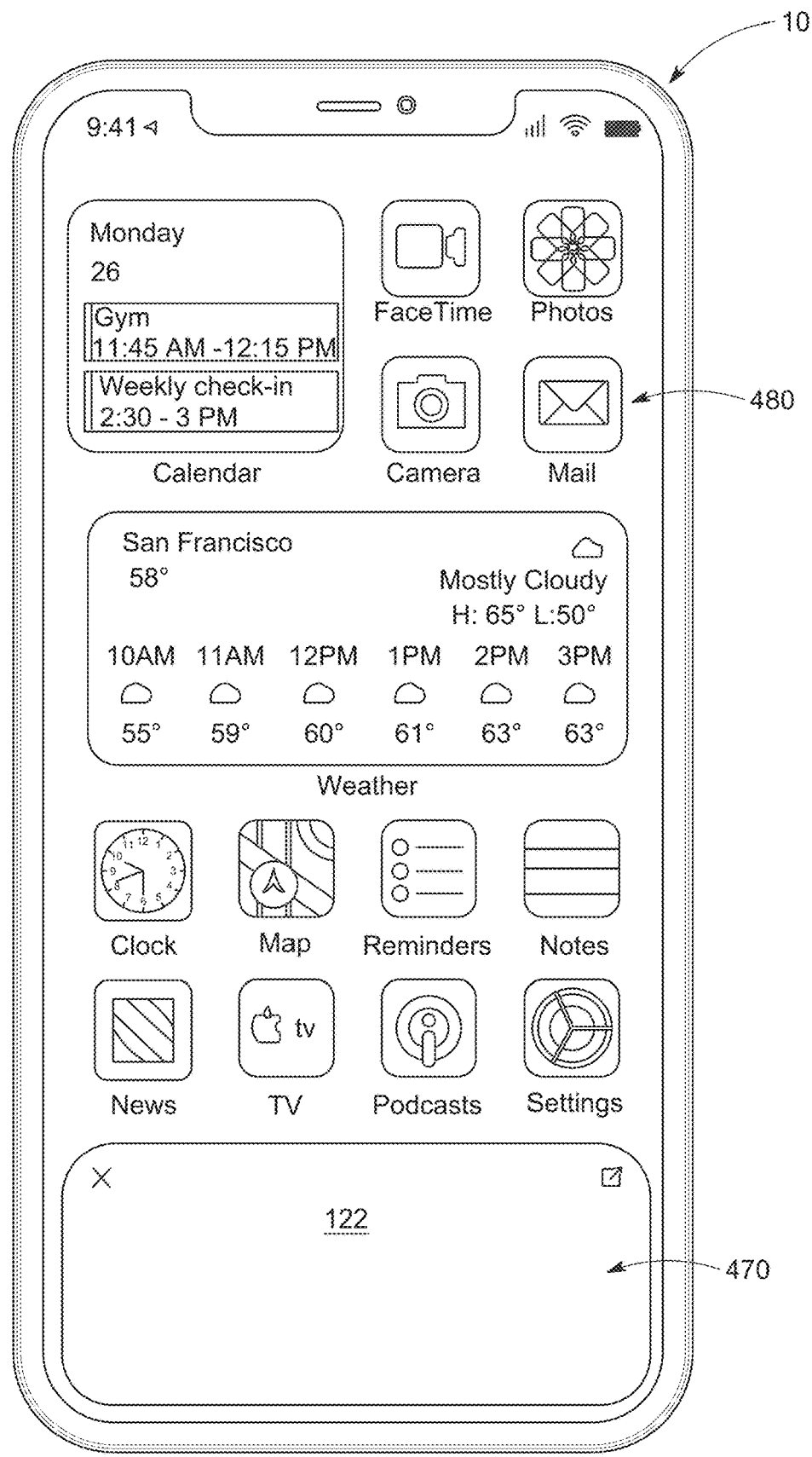
FIG. 4H depicts how the mobile version of the OTT television application can be minimized with the digital trackpad still available and visible on the home screen of the smartphone such that the user can browse and utilize any of the icons or functions of the smartphone while viewing and controlling immersive content on the television screen.

Notably, the 360-degree media player 120 and the digital trackpad 122 may be minimized during use so that the user 102 can still watch, explore, and navigate the immersive content 108 but still have access to other applications or functions on the user 102's smartphone 101 while retaining control of immersive content 108 (and/or immersive advertisement 112) streaming on the television 106. FIG. 4F shows an example of a minimized 470 digital trackpad 122 that allows the user 102 to access other content or functions of the mobile OTT application 318. Accordingly, the user 102 can browse and also keep the minimized 470 digital trackpad 122 open to control the immersive content 108 on the television 106. The digital trackpad 122 can advantageously be positioned wherever the user 102 desires on the screen of the smartphone 102. In FIG. 4F, the minimized 470 digital trackpad 122 is shown and featured on the lower portion or part of the user 102's smartphone 101. FIG. 4G shows that the minimized 470 trackpad 122 may be moved to another part of the screen of the smartphone 101, such as, but not limited to the upper portion or upper third part of the screen of the smartphone 101. It is noted that the term "minimized trackpad" as used herein may also interchangeably be referred to as a "floating trackpad." This floating trackpad 122 may always be featured in the foreground of the screen of the user computing device 101, and the user 102 can move or position the floating trackpad 122 to be in the top, center, or bottom of the screen of the user computing device 101.

In order to move or reposition the trackpad or touchpad 122, in a non-limiting embodiment, the user 102 may use a three-finger drag gesture to reposition the minimized 470 touchpad 122 on the screen of the smartphone 101. Further, the mobile OTT application 318 can itself be minimized 470 and the digital trackpad 122 be repositioned or moveable on the home screen of the smartphone and while other smartphone applications are open 101, so that other icons 480, applications, or functions of the smartphone 101 be accessible to the user 102.

As noted above, hand gestures may be performed on the digital trackpad 122 on the smartphone 101 or other user computing device. The use of hand gestures may allow users 102 to personalize their experience. It may be programmed as such that a particular set of hand gestures causes a particular, predetermined response. For example, in one or more non-limiting embodiments, sliding one finger will allow users 102 to move their point of view in any direction. Swiping two fingers horizontally will change their vantage point to other places throughout the filmed or digital venue (whenever additional VR cameras or omnidirectional cameras 116 or computer-generated vantage points are available). Swiping two fingers vertically will zoom in and out of the image. Swiping three fingers will carry the floating trackpad 122 to other places in the screen. Tapping the trackpad 122 with one finger will select between navigation buttons that appear on the connected TV (CTV) 106 and the same buttons will be mirrored in the top section of the trackpad 122. A two-finger tap will reveal OTT menu navigation on the CTV, in which case a cursor will appear on the television screen 106 that can be moved by sliding one finger. Pushing down on the trackpad 122 will activate a haptic on the mobile device 101 and show a crosshair in the CTV device 101, in which case users will be able to place the crosshair over the subject or image presented on the television 106 that the user 102 wishes to follow in the immersive experience, hands-free. Accordingly, if a user 102 is watching a basketball game, and solely wants to follow a single player on the basketball team, the user 102 can utilize this feature to lock in on the player or subject via the cross-hair that will always follow the movements of the subject and provide that point of view in a hands-free manner. Further, the method may include a second push-down that may lock in the subject and begin hands-free tracking. In a non-limiting embodiment, sliding one finger will override the hands-free functionality.

FIGS. 5A-5B show an example of an immersive advertisement 112 having numerous appealing features. For example, in a non-limiting embodiment, an immersive advertisement 112 may be explored and navigated over 360 degrees such that the user 102 can view angles or views having additional content. Further, the immersive advertisement 112 may include variable endings. "Variable endings" as used herein may mean that alternative endings to a planned advertisement are offered to a user 102 for viewing. In one non-limiting embodiment, the user 102 may select which ending the user 102 wants to see. Accordingly, the variable endings may involve user participation and selection of the ending or other part of the immersive advertisement 112. For the current generation of viewers, who are used to and prefer to be content creators and to be engaged in the story that they are viewing, it may be a more successful advertising campaign for the advertisers 114 to offer immersive advertisements 112 that allow for 360-degree exploration as well as that include variable endings to engage the viewer more than in a standard, non-immersive, single-ending advertisement that is typical and currently available. The ability to serve immersive advertisements 112 on a large screen like a television screen 106, including interactive ones (e.g., as shown in FIGS. 5A-5B) means superior return on an advertisement spend for advertisers, and consequently, more affordability for users 114.

Accordingly, as shown in FIG. 5A, there are three different icons 506, 508, and 510 shown on the television screen 106. The immersive advertisement 112 in this example may be for an airline. In this exemplary immersive advertisement 112, the digital airplane 502 may appear in the user 102's television screen 106 as if flying into the digital simulation 504 of the same venue that the user is immersed in. However, ads can consist of entirely different environments than that of the venue. In a non-limiting embodiment, the immersive advertisement 112 may be presented during ad breaks or commercial breaks during a live event 126 held at a larger sized venue 124. The OTT television application 302 and the mobile OTT application 318 may include such immersive advertisements 112 during the ad breaks or commercial breaks or at any time.

The user 102 is enabled to select any of the icons that the user 102 wants to "fly to" and may select the "Madrid" selection tool 506, the "Paris" selection tool 508, and the "Rome" selection tool 510. In this manner, there are variable endings and the user 102 can interact and participate in selecting an ending or a storyline that matches the interests of the user 102.

FIG. 5B is a visual example showing a digital simulation of the Eiffel tower, indicating that the user 102 selected the "Paris" selection tool 508. This immersive advertisement 112 is presented on the OTT television application 302 on the television 106. The immersive advertisement 112 may include further icons or selection tools 512, 514 for additional interaction with the user 102 in a manner desirable to the user 102. For example, the selection tools 512, 514 allow a user 102 to indicate if they wish the advertiser 114 and its brand creators to contact the user 102 via mobile texts or email (as entered by users in their OTT profile). If the user 102 selects any such selection tools, the user 102 may also be routed to the advertiser's 114 website or social media pages.

It is noted that in one or more non-limiting embodiments, there may be multiple separate assets or compilations or other recordings related to the variable endings. Accordingly, if an immersive advertisement has two or more parts, as shown in FIGS. 5A-5B, then the first part of the immersive advertisement may be stored in one compilation (e.g. one unit). Each compilation related to each variable ending (e.g., 506, 508, and 510 as shown in FIG. 5A) may be stored in separate compilations. In one or more non-limiting embodiments, these separate compilations may be stored in the immersive ad server 322 and included in the immersive ad inventory 348. Accordingly, the OTT ad server 322 may pull and route each compilation through the CDN 312 and then through the administrative entity 232 (in some instances) as requested to the 360 media player 120 of the OTT television application 302.

The immersive advertisement 112 is well-suited to be tailored to the particular interests, geographical area, and other personal identification details associated with each user 102. The OTT digital provider 110 is enabled to know based on the preferences of the user 102 which digital providers 110 may benefit the most from having an immersive advertisement 112 presented to each user 102 of the OTT television application 302 and the mobile OTT application 318.

As shown in FIG. 5A, there is a digital simulation of a large stadium which may be a venue 124 for a well-known live event 126 such as a SUPERBOWL or WORLD CUP. Typically, the costs for presenting advertisements during such well-known live events 126 are very cost prohibitive for a majority of advertisers 114. The ability to present immersive advertisements 112 that cater to the particular interests and appeal to a particular demographic so that the immersive advertisements 112 can be provided to the users 102 who may best benefit from viewing the immersive advertisement 112 is extremely beneficial to the advertisers 114, who want to see higher rates of click-throughs and participation from the user 102 with the immersive advertisement 112 to know that the advertisement was fully seen and absorbed by the targeted user 102. Notably, data suggests that the inclusion of extended reality, including virtual reality and augmented reality content, as well as the user of 360-degree immersive viewing in an advertisement is more likely to increase engagement, completion rate, brand consideration, and purchase intent of a viewer/user 102. Further, in one or more non-limiting embodiments, if the user 102 selects one or more variable endings 506, 508, or 510, secondary video assets may be supplied to the user 102 that further help the advertiser/marketer 114 target the user 102.

As noted above, in a non-limiting embodiment, the mobile OTT application 318 will also allow users 102 to access the spatial audio included in the immersive content 108 and/or immersive advertisements 112 using headphones or earbuds connected to the smartphone 101. Further, the 360-degree media player 120 will include the ability to respond to voice commands from a user 102 to trigger an action or response from the displayed immersive content 108 and/or immersive advertisement 112 or to otherwise control, select or navigate to a feature of the 360-degree media player 120 and/or digital trackpad 122.

As further explained below, omnidirectional cameras 116, as shown in FIG. 1 and FIG. 3C, may be configured to capture every angle of a venue 124, thus allowing the advertiser 114 to tailor their advertisements 112 to the unique spatial layout and structure of the venue 124 using a 3D map of the venue. Such interactive and engaging advertising content is more likely to grab and hold the attention of the user 102 during the live event 126 than traditional forms of advertising where the user 102 will go off and do something else until the events of the live event 126 continue again.

Figure 6:
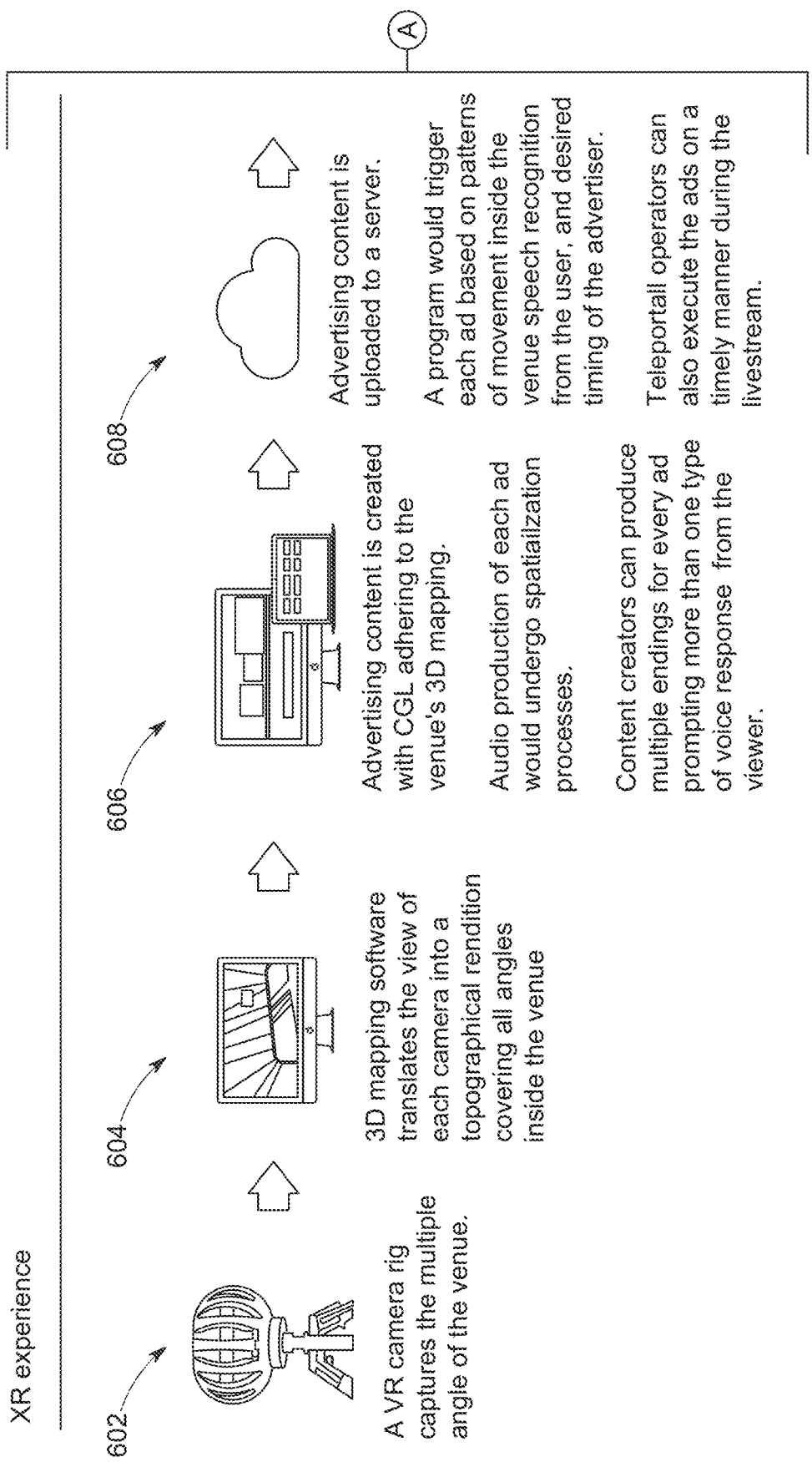
FIG. 6 depicts an exemplary flowchart with steps for a method of implementing immersive advertisements to be streamed via an OTT television application for a live event on a television.
Figure 6:
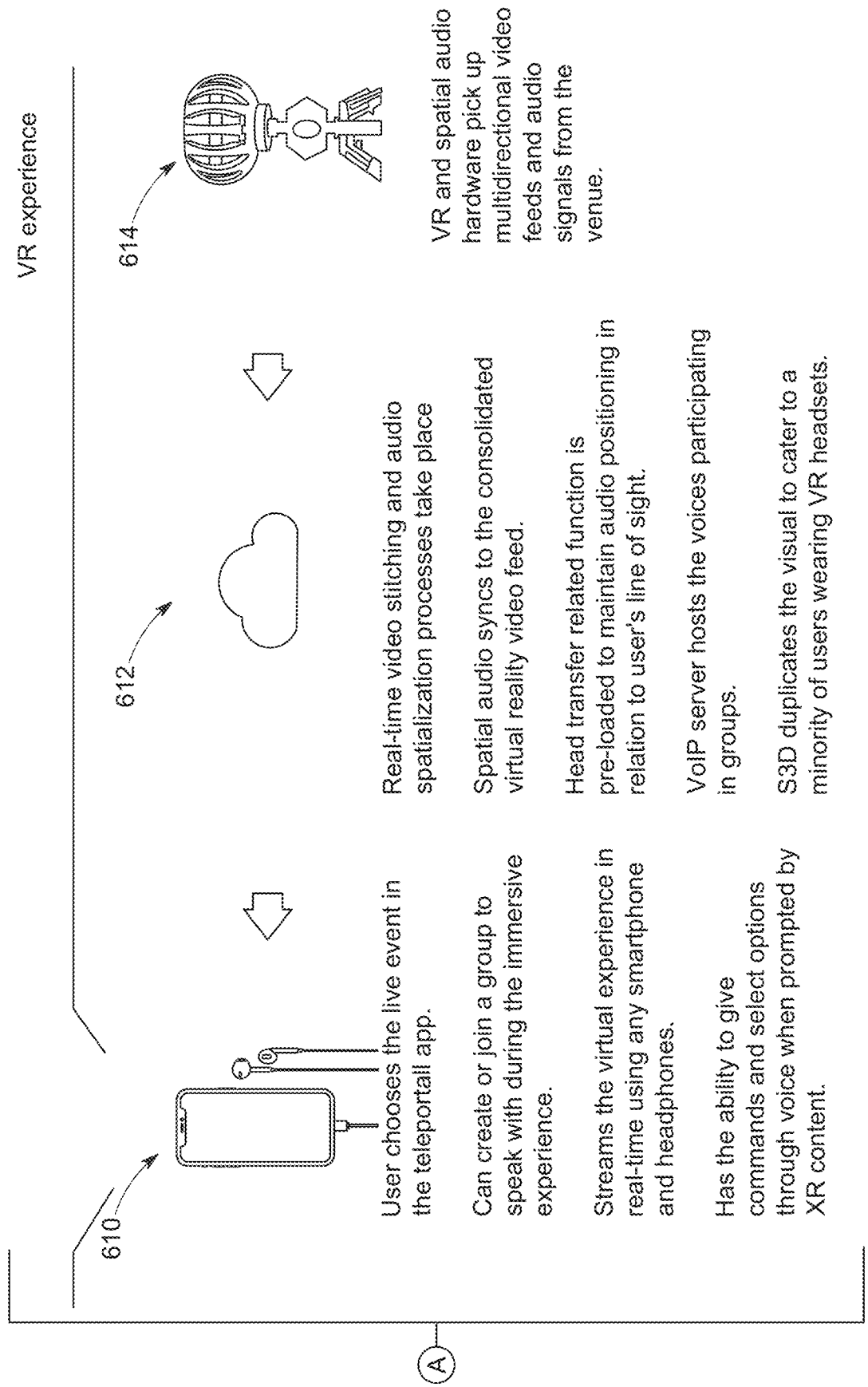

FIG. 6 depicts a pictorial illustration demonstrating one or more steps for an exemplary method of implementing system 100. The steps of the method described in FIG. 6 are not required to be performed in the order listed shown in FIG. 6, and any step may be performed in a different order or arrangement.

At step 602, one or more virtual reality or omnidirectional camera rigs 116, as shown in FIG. 1, may be placed and positioned in an optimum location at the venue 124 where a live event 126 is to take place. The virtual reality camera rig 116 may capture the multiple angles of the venue 124. At step 604, 3D mapping software may be used to translate the view of each virtual reality camera rig 116 into a topographical rendering covering all angles and depths inside of the venue 124. At step 606, the advertising content is created with CGI (computer generated imagery) adhering to the 3D mapping of the venue 124. Any advertisements produced for any advertiser 114 may relate specifically to the venue 124 and could take into consideration the structure and arrangement of the venue 124 layout. For example, a viewer watching a live event 126 using OTT television application 302 on the television 106 and/or using the OTT mobile application 218 on his or her computing device 101 may view an immersive advertisement 112 of a SPIDERMAN character swinging down the sides of the venue 124. The SPIDERMAN character would be an example of augmented reality included in an immersive advertisement 112, because the SPIDERMAN character is a digital element imposed over the real-world view that the virtual reality camera 116 captures of the venue 124, and that the user 102 can use the 360-degree media player 120 and/or trackpad 122 on a smartphone 101 to explore and interact with the immersive advertisement 112.

Any audio production for each advertisement 112 will undergo a spatialization process as well to account for the space and layout of the venue 124. Notably, and advantageously, content creators for advertisements 112 can produce and upload multiple endings for every advertisement 112 that is configured to react to more than one type of button or voice response from the viewer. Accordingly, an advertisement 112 can have multiple possible endings depending on the button or voice input of a viewer and which ending the viewer chooses to see. Viewers 102 will also be able to use buttons and their voice to order the application to skip any advertisement 112 that accommodates opt-in viewing.

At step 608, the process may include uploading the created advertising content pieces to a server. An immersive advertisement 112 may be provided through the OTT television application 302 based on a variety of factors. For example, an immersive advertisement 112 which may also include virtual reality content may be triggered based on patterns of movement inside of the venue 124, speech recognition from the user 102, desired timing for airing the advertisement 112 by an advertiser, and the viewer 102's specific demographic data. The administrative entity 242 operators can also execute the immersive advertisements 112 in a timely manner during a livestream being played on the smart television 106 and connected to the 360-degree media player 120 and trackpad 122 on the user's computing device 101.

At step 610, the user 102 can choose the live event 126 the user 102 wants to view using the OTT television application 302. In a non-limiting embodiment, the OTT television application 302 is configured to stream the immersive experience in real time using a user's smartphone 101 and/or earbuds or other audio output. As noted above, the 360-degree player 120 in the mobile OTT application 318 can include a voice recognition selection tool 428 as shown in FIG. 4E. If selected, the mobile OTT application 318 can respond to voice commands and includes speech recognition technology to process voice commands related to any feature of the immersive advertisement 112, including voice commands that trigger one of multiple endings for an immersive advertisement 112. The microphone of the user computing device 101 may be automatically activated in response to the selection of the voice recognition selection tool 428 to respond to the voice commands of the user 102. It is noted that the immersive advertisement 112 may include extended reality content.

At step 612, the real time video stitching and audio spatialization processes can take place. The spatial audio syncs to the consolidated virtual reality video feed. Any head transfer related function (HRTF) is pre-loaded to maintain audio positioning in relation to a user 102's line of sight. A HRTF, also known as an anatomical transfer function (ATF), is a response that characterizes how a human ear can locate a sound according to its position in the space where it's captured, regardless of where the user has focused their point of view.

Stereoscopy (also called stereoscopics, or stereo imaging) is a technique for creating or enhancing the illusion of depth in an image by means of stereopsis for binocular vision. Stereoscopic 3D or S3D may be integrated as well in the system 200 and with the immersive advertisements 112 created for viewing on the OTT television application 302. The use of S3D technology may be omitted from the system 100 in one or more non-limiting embodiments.

At step 614, any hardware, such as the one or more virtual reality camera rigs 116 and/or specialized microphones 118 for spatialization of the audio emitted during the live event 126 may pick up multidirectional video feeds and audio signals from the venue 124 during the live event 126. A variety of components may be used to implement the system described above and shown in FIG. 1, FIG. 2, and FIG. 6. In a non-limiting embodiment, the system may include an array of virtual reality camera rigs 116 (each pointing in a different direction) to capture the action of the live event 126 around the venue 124. The virtual reality camera rigs 116 are configured to stitch all video feeds from each virtual reality camera rig 116 in real time to create one massive panorama that gives the user 102 the ability to change their line of sight, simply by using a remote, such as remote 362, 306, and 310 or a digital trackpad 122 on the user computing device 101.

With respect to the use of the term "extended reality" herein, extended reality may relate to the superimposition of two-dimensional and three-dimensional digital objects into a real-world view of any filmed environment, such as a livestream of a live event 126 hosted at a venue 124. Together the extended reality and S3D may embody how advertisers/brands may appear in front of the audience and blend in with the visual of the live event 126.

Figure 7:
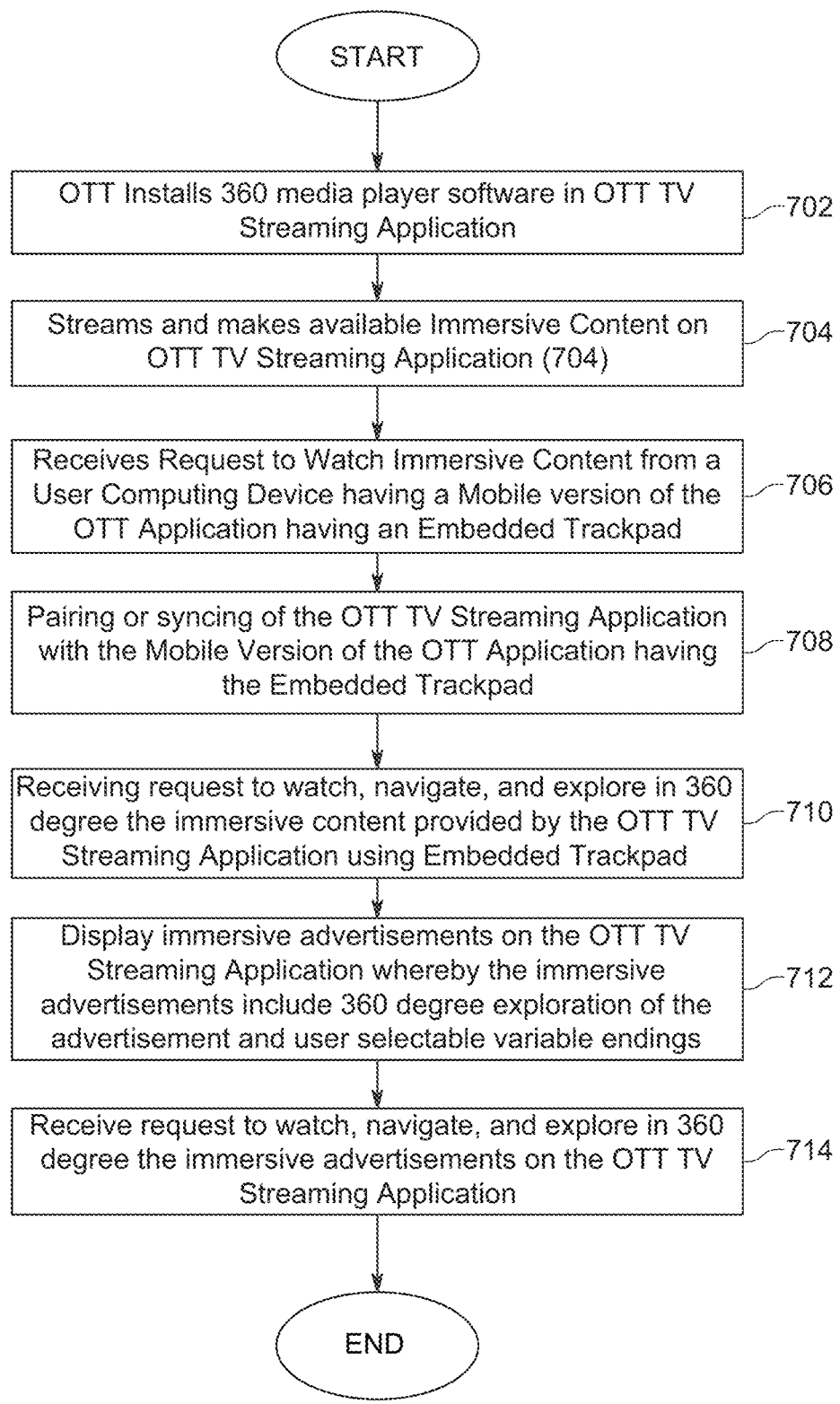
FIG. 7 depicts an exemplary flowchart for presenting immersive content and immersive advertisements on an OTT television application that can be synced or paired with a smartphone having a 360-degree media player that is configured to control and explore the immersive content and the immersive advertisements.

FIG. 7 shows a flowchart for watching, exploring, and navigating in 360-degree immersive content 108 112 on an OTT television application 302. As shown in step 702, the OTT digital provider 110 may incorporate the 360-degree media player 120 in the OTT television application 302. This may include the OTT digital provider 110 utilizing the mobile OTT application SDK 320 provided to the OTT digital provider 110 by the administrative entity 242.

At step 704, the OTT digital provider 110 provides immersive content 108 on the OTT television application 302. At step 706, the OTT television application 302 receives a request to watch the immersive content 108 from a user computing device 101 having a mobile OTT application 318 which includes the 360-degree media player 120 as well as an embedded digital trackpad 122. The mobile OTT application SDK 314 may have been previously incorporated and integrated into the mobile OTT application 318 by the OTT digital provider 110 in order for the 360-degree media player 120 and the digital trackpad 122 to be included with the OTT mobile application 318 for use on the user computing device 101.

At step 708, in one or more non-limiting embodiments, there may be a pairing of the OTT television application 302 with the mobile OTT application 318. As noted above, the mobile OTT application 318 may incorporate a QR code reader/scanner 416 that can read/scan QR codes to allow the 360-degree media player 120 to take control of the immersive content 108 as presented on the OTT television application 302 on the television 106.

At step 710, the OTT television application 302 may receive a request from the mobile OTT application 318 and from the logged in user 102 to watch, navigate, and explore in 360 degrees the immersive content 108 provided by the OTT television application 302 whereby the 360-degree media player 120 and/or embedded digital trackpad 122 is utilized to control the immersive content 108. At step 712, any immersive advertisements 112 may be displayed on the OT television application 302 whereby the immersive advertisements 112 include 360-degree exploration of the advertisement 112 and user selectable variable endings (e.g., as shown in FIGS. 5A-5B). At step 714, the OTT television application 302 may receive the request to watch, navigate, and explore in 360 degrees the immersive advertisement 112 on the OTT television application 302.

Accordingly, the one or more systems and non-limiting embodiments provided above facilitate and improve providing immersive content 108 and immersive advertisements 112 to users 102. As noted above, users 102 are enabled to explore immersive content without having to own a virtual reality headset which has been typically used for exploring audiovisual content over a 360-degree range. Further, the users 102 are not required to move their heads or entire bodies, which helps the users 102 avoid the risk of injury or damaging home goods while viewing immersive content 108 and/or immersive advertisements 112. Further, the users may explore the immersive content 108 and/or immersive advertisements 112 without having to isolate themselves from the world around them. Further, the user 102 is able to experience the content in a more personal setting such as with their friends and family around their television 106. Additionally, the users 102 are enabled to voice their commands to navigate and personalize their content experience. Further, the users 102 are enabled to enhance their connected TV experience with the use of the user 102's smartphone 101.

Further, the system as presented herein in one or more non-limiting embodiments may help streaming services provided by OTT digital providers 110 create an additional advertising inventory for sponsors. Further, the system as presented herein may help streaming services provided by OTT digital providers 110 expand their content's value proposition to subscribers and to users. Further, the system as presented herein may help advertisers 114 give users 102 multiple options to personalize the advertisement 112 to the user's preference through the inclusion of variable endings. The system as presented herein helps advertisers draw interaction with users which may help advertisers 114 gain greater certainty that the advertisement 112 effectively reached a user 102. Further, the system as presented herein may allow producers 110 and/or advertisers 114 to gain additional engagement data from users 102.

In a non-limiting embodiment, the system as presented herein may allow producers 110 to have an additional distribution method to display their work. Further, in a non-limiting embodiment, online stores may use the system as provided herein to provider users 102 with an immersive shopping experience from home, including helping online stores enhance their shopping experience with digitally inserted elements while moving through aisles and different areas of the immersive space.

There are numerous additional possible applications for viewing immersive content 108 and/or immersive advertisements 112 on a television 106 using an OTT television application 302 and a mobile OTT application 318 having a 360-degree media player 120 and digital trackpad 122 as presented herein. For example, realtors and property owners may offer realistic tours of homes, vacation spots, or commercial properties. Remote videoconference participants may utilize the 360-degree media player 120 on the OTT television application 302 to look around the table during meetings. In another example, live training exercises and combat situations may be monitored on a large screen. Entertainers may enhance their performance offering using the immersive content 108 format described above. Additional applications include sports betting that allow fans to get a front row seat and engage in a 360-degree manner with a sporting event displayed on the television 106. Adult related content may also benefit from using the 360-degree media player 120 and digital trackpad 122 presented on a television 106.

In addition to the above FIGS. 8-21 provide additional notable features and functions regarding the connected TV 106 that is connected via a network 104 and/or internet connection 360 to a user's smart computing device 101 and includes the OTT application 302 on the connected TV 106 and the OTT application 318 on the user's computing device 101.

Figure 8:
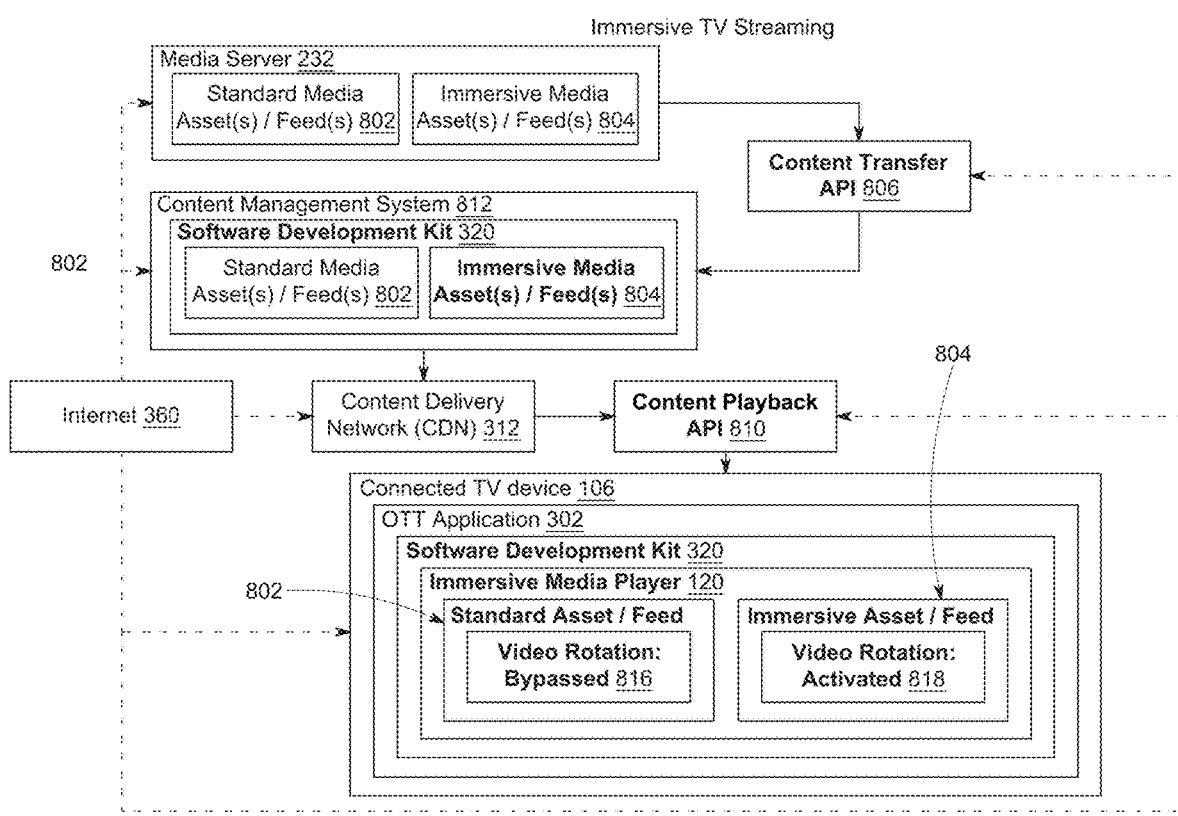
FIG. 8 depicts a block diagram for additional functions and features related to video rotation of an immersive asset or feed versus bypassing rotation for a standard asset or feed.

FIG. 8 depicts a block diagram for additional functions and features related to video rotation of an immersive asset or feed versus a standard asset or feed. In a non-limiting embodiment. FIG. 8 may illustrate how the OTT streaming application 302 on a connected TV device 106 is configured to automatically allow activation of rotation (e.g., block 818 in FIG. 8) (also known as 360 degree exploration and navigation using the trackpad 122 from a user's computing device 101) of immersive media assets and feeds 804 as displayed on the connected TV 106. Further, the media player embedded in the OTT streaming application 302 on a connected TV device 106 is configured to bypass (e.g., block 816 in FIG. 8) 360 degree rotation when detecting a standard media asset or feed 802. The term "standard" as used herein refers to non-immersive content, including media assets or feeds 802, that have not been recorded using omnidirectional cameras 116 and are not enabled to provide 360 degree rotation for a user 102. Accordingly, the OTT application 106 on the connected TV 106 is enabled through the SDK 320 to activate a 360 degree rotation as shown at block 818 in FIG. 8 of Immersive asset/feeds 804 and to bypass any rotational activity for standard asset/feeds 802.

As shown in FIG. 8, the standard, non-immersive assets/feeds 802 and the immersive media assets/feeds 804 are stored and/or held in the media server 232. The media server 232 is able to communicate with the content management system 812 which includes the SDK 320 that is also downloaded or otherwise integrated onto the connected TV watching device 106. It is noted that the content transfer API detects files with an aspect ratio indicative of a 360 degree video (e.g., immersive content 108) and informs the SDK 320 located in the CMS 812 so that the administrator 242 can set up content items with this new type of media.

The SDK 320 is able to detect and recognize whether content contained in the content management system 812 qualifies as a standard media asset/feed 802 or an immersive type of media asset/feed 804, as shown in FIG. 8. Via a content playback API 810 and via the internet connection 360 to the content delivery network (CDN) 312, the immersive media player 120 integrated into the OTT application 302 via the SDK 320 downloaded or otherwise integrated on the connected TV 106 is enabled to either automatically activate video rotation or 360 rotation of an immersive asset/feed 804 as displayed on the connected TV 106 or bypass 816 and not even provide the option of 360 degree rotation of a standard asset/feed 802.

Accordingly, in a non-limiting embodiment, the SDK 320 is embedded, installed, or otherwise integrated into an OTT application 302 through the content management system 812 or content delivery network (CDN) 312 powering the OTT application 302, whereby the OTT application 302 can be downloaded and accessed by users through a connected TV 106, streaming media player for TV 106 and further there is also an OTT application 318 (as shown in FIG. 3A and discussed above) for a mobile user computing device 101 to enable the user 102 to stream standard and immersive content in an immersive media player 120 (also referred to as a 360 degree media player in FIG. 3A). In another non-limiting embodiment, rather than an SDK 320, native source code or an application programming interface (API) may alternatively be embedded or installed into an OTT application 302 to enable the capabilities of the 360 degree automatic rotation of the immersive asset/feed 804 and bypassing of the 360 degree rotation of standard assets/feeds 802.

In addition to the above, in a non-limiting embodiment, the OTT application 302 is enabled to adjust a warp inherent with equirectangular media assets such as immersive assets/feeds 804 to portray a realistic aspect ratio and shape of any subjects and environments in a picture or display on the connected TV 106 of the immersive assets/feeds 802, and to further stitch the edges of the immersive assets/feeds 802 in any axis (x, y, z axis) to provide omnidirectional rotation within the rectangular viewable area of the immersive media player 120. Further, it is noted that the immersive assets/feeds 804 (which may be the same or include additional content as noted by immersive content 108 shown in FIG. 1), can be originated by 360 degree omnidirectional cameras 116. The 360 degree omnidirectional cameras 116 may be a single camera with multiple lenses or multiple cameras pointed in different directions from a single anchor point. In other instances, the immersive media/assets 804 may be captured by volumetric camera rigs/arrays/systems which are multiple cameras 116 surrounding the filmed subject/environment to capture the action simultaneously. In other instances, immersive media assets/feeds 804 can also include the inclusion of computer generated imagery (CGI).

The OTT application 302 as incorporated in the connected TV 106 and as controllable via a digital trackpad 122 that is part of the mobile application 318 on the user device 101 allows for activation of a 360 degree rotation function in the immersive media players 120 when detecting immersive (i.e., rotational) media 320.

Figure 9:
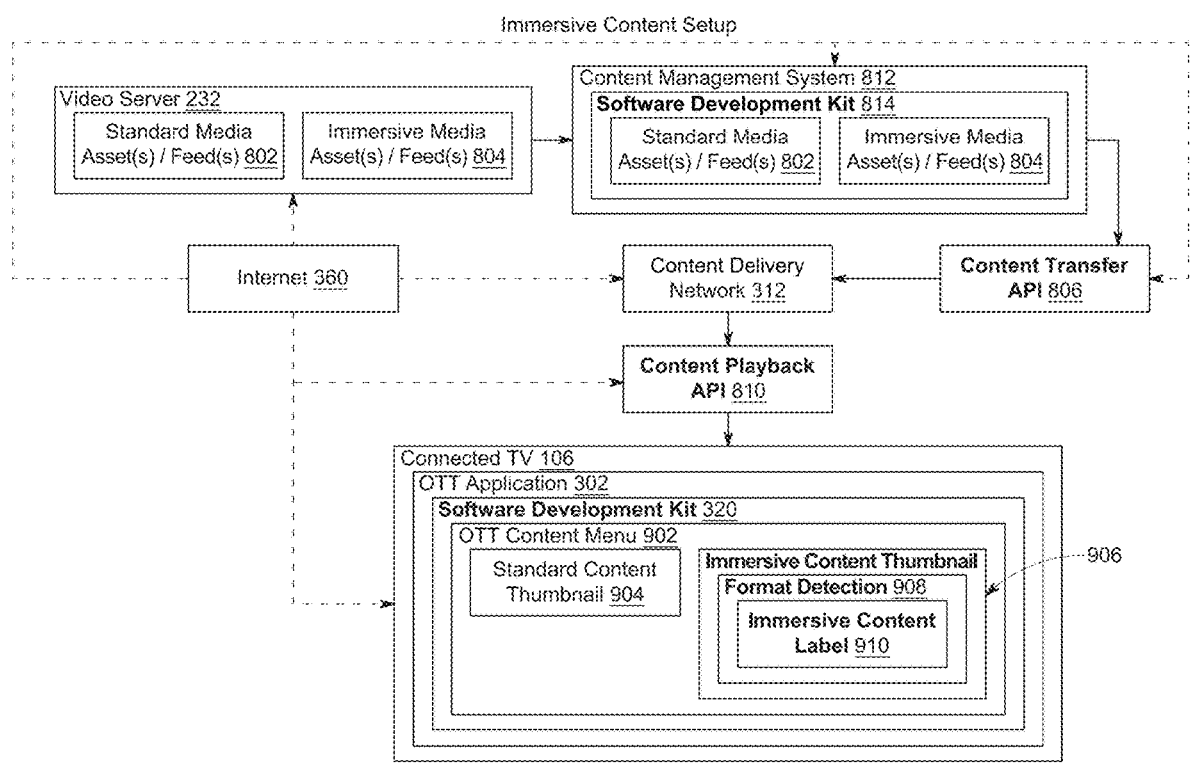
FIG. 9 depicts a block diagram for detecting an aspect ratio of media assets and feeds to inform a user when a content item features 360 degree immersive content and includes labels that appear on a content menu for an OTT application on a connected TV.

FIG. 9 depicts a block diagram for detecting an aspect ratio of media assets and feeds and how the OTT application 302 may be enabled to automatically detect whether a media asset/feed is an immersive asset/feed 802 or a standard media asset/feed 804.

In a non-limiting embodiment, FIG. 9 may relate to the capability of the OTT application 302 to detect an aspect ratio of any type of media asset/feeds (e.g., 802 and 804 as shown in FIG. 8) whereby any aspect ratio equal or above 2:1 indicates that a width of the media asset/feed is equal to or over 2 times its height, and therefore this is an indication that this particular type of media asset/feed is an immersive asset/feed 804. If the OTT application 302 detects that the aspect ratio of a media asset/feed is under 2:1 or that the width of the media is less than 2 times its height, then this is an indication that the specific type of media asset/feed is a standard (non-rotational, non-immersive) asset/feed 802. Additionally, in a non-limiting embodiment, the OTT application 302 is enabled to automatically a label indication that a media asset is either immersive or standard. Such labels may include terms that are visible on the display screen of the connected TV 106 and on the content menu 902 (e.g., as shown in FIG. 9) shown on the connected TV 106. Exemplary labels include displaying the terms "360", "immersive." or a similar type of label to indicate a content item is immersive, whereby the label appears if the content item is comprised of one or more immersive assets.

Further, as noted above, automatic rotation of the immersive content 108 (e.g., immersive asset/feeds 804) is provided to the user 102 using the digital trackpad 122 from the mobile OTT application 318, wherein controls become available to the user 102 while the connected TV 106 is actively streaming the immersive content 108.

In addition, in some non-limiting embodiments, the OTT application 302 is enabled to activate an appearance of an icon, watermark, or notification on the immersive media player 120 (whether on the connected TV 106 and/or on the user device 101) informing the user 102 that the content is immersive and can be rotated with the paired user device 101 (e.g., a smartphone or tablet or other type of smart device). In a non-limiting embodiment, the digital trackpad 122 responds to gesture based rotation as further discussed below. In other embodiments, the immersive content 108 can also be rotated with a TV remote control. Accordingly, such a function of the OTT application 302 enables a user 102 to easily realize in real-time when the immersive content 108 offers an option to rotate the view. As shown in FIG. 4B, an immerse button or icon 408 may appear to the user 102 on the connected TV 106.

FIG. 9 indicates that the OTT content menu 902 may include the format detection capabilities described above by including a thumbnail or label 904 for standard content 802 and immersive content thumbnails 906 for labeled 910 immersive assets/feeds 804.

Figure 10:
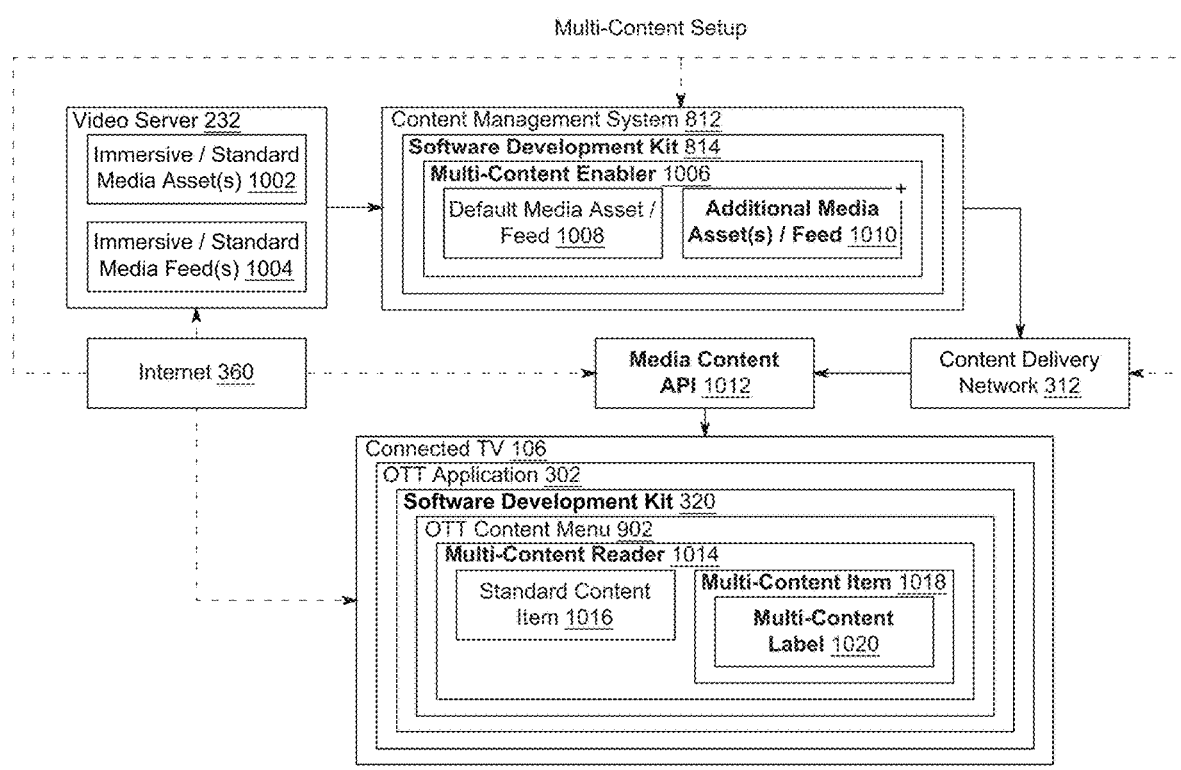
FIG. 10 depicts a block diagram for exploring content items associated with media assets for multi-POV content.

FIG. 10 depicts a block diagram for exploring content items associated with media assets. As shown in FIG. 10, the OTT application 302 is enabled to include an OTT content menu 902 that includes a multi-content reader 1014 module enabled to provide a standard content item label 1016 for standard assets/feeds 802 and also enabled to provide a multi-content label 1020 for assets/feeds that may be available either as a standard, non-immersive asset/feed 802 content or available as immersive content 804 which is also referred to as multi-content item 1018 (comprising both standard and immersive content). Accordingly, the media server 232 is enabled to store immersive and standard media assets 1002 together and/or immersive or standard media feeds 1004. The content management system 812 includes an SDK 814 having a multi-content enabler 1006 module to detect a default media asset/feed 1008 or additional media assets/feeds 1010 The default media asset/feed 1008 enables content administrators to include more than one media asset/feed in a single content item, which is an advantage as if the content only features a single media asset/feed, then the capability will remain inactive. Otherwise, the system would automatically label the content in the OTT menu to indicate to the user 102 that a content item features multiple media asset/feeds or multiple POVs. Via a media API 1012, and/or through the CDN 312, the multi-content reader 1014 may include a standard content label 1016 for a watchable asset/feed or a multi-content label 1020. His way the use is able to select whether to view an available media asset/feed as saved or provided in an immersive format (so the user 102 is able to explore/rotate in 360 degrees using the digital trackpad 122 or another remote) or solely in standard format where the user 102 is not able to explore/rotate in 360 degrees. Accordingly, each media asset available for viewing through the media server 232 as displayed on the connected TV 106 has an assigned label allowing the user 102 to identify whether there is an option for immersive viewing and exploration or not.

Figure 11:
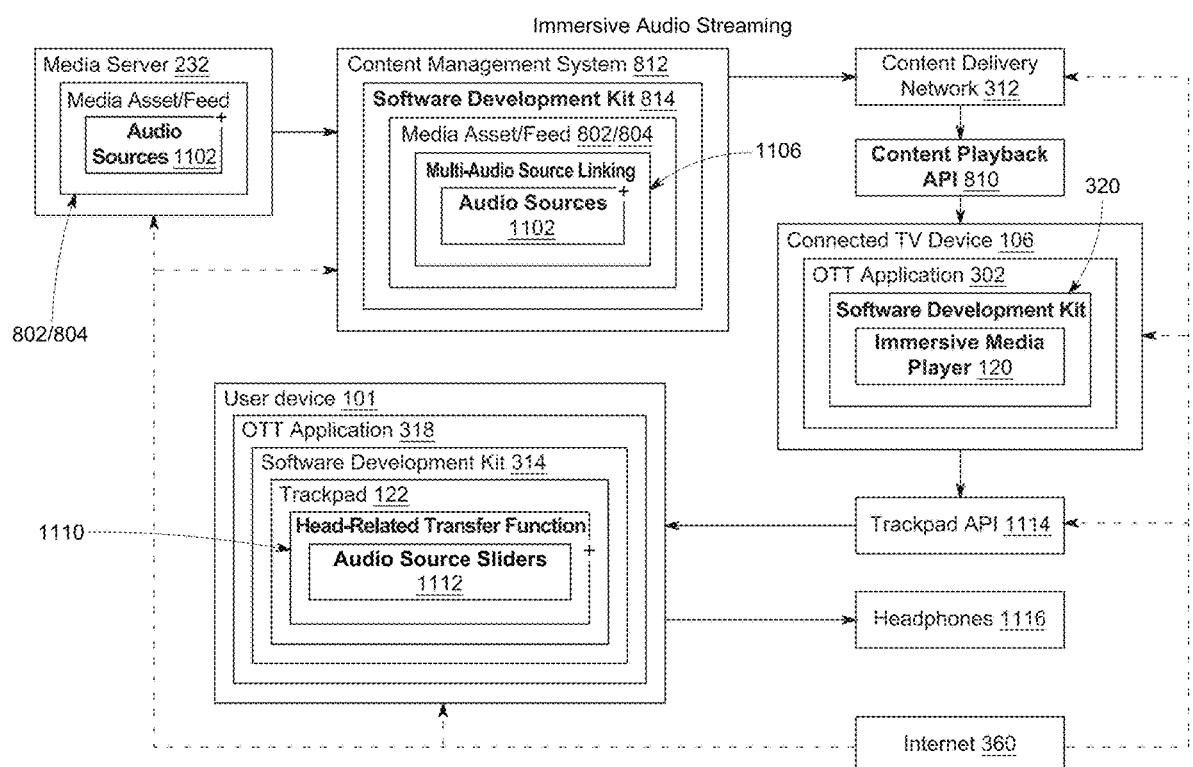
FIG. 11 depicts a block diagram for enabling the streaming and volume control of various audio sources of a single video content.

FIG. 11 depicts a block diagram for enabling the streaming of various audio sources. In a non-limiting embodiment, the OTT application 302 is able to feature one or more audio sources 1102 in connection with a media asset or feed 802/804, regardless of whether the media asset or feed 802/804 is available in standard format or immersive format as the media asset or feed 802/804 streams in the connected TV. The audio sources 1102 may include are not limited to direct sounds, ambient sound, color commentary, music soundtracks, and sound effects. Further the audio sources 1102 may be in spatial audio format. The audio sources 1102 may reach reply on independent volume controls in one or more non-limiting embodiments. Further, the volume controls may be embedded in the digital trackpad 122 as sliding anchor points 1112 that are configured to be moved to increase or decrease the volume of each particular audio source 1102 in real time. Further, the OTT applications 302 and 318 are adapted to enable the streaming of spatial audio sources 1102 on the mobile OTT application 318 simultaneous with the streaming of standard and/or immersive content 802/802 on the connected TV and connected OTT application 302. Users 102 can wear headphones and/or ear pods or any other listening device 1116, as referenced in FIG. 11, that are connected to the user device 101. FIG. 11 indicates that the OTT application 302 and 318 as installed or embedded on a connected TV 106 and/or separate user device 101 enables a user 102 to customize the user 102's audio experience in real-time.

In a non-limiting embodiment, the rotation of a streaming immersive asset/feed/video 804 on the connected TV 106 through the OTT application 302 governs a head-related transfer function (HRTF) 1110 inherent with the appreciation of any spatial audio sources 1102 The head related transfer function 1110 is an element of spatial audio that adjusts the volume of stereo sound channels independently to simulate the location of a sound source, no matter the direction the listener is facing. This is applicable in 360° video 108 or 804, where the user 102 would be able to rotate their view in any direction and still recognize where the sound is coming from at all times.

For example, a sound coming from the right side would cause the right audio channel to play the sound slightly louder and slightly sooner than the left channel, which simulates the behavior of sound waves entering the ears in a natural environment. Further, if the user 102 turns right to face the sound, then the HRTF 1110 informs the audio channels to play the sound at the exact same time and volume.

Accordingly, as shown in FIG. 11, a media server 232 may include one or more media asset/feeds 802/804 that include various audio sources 1102. The same media asset/feeds 802/804 are accessible from the content management system (CMS) 812. In the CMS 812, there may be multi-audio source linking 1106 of the audio sources 1102. The role of the multi-audio source linking 1106 is to allow content admins to upload (or link) separate audio sources of the same content in the CMS 812, such as ambient sound, play-by-play commentary, sound effects, and music. In such a case, the user's mobile trackpad 122 would facilitate volume control for each of the separate audio sources to customize their experience rather than only allowing for a single stereo audio source as is typically the case with most video content.

The CDN 312 may utilize a content playback API 810 to allow downloading or other types of display of the media asset/feed 802/804 on the immersive media player 120 (which can also display non-immersive/standard media assets/feeds 802) on the OTT application 302 on the connected TV 106. The trackpad API 1114 allows any command entered via the trackpad 112, including commands from the audio source sliders 1112 integrated into the mobile OTT application 318 on a user's smart device 101 to be communicated to the OTT application 302 on the connected TV 106 and implemented thereon.

Figure 12:
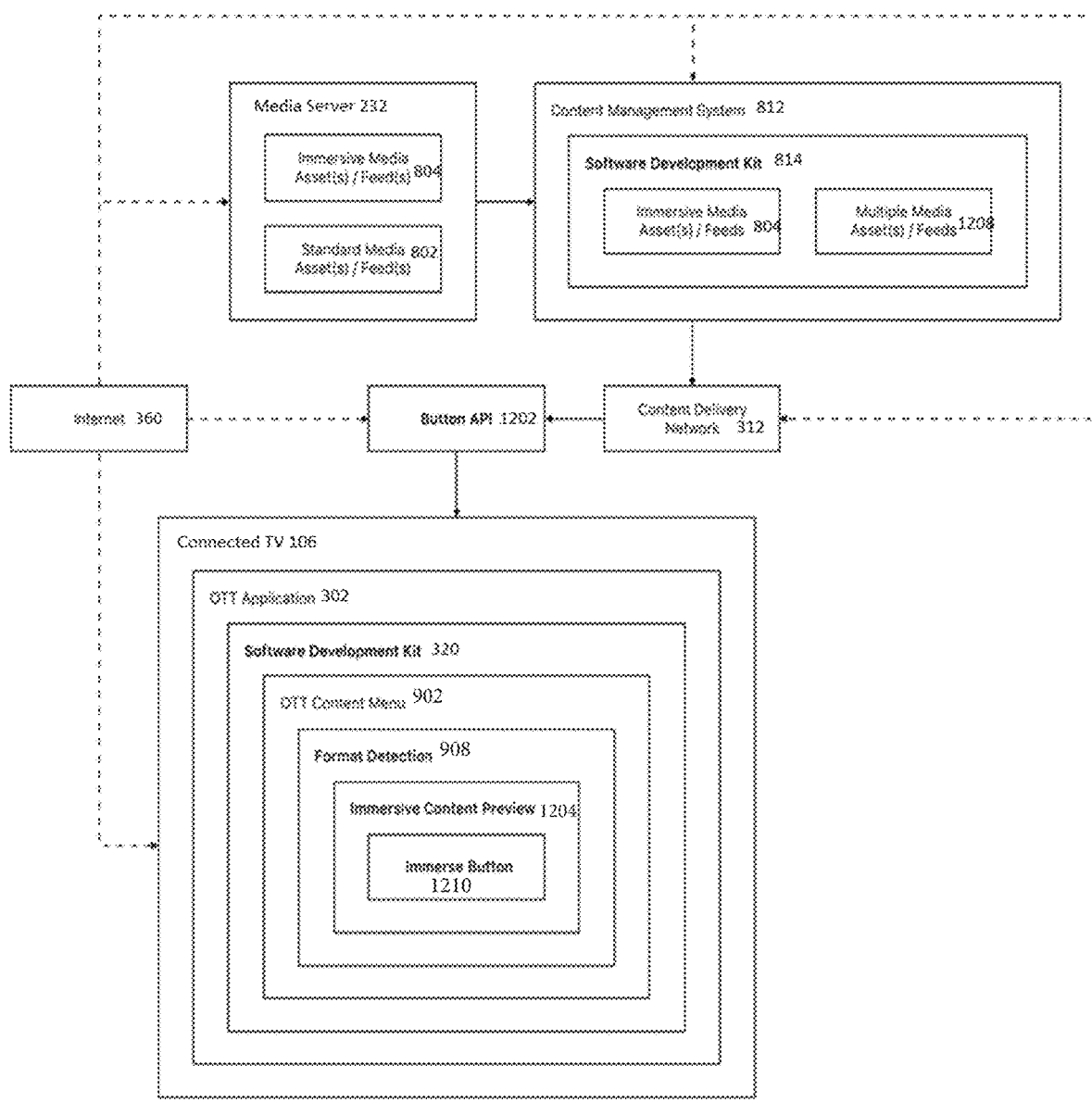
FIG. 12 depicts a block diagram with further details related to selectors for selecting immersive content.

FIG. 12 depicts a block diagram with further details related to selectors for selecting immersive content. The OTT application 302 may be enabled to automatically display various selectors such as the immerse button 1210 shown in FIG. 12 when immersive content is provided for viewing to a user 102 through the OTT application 302 via the immersive or 360 degree media player 120. There may be a button or selector API 1202 as shown in FIG. 12 that provides the ability for such immersive buttons or selectors 1210 that may be part of immersive content preview screens or menus 1204 to be displayed on the OTT content menu screen 902 in order for the user to access immersive content.

Accordingly, in some non-limiting embodiments, the OTT application 302 is enabled to detect when a content item is comprised of one immersive media asset/feed 804 or multiple types of media assets/feeds or multi-content items 1018 as shown in FIG. 10. The multi-content items 1018 may be an assortment of both standard 802 and/or immersive media assets/feeds 804. Further, in a non-limiting embodiment, the OTT application 302 is able to automatically replace a default "Watch" or "Play" button with an "Immerse" button wherein the "Immerse" button 1210 will begin streaming an immersive media asset/feed 804 or one of the multiple media asset/feeds 804 within a multi-content item 1018. Such selectors 1210 may allow the user 102 to quickly realize in real time when content offered to stream and display through the OTT content menu 902 and/or the OTT application 302 on the connected TV 106 is available for 360 degree rotation and exploration via the user's device 101 from the digital trackpad 122.

In other non-limiting embodiments, the OTT application 302 may be controlled alternatively by a remote control, a digital pointer, a joystick of a videogame controller, in addition to or separate from the digital trackpad 122 integrated into the mobile OTT application 318 on the user's device 101

1. Various other labels may be used to indicate that immersive content 108 is available including as examples of such labels, but not limited to, "Play in 360", "Watch in 360", "Immerse" or "VRTV" or "360." Accordingly, these visual cues will quickly prompt a user 102 to understand that immersive content 108 and/or a multi-content item 1018 is available for 360 degree exploration or rotation.

Figure 13:
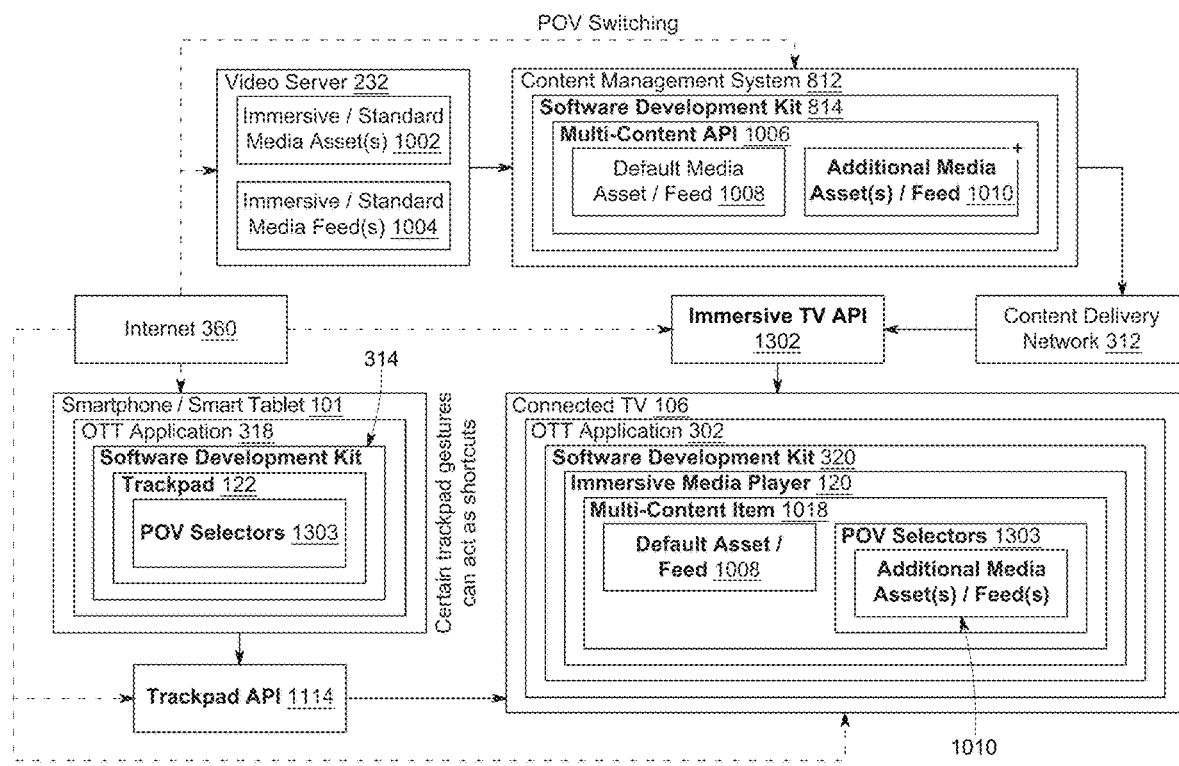
FIG. 13 depicts a block diagram with further details related to allowing a user to switch back and forth between different points of view of the same content using a separate device.

FIG. 13 depicts a block diagram with further details related to allowing a user to switch back and forth between different points of view of the same content. In a non-limiting embodiment, whether a content asset/feed is immersive or standard type, the OTT application 302 is enabled to allow a user 302 to switch between videos or recordings showing different points of view (POVs). "Points of view (POV)" as used herein relates to a recording or video of the same subject/environment from different standard or 360-degree cameras, thereby showing a different visual point of view to the user 302 to offer the user additional positions from where they can watch the same events or scene. In a non-limiting embodiment, the OTT application 302 including the embedded software development kit 320 includes instructions/protocol to recognize any type of media content items, whether standard content 802 or immersive content 804, that carry multiple POVs. The OTT application 302 further includes instructions to include a sub-menu in the 360 degree media player 120 listing all POVs via POV selectors 1303, as shown in FIG. 13. There may be a main set of POVs and additional POVs for a user 102 to select via the POV selectors 1303 as displayed on the connected TV 106 via the OTT application 302. Responsive to a POV selection, the chose POV file will be obtained or retrieved from the CDN 312, and then the chosen POV may be streamed and played on the connected TV 106. Notably, the chosen or selected POV inherits the same timecode left by a previous POV in a non-limiting embodiment.

Accordingly, any multi-content items 1018, whether standard assets/feeds 802 or immersive assets/feeds 804, can still allow a user 102 to switch between different cameras that may have been used by the directors/producers of the standard content 802 and/or immersive content 804 and view a same scene from different recorded angles. Such different recordings based on different POVs may be stored in the content management system 312 and retrievable from the CDN 312 via the immersive TV API 1302 and made available to the OTT application 302.

Notably, only immersive content 804 may allow a user 102 to rotate the view of any scene in a single content item using swiping gestures in the digital trackpad 122 from the user's device 101 (or using another input item such as the arrows of a TV remote). With standard content 802, the user 102 is not able to rotate the view of a scene in a single standard content item 802, but the user 102 can choose to view the same scene from a different position/angle by selecting a different available POV recording of the same scene.

In addition to the above, the OTT application 302 may include protocol or instructions to gain access to a content scheduling screen included in the CDN 312, wherein the scheduling screen allows an administrator 242 of the hosting system 228 to determine a time period in which each video file will be accessible to users 102 of the OTT application 302 on the connected TV 106, determine which groups of users 102 will be allowed to view the video, assign the video to a specific content category or group, and add tags or other values. Further, the OTT application 302 may include instructions to embed a browse button into the scheduling screen for adding alternate video files as part of the same content offering, wherein alternate videos may also be stored in the CDN 312. Further, the OTT application 302 may include instructions to enable the renaming of the alternate videos as the alternate videos appear to the user 102, and rearrangement of alternate videos for the administrator 242 to determine the order in which the videos will appear. Further, the OTT application 302 is enabled to allow alternate videos to inherit the same properties given by the administrator 242 to the main video or main POV. The purpose of the above is to allow a user 102 and/or administrator 242 to pre-load alternate videos in the 360 degree media player 120 to provide different points of view (POVs) within a single content item in the OTT application 302. FIG. 13 displays the capabilities of the system to allow for a user 102 to switch back and forth between different POVs for any type of content item whether in standard format 802 or immersive format 804.

Figure 14:
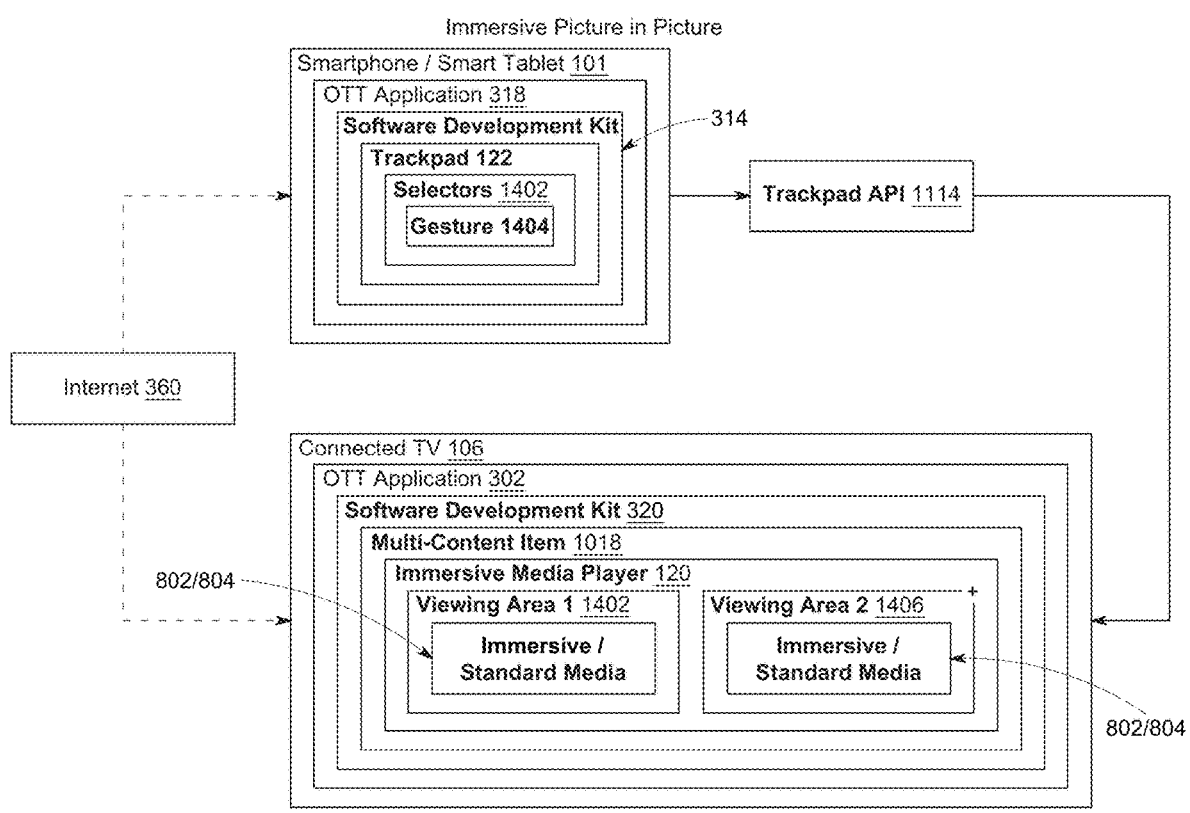
FIG. 14 depicts a block diagram with further details related to using gestures to implement particular functions from the trackpad of a smart device.

FIG. 14 depicts a block diagram with further details related to providing a picture in a picture (PIP) to a user. In a non-limiting embodiment, the user 102 can still operate the digital trackpad 122 from a user's device 101 via the mobile OTT application 318 to initiate, control, operate a split-screen of the viewing arrangement of the OTT application 32 displaying any kind of content (whether standard 802 or immersive 804) as shown on the connected TV 106. In a non-limiting embodiment, as shown in FIG. 14, there may be for example a first viewing area 1402 and a second viewing area 1406 displayed on the connective TV 106 screen via the immersive media player 120 and via the OTT application 302. Using one or more gestures 1404 and/or selectors 1402 included on the digital trackpad 122 of the OTT application 318, a user is able to enable the split screen arrangement to view a first viewing area 1402 and a second viewing area 1406 simultaneously to display one or more content items 802,804. Notably, one advantage of the split-screen arrangement or picture in a picture (PIP) options shown in FIG. 14 allows a user 102 to watch multiple points of view (POV) or pre-recordings of a content, whether standard 802 or immersive 804, at the same time on the same connected TV 106 screen. For example, when watching a baseball game, a user 102 can choose to watch the POV as displayed on a first viewing area 1402 whereby the POV is a recording captured by an immersive camera 116 or non-immersive camera from first base for example and the user 102 can choose to watch the POV as displayed on the second viewing area 1406 of the same baseball game from behind the home plate. Thus, the user 102 can enjoy the same baseball game but watching as recorded in either immersive or standard content format from different POVs. It is noted that the PIP system shown in FIG. 14 does not only have to be for the same video recording for the same type of content, as the user 102 can also watch more than video recording in the first viewing area 1402 and then the second viewing area 1406.

In a non-limiting embodiment, a gesture 1404 from the user 102 onto the trackpad selectors 1402 (e.g., such as a press of a button or sliding action with a user 102's finger) may enable the split-screen arrangement showing at least two sub screens 1402 and 1406 (although more than two sub screens on the same larger screen of the connected TV 106 is also possible and contemplated). Media content 1018 currently streaming on the connected TV 106, in response to such a gesture 1404 to create a split screen arrangement, may then occupy one section of the viewing area of the connected TV 106 and the selected media will occupy the remaining section of the viewing area, wherein another gesture 1404 may enable a third section and so on and so forth.

Further, the user 102 can disable the split screen arrangement or PIP function shown in FIG. 14 using the same gestures 1404 via the digital trackpad 122 in order to disable the split screen arrangement and return to a single viewing area in a full-screen mode without any sort of split screen arrangement.

In a non-limiting embodiment, there may be access to a content scheduling screen in the CDN 312, an administrator 242 or other party may embed a list of split-screen layouts/ arrangement, wherein every layout is accompanied by a checkbox for the operator to choose which layouts will be available to users 102 during split screen mode (e.g., as illustrated in FIG. 14). Further, there may be a sub-menu in the 360 degree media player listing multiple layouts or PIPs for the user 102 to choose from. A user 102 may choose to use a primary viewing area 1402 of the connected TV 106 screen to stream a primary POV and use a secondary viewing area 1406 to stream an additional POV or the last-choose additional POV, as well as to stream a choose POV that inherits a same timecode left by a previous POV in full screen mode. Further, the user 102 can mute the audio of the POV streaming in either viewing area 1402, 1404 of the screen using the digital track pad 122 selectors 1402 and/or gestures 1404, which allows the users 102 to enjoy multiple POVs simultaneously in different viewing areas, picture areas of the same screen and with the audio clarity the users 102 desires.

There may be further ability to customize controls and selectors provided to a user 102 via the OTT application 302 on the connected TV 106 such as including labels indicating that there may be a primary or secondary screen. Other exemplary labels may state "Screen 1" or "Screen 2" or the like, whereby each option of the sub-menu offers a drop-down with pre-loaded POVs, which allows a user to choose which POV will appear in each section of the screen. Accordingly, the OTT application 302 and system includes activation capabilities for the PIP split screen arrangement and further customization.

Figure 15:
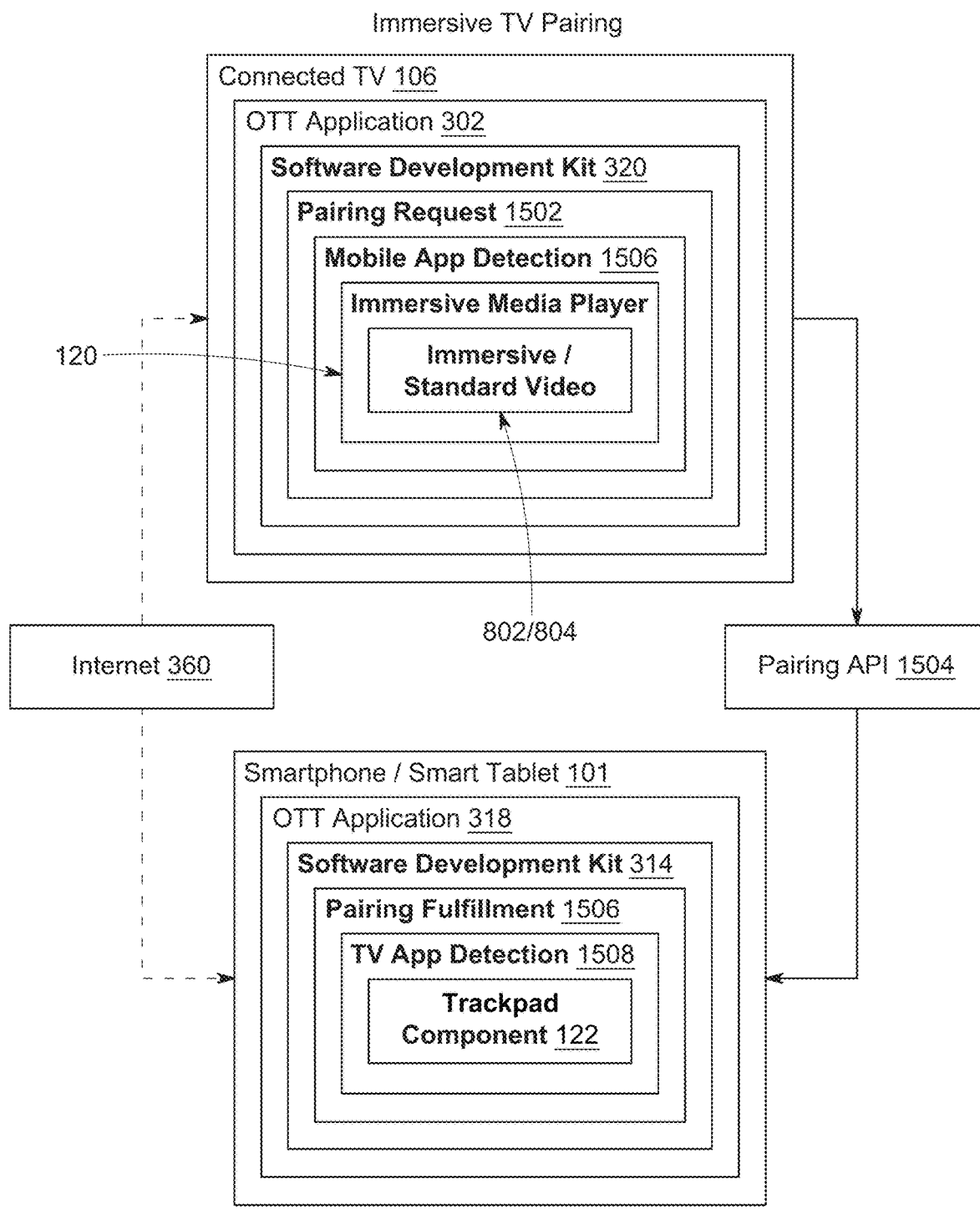
FIG. 15 depicts a block diagram with further details related to pairing between a television viewing device and a smart device.

FIG. 15 depicts a block diagram with further details related to pairing between a television viewing device and a smart device. In a non-limiting embodiment, there may be multiple ways for a user 102 to pair a user device 102 and mobile OTT application 318 with a connected TV 102 that the user 102 desires to control. The user 102 may pair a user device 101 with the connected TV 106 via BLUETOOTH or via QR code (e.g., as shown in FIG. 4C in a non-limiting embodiment), via a human-readable passcode, in order to have that user device 101 be recognized as the only device authorized to command the functions and features of the OTT application 302, including an ability to rotate in 360 degrees an immersive content item 108 from the digital trackpad 122 of the mobile OTT application 318. As shown in FIG. 15, there may be a pairing API 1504 included that allows communication for the pairing procedure to occur between the mobile OTT application 318 and the OTT application 302 on the connected TV 106. There may further be a TV APP detection 1508 module with the mobile OTT application 318 in order to have the pairing fulfillment 1506 occur between the connected TV 106 and the separate user device 101.

If a QR code is utilized for pairing, the application may launch a QR scanner in the user's device 101 to recognize the QR code as displayed on a connected TV 106 or elsewhere. Further, the SDK 314 of the mobile OTT application 318 may bypass any QR code not linked to the 360 degree media player 122 of the OTT application 302 for the connected TV device 106. Upon a successful pairing, via wireless pairing over the internet 360, the user's device 101 may be recognized as a remote control of the OTT application 302 and the media player 120 of the connected TV 106 for operating any of the functions and features for any of the Figures associated with this present description and described herein.

Advantageously, one of the functional benefits of the pairing allows user to leverage a screen of a user's smart device 101 as a surface to command 360 degree rotation of an immersive content item 108 with more precision and in any natural direction.

Figure 16:
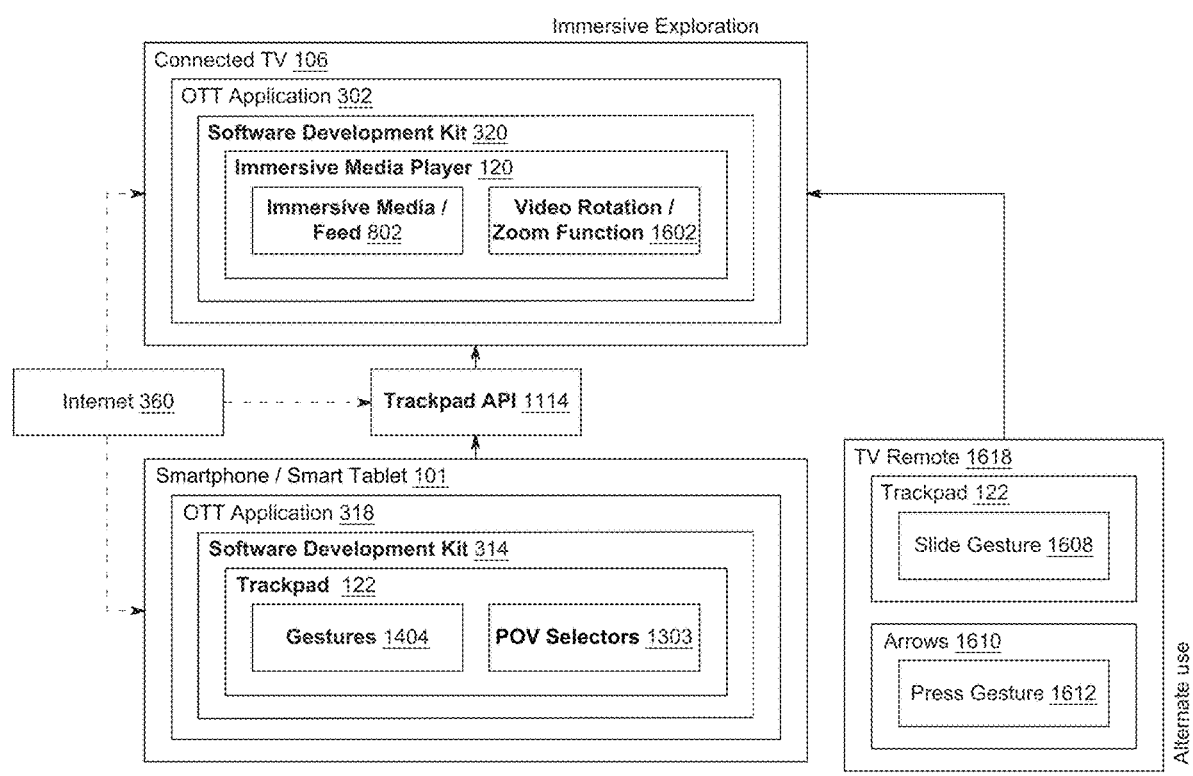
FIG. 16 depicts a block diagram with further details related to recognition of particular gestures to allow users to explore immersive content.

FIG. 16 depicts a block diagram with further details related to recognition of particular gestures to allow users to explore immersive content. Upon pairing of the user device 101 to control the OTT application 302 and 360 degree media player 120 of the connected TV 106, several gestures 1404 may be utilized to cause particular effects or functions to occur to a content item 802/804 available for watching on the connected TV 106 via the OTT application 302. For example, in a non-limiting embodiment, a one finger sliding gesture atop the digital trackpad 122 from the user device 101 may enable a click and drag action, wherein this one-finger sliding gesture will command the rotation of the immersive video 804 as the immersive video 804 streams in the connected TV 106, wherein the immersive rotation is omnidirectional. Further, in a non-limiting embodiment, two-finger sliding gestures over or atop the digital trackpad 122 may act as a zoom command, wherein the upward motion of the two-finger sliding gestures over the digital trackpad 122 may enlarge a video 802/804 being displayed on the connected TV 106 and controlled by the acts/gestures 1404 of the user 102 on the digital trackpad 122, thus advantageously, enlarging a field of view contained in the connected TV 106 and 360 degree media player 120. Further, any downward motion of the two-finger sliding gesture on the digital trackpad 122 may shrink the size of the content item 802/804 displayed on the screen, thus reducing the field of view shown on the connected TV 106.

In a non-limiting embodiment, two-finger sliding horizonal gestures on the digital trackpad 122 on the user device 101 may be recognized as a POV-switching command. For example, in a non-limiting embodiment, a right motion of a gesture 1404 may stream a next POV available on a list and a left motion may cause streaming of a previous POV for a same content item 802, 804.

In a non-limiting embodiment, one-finger tapping of a digital trackpad 122 may act as a pushing of a button on a screen of the connected TV 106, and two-finger tapping on the digital trackpad 122 may cause the split screen arrangement or PIPs shown and described above with respect to FIG. 14.

Accordingly, various gestures 1402 on the digital trackpad 122 may be programmed to cause particular functions to occur including the video rotation/zoom functions 1602 discussed above and shown in FIG. 16.

t is noted that in an alternate use, a TV remote 1618 may alternatively, or additionally be used to control an OTT application 302. Sliding gestures 1608 on a non-digital trackpad 1606 of the TV remote 1618 and/or press gestures 1610 from one or more arrows 1610 of the TV remote 1618 may also be recognized to cause certain effects and functions to occur on the connected TV 106 and the OTT application 302.

Figure 17:
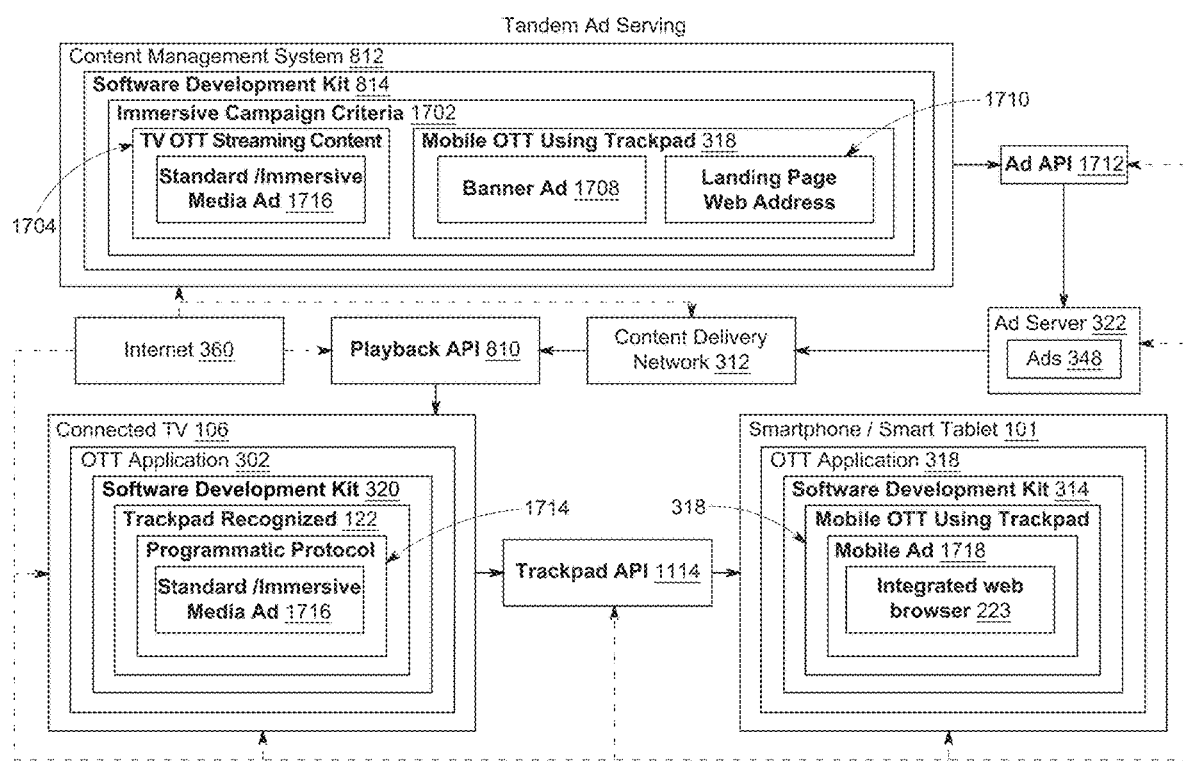
FIG. 17 depicts a block diagram with further details related to tandem ad serving that connects advertisements displayed on a connected television with clickable ads on the mobile OTT on a user's smart device.
Figure 18A:
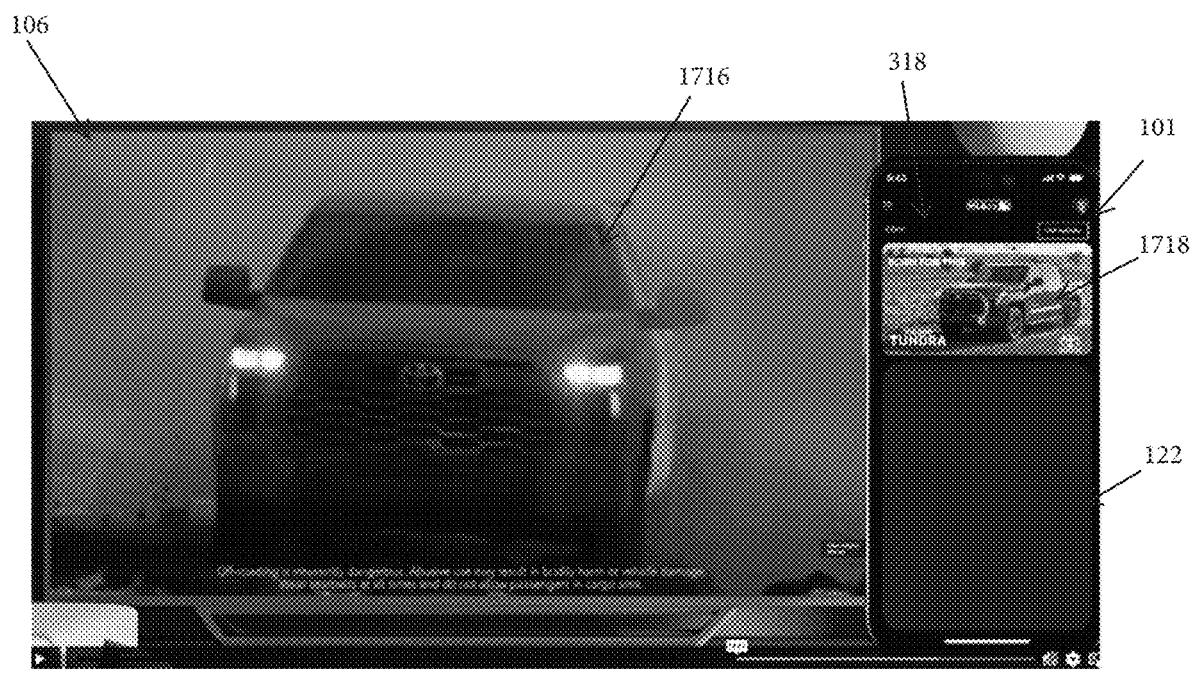
FIG. 18A depicts a pictorial illustration depicting an example of tandem ad serving in accordance with FIG. 17.
Figure 18B:
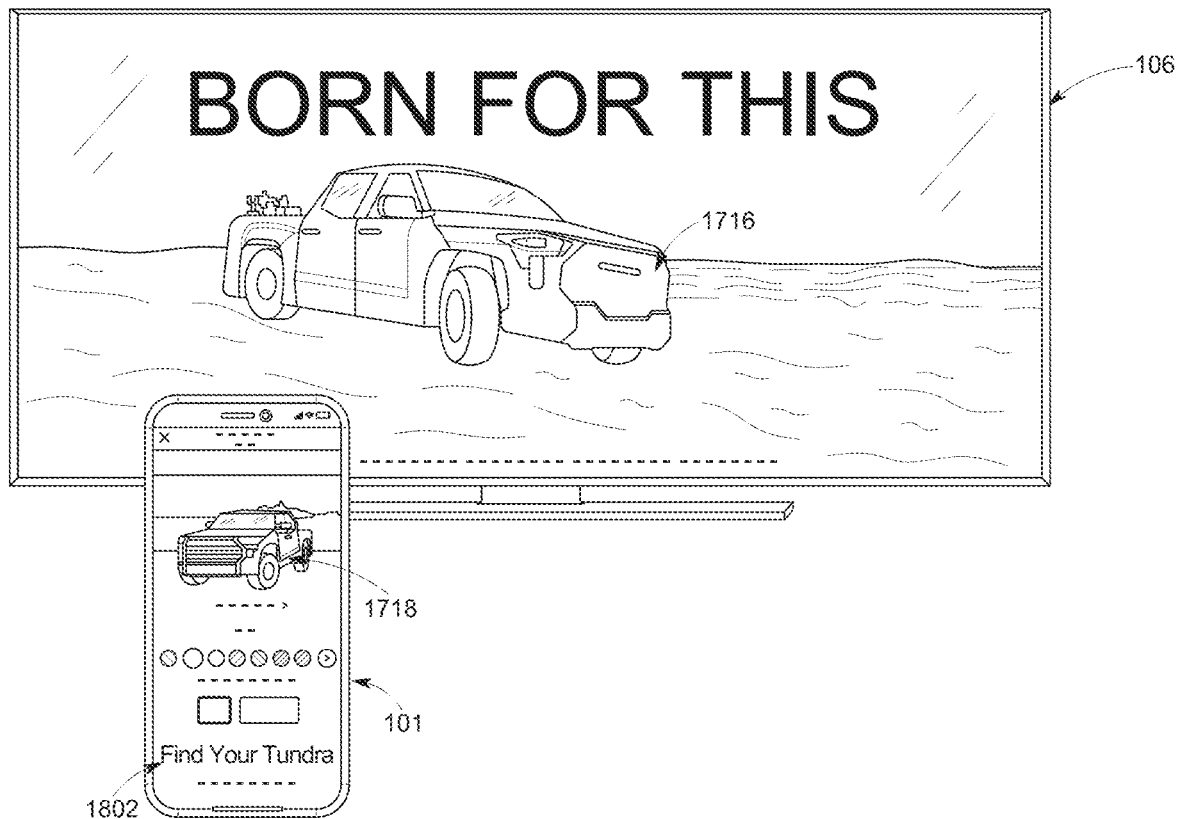
FIG. 18B depicts a pictorial illustration depicting an example of tandem ads in accordance with FIG. 17.

FIG. 17 depicts a block diagram with further details related to tandem ad serving that connects advertisements displayed on a connected television with the mobile OOT on a user's smart device. FIG. 17 depicts a capability for advertisements 1718 as displayed on a connected TV 106 to have a tandem mobile ad 1718 substantially simultaneously appear on the mobile OTT application 318 of the user's device 101. In this manner, the advertisers 114 have a means to grab the attention and focus of the user 102 and to also push specific links and means to access an advertiser 114's website or other location for the user 102 to be provided with further information about a particular product or service advertised by a specific advertiser 114 on the connected TV 106 that is paired with the user device 101 and controlled by the digital trackpad 122 in the mobile OTT application 318. Accordingly, as shown in FIG. 18A and in FIG. 18B, if a vehicle advertiser 114 has an advertisement 1716 streaming and available for display on the connected TV 106 advertising for the truck shown in FIGS. 18A-18B, the system 1700 further provides a tandem mobile ad 1718 of the same brand on the screen of the user device 101 for the user to click on if desired. FIG. 18A shows an example in which the truck advertisement displaying on the screen of the connected TV 106 (via the OTT application 302) has a tandem banner ad 1718 simultaneously playing to the user on the user device 101. In a non-limiting embodiment, the tandem banner ad 1718 is placed above the user trackpad 122 in the mobile OTT application 318 on the user's smart device 101 as shown in FIG. 18A. FIG. 18B shows that the user may select the banner ad 1718 and obtain further specific information and details via an advertiser's web page or other source of information.

There may also be immediate buttons and selectors 1802 a user 102 can engage with to customize the same advertised product. Further, there may be a link to a website or email or other means for a user 102 to receive further information about the advertised product/service and/or purchase such as product/service being advertised on the connected TV 106. Such tandem ads 1718 advantageously are triggered to launch automatically on a user's mobile device 101 via the mobile OTT application 318 as soon as a particular advertisement 1716 having such an associated tandem ad 1718 launches on the connected TV 106 via the OTT application 302. It is noted that an advantage of the above is that one or more advertisements 1716 and/or tandem ads 1718 may be recorded to be immersive and a user can rotate the screen 360 degrees to interact and watch the advertisement 1716 on the connected TV 106 and/or the tandem ad 1718 displayed on the user's computing device 101.

As shown in FIG. 17, the CMS may include one or more immersive campaign criteria 1702 that highlights OTT streaming content 1704 having standard/immersive media advertisements 1706 that will then be displayed on the connected TV 106 via the OTT application 302 and via a pre-programmed protocol 1714. Further, there may be a module for banner ads 1708 and landing pages with web addresses to be pushed to and launched onto the mobile OTT application 318 on the user device 101 substantially simultaneously when the media ad 1716 (whether in standard content format or immersive content format) is displayed on the connected TV 106 via the OTT application 302. An integrated web browser 223 in the separate user device 101 may be used to access and open such web addresses 1710 associated with the advertiser 114.

In a non-limiting embodiment, this capability allows a user to direct opt in to learn more about any advertisements 1716 appearing on the connected TV 106 and be provided directly on the user's phone or other smart device 101 accessible links to locations for purchasing an advertised product or service (e.g., the truck shown in FIGS. 18A-18B). A banner ad 1708 as shown in FIG. 17 may be any type of static or animated banner ad.

Figure 18C:
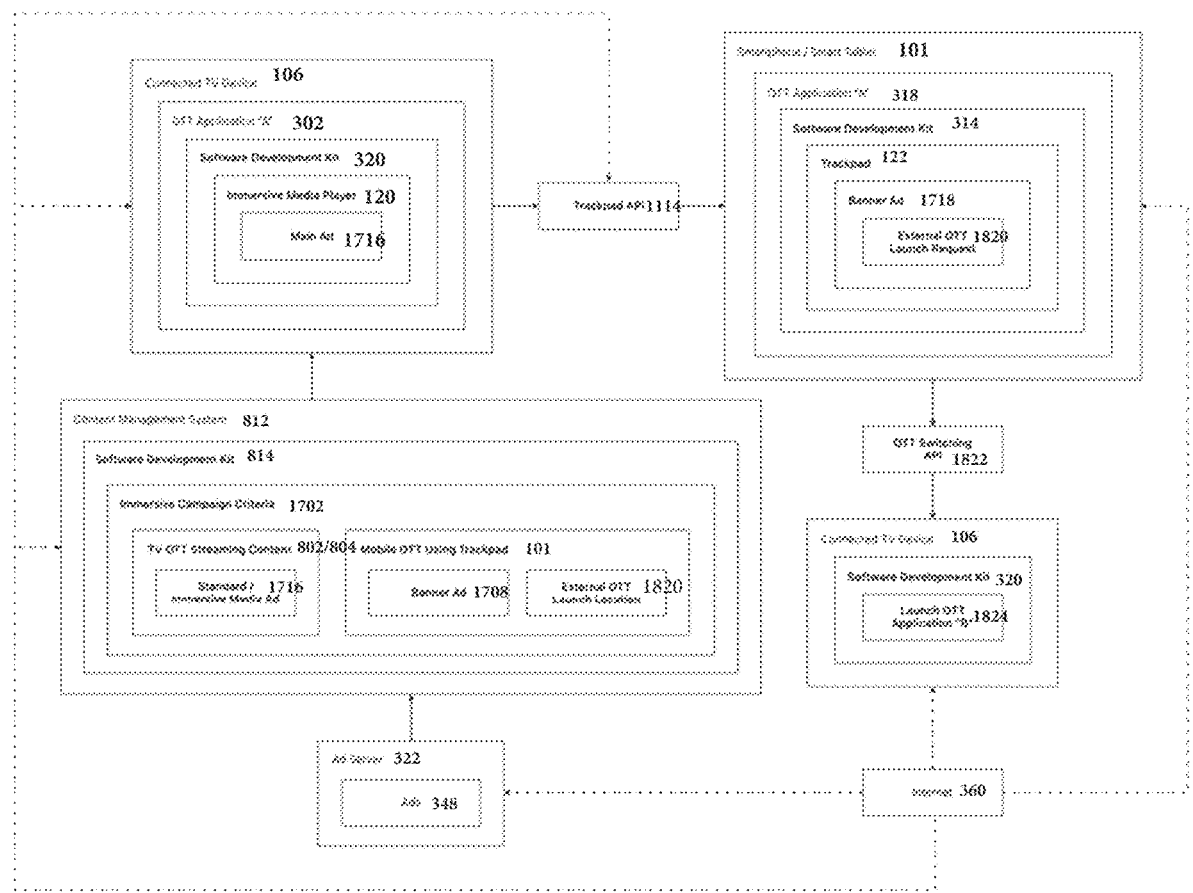
FIG. 18C depicts a block diagram for OTT app switching.

FIG. 18C is directed to OTT app switching, showing that an administrator 242, for example, could configure the clicking of an interactive, immersive TV ad 114 such as that shown in FIGS. 5A-5B to launch a different OTT app 1824 on the connected TV device 106. The command 1820 would call upon an OTT Switching API 1822 to search if the device 106 has installed the OTT app promoted in the interactive ad 1716 (which may be an immersive ad 114 as shown in FIGS. 5A-5B in one or more non-limiting embodiments) or otherwise launch the download screen for said OTT app. In a non-limiting embodiment, this capability allows a user 102 to launch the promoted OTT app 318 by clicking a tandem ad 1718 appearing in their smartphone or other smart device 101.

Figure 19:
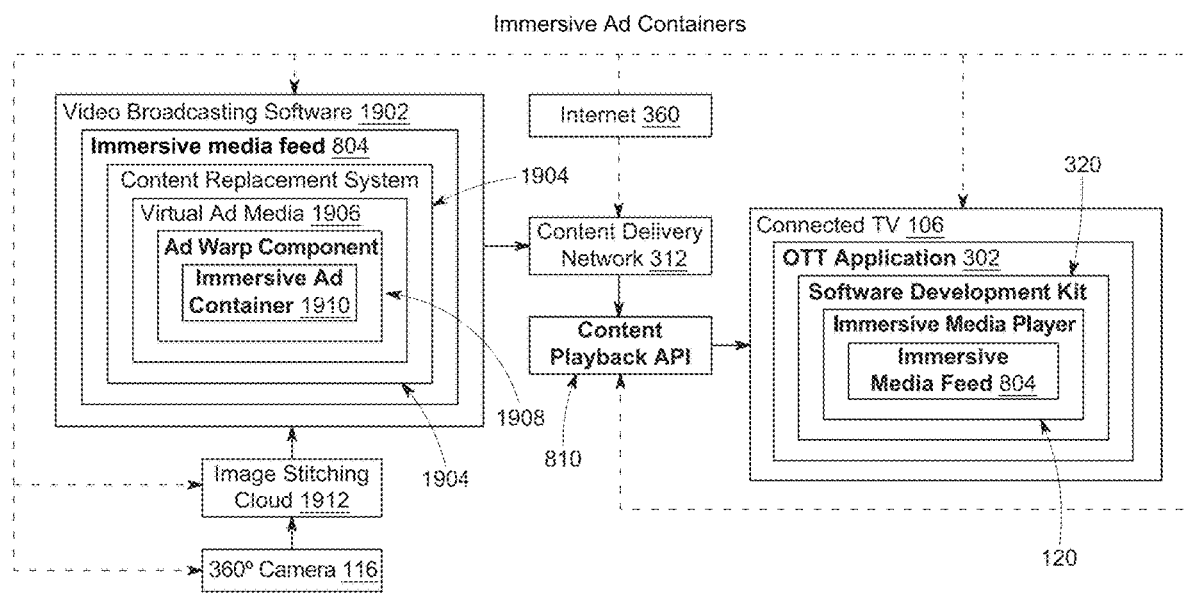
FIG. 19 depicts a block diagram for adapting the insertion of dasherboard ads in ad containers as represented in a 360° video.
Figure 20:
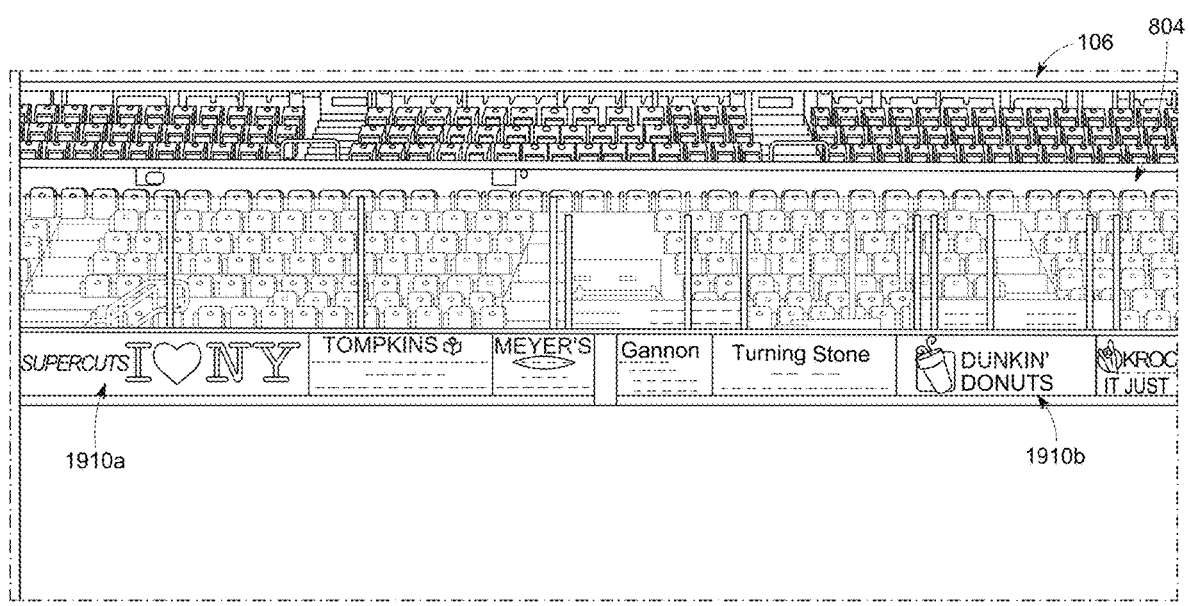
FIG. 20 depicts a pictorial illustration illustrating examples of immersive ad containers.

FIG. 19 depicts a block diagram for immersive ad containers and FIG. 20 depicts a pictorial illustration illustrating examples of virtual ad containers, consisting of surfaces inside a filmed venue that have been outlined to insert media ads digitally as part of the video. The ad containers and the virtual ads are layered separately using a content replacement system that avoids them interfering with the objects and actions filmed in front of them, hence simulating as if the ads were appearing on a real-life digital screen at the venue, as opposed to being inserted digitally on the video. In the case of an immersive media feed, these virtual ad containers will appear warped, as is the nature of equirectangular video. For this purpose, the capability would provide an image warp process that would adjust the normal shape of the digital ad to the warped shape of the virtual ad container as represented in the immersive video. The virtual ad placement on the immersive stream will occur using a 360° camera feed that informs the video content replacement system of the exact shape, positioning, and alignment data of the ad containers as they appear in an equirectangular video; wherein an operator or programmatic advertising software will insert the virtual ad inside the container once the ad has undergone the image warp process. In order to accommodate multiple types of advertisements from multiple advertisers 114 at various recorded events that may be offered in an immersive content 108 recording, the system as described herein is enabled to insert media ads inside virtual ad containers 19010 in an immersive media stream 804.

An ad container refers to a rectangular area dedicated to advertisements or other types of information that are incorporated in designated locations in physical venues such as sports stadiums, rinks, concert halls, stages, or other physical structures. It is well known that if there is a well-funded sporting event, such as the WORLD CUP or SUPERBOWL, in a standard video virtual ad containers advertising the name, brand, logo, or other information associated with advertisers 114, are inserted on the standard video over select surfaces surrounding a field, court, rink, or track where an event (e.g., sports or other types of events without limitation thereto) are taking place. Typically, such virtual ads are inserted into the virtual ad containers and the virtual ads are layered separately to avoid interfering with the objects and actions occurring in front of them in order to simulate that the ads are appearing on a real-life digital screen at the venue, as opposed to being inserted digitally on the video. Advertisers 114 highly desire that their names/logos/imagery appear in such ad containers as it is considered good advertising and a good way to have an advertiser 114 and/or sponsor's name highlighted and made readily available to a great number of viewers of a recorded event at once.

As shown in FIG. 19, the system allows for any such ads for any advertisers 114 included in an immersive recording of an event (e.g., sporting event or any other type of event) that are meant to be located in such ad containers 1910 as displayed on a connected TV 106 screen to the user 106 to be warped or reshaped so that a rectangular ad can be reshaped into equirectangular form, so that when the ad is included in the 360 degree immersive content 804, the equirectangular form is displayed and a user can see the ad as a normal shape when the user rotates the video using the digital trackpad 122 from the user device 101. Accordingly, the ad warp component 1908 of the system is able to warp or reshape the standard, rectangular ad to be clearly visible to the user 102 when the user 102 views the content item in immersive view and rotates through the imagery. FIG. 20 shows an example of a recording of an immersive video 804 available to stream on a connected TV 106 in which the immersive video 804 displays a sporting event at a sports stadium having many seats and having physical ad containers distributed around the rink where the sporting event will take place. As shown in FIG. 20, the ad container 1910a can be enabled to clearly illustrate even in an immersive recording of the sporting event advertisement for SUPERCUTS and/or an ad container 1910b may advertise for DUNKIN DONUTS. To enable clear understanding of these ads included in these ad containers 1910a, 1910b shown in FIG. 20, the system has to detect which videos or images must be superimposed in the rectangular containers superimposed in fixed structures of the environment being filmed by 360 degree omnidirectional cameras 116. It is noted that ads as produced by advertisers 114 are usually produced in standard, rectangular banners that are either video or static. An equirectangular video would cause the ad containers 1910a-1910b around the ice rink as pictured in FIG. 20 to be warped. Accordingly, the system is able to warp a normal, rectangular shape of a standard ad to fit the shape of the warped ad container in an immersive content display of an event or other type of content. Subsequently, these videos or images are then submitted to a warp effect via an ad warp software component 1908 based on the warped shape of the rectangular fixed surface in an equirectangular video signal, and then the videos or images are placed on the virtual rectangular containers 1910 based on programmatic advertising protocols. Further, the videos or images are manually placed through a broadcasting software 1902, as shown in FIG. 19 in the immersive media feed 804, all with the purpose of accommodating multiple targeted advertisements from a video publisher to serve viewers 102. To better understand the appearance of warped images, one may view the following websites illustrating the warped appearance of 360 degree content which are meant to illustrate how a warped image appears.

> https://cdn.forumcomm.com/dims4/default/4faeaf5/
> 2147483647/strip/true/crop/1620x1080+0+0/resize/
> 840x560!/quality/90/?url=https%3A%2F%2Ffee-cue-
> exports-brightspot.s3.us-west-
> 2.amazonaws.com%2Fduluthnewstribune%2Fbinary%
> 2FB23A5836_binary_7221847.JPG and https://
> 113.alamy.com/360/R076NF/curling training-in-
> brasov-R076NF.jpg Accordingly, as shown in FIG. 19, the immersive media feed 804 is manipulated by the video broadcasting software 1902 such that the virtual ad containers 1910 are enabled to hold imagery from an advertiser 114 that is viewable in 360 degree, immersive view. There may be a content replacement system 1904 module that is part of the video broadcasting software 1902 provided by the same administrative entity 242 offering the OTT application 302 for a connected TV 106 and for the mobile OTT application 318 for the user device 101, whereby the content replacement system 1904 ensures that any advertisements included with the immersive media feed 804 made available via the OTT application 302 that are meant to be illustrated in a virtual ad container 1910 are warped prior to streaming so any text or imagery as displayed to the user 102 in an immersive feed 804 is clear and viewable. A cloud based image stitching may consolidate any shots by all the lenses of the omnidirectional cameras 160 into a single picture. Image stitching or photo stitching is the process of combining multiple images or videos with overlapping fields of view to produce a seamless panorama. The 360 degree omnidirectional cameras 360 provide such as seamless panorama comprises of multiple lenses pointing in different directions.

Further, the virtual ad placement on the immersive media stream or feed 804 occurs using a 360 degree camera 116, as shown in FIG. 19, that informs a content replacement system 1904 of the exact shape, positioning, and alignment data of the ad containers 1910 as they appear in an equirectangular video (i.e., immersive video content item 108), wherein an operator or programmatic advertising software is enabled to insert the virtual ad inside of the immersive ad container 1910 and to warp the shape of virtual ads to fit the warped shape of the immersive ad containers 1910 as the immersive ad containers 1910 appear in an equirectangular immersive video 108. Without warping such text or imagery contained in the physical ad containers at a venue, a viewer 102 would not have a clear view of the text or imagery when rotating the immersive feed 804.

Figure 21:
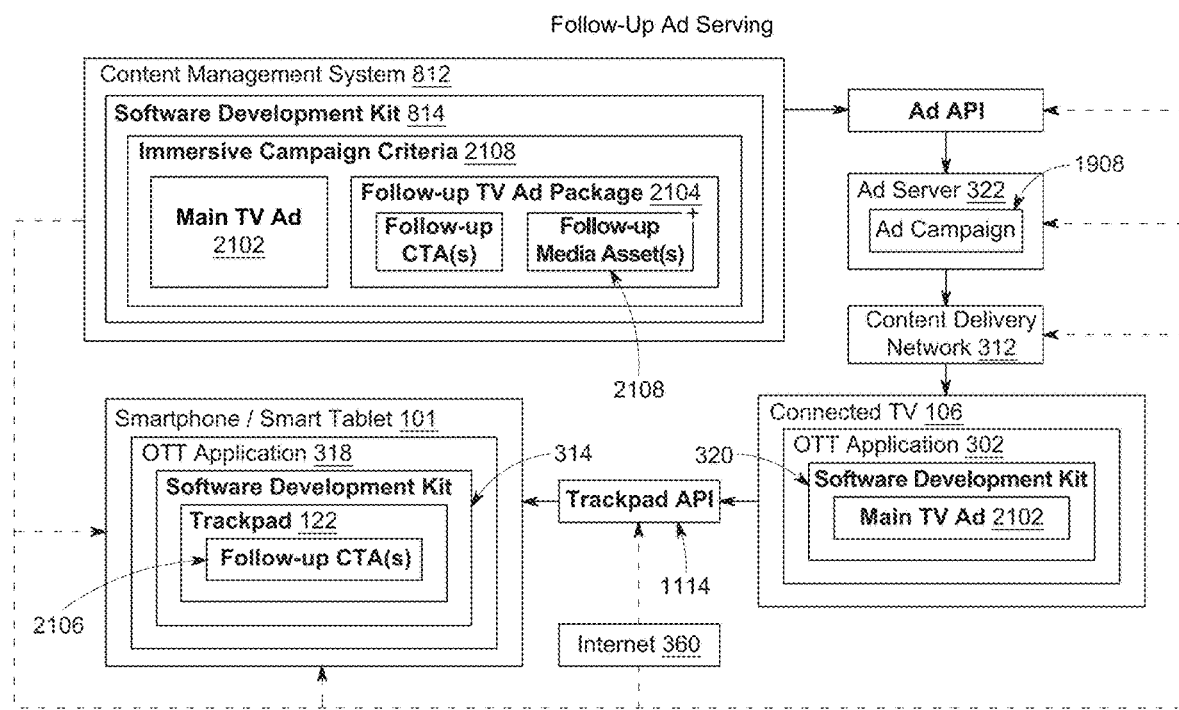
FIG. 21 depicts a block diagram for follow up ad containers.

FIG. 21 depicts a pictorial illustration for follow up advertisements. In a non-limiting embodiment, the system herein may be enabled to feature one or more calls to action (CTA) 2106 in connection with an ad 2102 streaming in the OTT application 302 of the connected TV 106 and that is connected to the user computing device 101 having a mobile OTT application 318 and digital trackpad 122. A user selection of a CTA 2106 will request watching a continuation or additional version of an ad 2102 appearing or streaming in the OTT application 302 on the screen of the connected TV 106. CTAs 2106 may appear as buttons or other types of selectors on the digital trackpad 122 on the user's device 101 as part of the mobile OTT application 318. A CMS 812 of the ad server 322 will enable the presence of additional parameters to the main ad campaign criteria 2108. The parameters may include an option to add CTAs 2106 alongside a specific media asset for each advertisement whereby the text of the CTAs 2106 may be customizable in the CMS 812. An alternate form may be enabled featuring one or more CTAs 2106 in connection with an ad 2102 streaming in the OTT application 302 of the connected TV 106, in which a user selection of a CTA 2106 may launch a specific URL in the web browser 223 in the user device 101. This allows users 102 to follow up on ads 2102 that appeal to the users 102 and have CTAs 2106 associated with them so the user 102 may learn more about an advertised product or service. Such a feature further benefits the advertiser 114 whose content may or may not be immersive 108 but who wants to include CTAs 2106 to be provided to the mobile OTT application 318 that a user can follow up on if interested in the advertisement 2102 displayed on the connected TV 106. In a non-limiting embodiment, follow up ads can also be watched in a media player 120 inside a user's device 101 so that the normal flow of TV programming is not interrupted.

There may be many other useful applications for the one or more components of the system in the one or more non-limiting embodiments presented above, and multiple advantages and benefits.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted. The term "coupled to" as used herein may refer to a direct or indirect connection. The term "set" as used herein may refer to one or more of an item.

What is claimed is:

1. A computer implemented method, comprising:

installing, integrating, or embedding a first software development kit (SDK) or native source code directly in an over the-top (OTT) streaming application or indirectly through a cloud broadcasting system (CBS) or content delivery network (CDN) powering the OTT streaming application, wherein the OTT streaming application is downloadable and accessible by a user through a connected television (connected TV), wherein the connected TV device comprises a television or a hardware enabled digital media player that is capable of processing internet wirelessly to download and launch the OTT streaming application and to download equirectangular immersive content for display on the connected TV, wherein the OTT streaming application comprises a 360 degree digital multimedia player; and installing, integrating, or embedding a second software development kit (SDK) on a separate user computing device that is separate from the connected TV, wherein the second SDK is part of a user computing device version of the OTT streaming application, wherein the user computing device version of the OTT streaming application comprises a digital trackpad configured to explore and navigate the equirectangular immersive content viewable on the connected TV using the digital trackpad installed on the user computing device version of the OTT streaming application on the separate user computing device;

wherein the first SDK and/or the second SDK having the 360 degree digital media player includes capabilities to bypass a 360 degree image/video rotation function in the 360 degree digital media player when detecting standard, non-rotational images or video and activate 360 degree image/video rotation function when detecting immersive, rotational image/video, further comprising recognizing a one-finger sliding gesture on the digital trackpad as a click and drag action, wherein the one-finger sliding gesture commands rotation of an immersive video as the immersive video streams in the connected TV, wherein rotation is omnidirectional, recognizing a two-finger sliding vertical gesture on the digital trackpad as a zoom command, wherein the upward motion of the two-finger sliding gesture enlarges video content and shrinks a field of view contained in the 360 degree digital media player on the OTT streaming application on the connected TV, wherein a downward motion of the two-finger sliding gesture enlarges the field of view contained in the 360 degree digital media player on the OTT streaming application on the connected TV.

2. The computer implemented method of claim 1, wherein the first SDK and/or the second SDK further comprise capabilities to adjust a warp inherent with the equirectangular immersive content to portray a realistic aspect ratio of a subject or environment and to stitch edges of the equirectangular immersive content to provide seamless continuity in any x, y, or z axis to provide omnidirectional rotation within a viewable area of the 360 degree digital media player.

3. The computer implemented method of claim 2, further comprising, requesting access to the CBS or CDN that feeds image and video content to the OTT streaming application and detecting an aspect ratio of the image and video content, wherein any image and video content having the aspect ratio equal or above 2:1 is recognized as being immersive content, and wherein any image and video content having the aspect ratio under 2:1 is recognized as standard, non-immersive content.

4. The computer implemented method of claim 3, labeling particular images and video content as being the immersive content while stored in the CBS or CDN and labeling particular images and video content as being standard, non-immersive content while stored in the CBS or CDN.

5. The computer implemented method of claim 1, further comprising rotating a view of an immersive video streaming on the connected TV on the 360 degree digital media player, wherein the rotation is based on sliding or movement of figures on the digital trackpad on the separate user computing device.

6. The computer implemented method of claim 1, further comprising, automatically assigning a text or iconic label to any summary description of equirectangular immersive content appearing in a user menu of the OTT streaming application in order to allow users to identify content provided by the CDN or CBS as being immersive content.

7. The computer implemented method of claim 1, recognizing and detecting when an immersive video is available and automatically replacing an existing selection button with a button having a label indicating access to immersive content is available to a user from a user menu on the OTT streaming application on the separate user computing device.

8. The computer implemented method of claim 1, further comprising recognizing and detecting content that is available as both standard and immersive content through the CDN or CBS and adding an additional label indicating access to immersive content is available or a user can select to view the content in standard, non-immersive format.

9. The computer implemented method of claim 1, further comprising, uploading a static or animated banner ad that appears on a screen of the OTT streaming application on the separate user computing device simultaneously with an advertisement displayed on the connected TV, wherein the static or animated banner ad contains imagery and/or textual information that corresponds to an advertisement displayed on the connected TV, and wherein the static or animated banner ad includes a link or other means for a user to click and obtain further information about advertised content shown in the advertisement displayed on the connected TV.

10. The computer implemented method of claim 1, further comprising, detecting videos or images to be superimposed in rectangular containers superimposed in fixed surfaces of an environment filmed by 360 degree cameras, and submitting the videos or images to a warp effect based on a warped shape of the fixed surfaces in an equirectangular video signal, placing the videos or the images based on programmatic advertising protocols, and placing the videos or images manually through a broadcasting software in order to accommodate multiple targeted advertisements from a video publisher to serve viewers.

11. The computer implemented method of claim 1, further comprising, gaining access to a content scheduling screen in the CDN or ad server, embedding a button related to adding an audio source, triggering an appearance of a browse button, wherein an administrator and/or advertiser is enabled to add one or more new audio sources, wherein the one or more new audio sources comprise ambient sound, color commentary, music soundtrack, and sound effects, recognizing an addition of spatial audio tracks, and enabling spatial audio on headphones connected to the separate user computing device comprising the OTT streaming application and the digital trackpad.

12. The computer implemented method of claim 1, further comprising, recognizing and pairing the separate user computing device by scanning a QR code, a human readable passcode, or pairing via BLUETOOTH or another pairing protocol as a sole device authorized to command rotation of the equirectangular immersive content on the connected TV as controlled by a user from the separate user computing device and the OTT streaming application and the digital trackpad.

13. The computer implemented method of claim 12, further comprising, unlinking the separate user computing device upon request to unlink.

14. A computer implemented method comprising:
    installing, integrating, or embedding a first software development kit (SDK) or native source code directly in an over the-top (OTT) streaming application or indirectly through a cloud broadcasting system (CBS) or content delivery network (CDN) powering the OTT streaming application, wherein the OTT streaming application is downloadable and accessible by a user through a connected television (connected TV), wherein the connected TV device comprises a television or a hardware enabled digital media player that is capable of processing internet wirelessly to download and launch the OTT streaming application and to download equirectangular immersive content for display on the connected TV, wherein the OTT streaming application comprises a 360 degree digital multimedia player; and
    installing, integrating, or embedding a second software development kit (SDK) on a separate user computing device that is separate from the connected TV, wherein the second SDK is part of a user computing device version of the OTT streaming application, wherein the user computing device version of the OTT streaming application comprises a digital trackpad configured to explore and navigate the equirectangular immersive content viewable on the connected TV using the digital trackpad installed on the user computing device version of the OTT streaming application on the separate user computing device;
    wherein the first SDK and/or the second SDK having the 360 degree digital media player includes capabilities to bypass a 360 degree image/video rotation function in the 360 degree digital media player when detecting standard, non-rotational images or video and activate 360 degree image/video rotation function when detecting immersive, rotational image/video,
    further comprising, recognizing two finger sliding horizontal gestures on the digital trackpad on the user computing device version of the OTT streaming application in order to switch a point of view to the user, and further comprising recognizing two-finger tapping on the digital trackpad to split a screen display on the connected TV.

* * * * *